(12) United States Patent
Yeke Yazdandoost et al.

(10) Patent No.: US 11,861,115 B2
(45) Date of Patent: Jan. 2, 2024

(54) SYSTEM AND METHOD FOR ACOUSTIC TOUCH AND FORCE SENSING

(71) Applicant: Apple Inc., Cupertino, CA (US)

(72) Inventors: Mohammad Yeke Yazdandoost, San Francisco, CA (US); Giovanni Gozzini, Berkeley, CA (US); Brian Michael King, Saratoga, CA (US); Marcus Yip, San Carlos, CA (US); Ehsan Khajeh, Los Gatos, CA (US); Aaron Scott Tucker, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/664,398

(22) Filed: May 20, 2022

(65) Prior Publication Data

US 2022/0276733 A1    Sep. 1, 2022

Related U.S. Application Data

(63) Continuation of application No. 15/989,063, filed on May 24, 2018, now Pat. No. 11,347,355.

(Continued)

(51) Int. Cl.
    *G06F 3/044*        (2006.01)
    *G06F 3/043*        (2006.01)
(Continued)

(52) U.S. Cl.
CPC ............ *G06F 3/044* (2013.01); *G06F 1/1605* (2013.01); *G06F 1/1656* (2013.01);
(Continued)

(58) Field of Classification Search
None
See application file for complete search history.

(56) References Cited

U.S. PATENT DOCUMENTS 3,673,327 A    6/1972    Johnson et al.
4,506,354 A    3/1985    Hansen
(Continued)

FOREIGN PATENT DOCUMENTS

CN      1092918 A    9/1994
CN    101008726 A    8/2007
(Continued)

OTHER PUBLICATIONS

Corrected Notice of Allowance received for U.S. Appl. No. 16/523,958, dted Feb. 1, 2022, 2 pages.
(Continued)

*Primary Examiner* — Kenneth Bukowski
(74) *Attorney, Agent, or Firm* — Kubota & Basol LLP

(57) ABSTRACT

Acoustic touch and/or force sensing system architectures and methods for acoustic touch and/or force sensing can be used to detect a position of an object touching a surface and an amount of force applied to the surface by the object. The position and/or an applied force can be determined using time-of-flight (TOF) techniques, for example. Acoustic touch sensing can utilize transducers (e.g., piezoelectric) to simultaneously transmit ultrasonic waves along a surface and through a thickness of a deformable material. The location of the object and the applied force can be determined based on the amount of time elapsing between the transmission of the waves and receipt of the reflected waves. In some examples, an acoustic touch sensing system can be insensitive to water contact on the device surface, and thus acoustic touch sensing can be used for touch sensing in devices that may become wet or fully submerged in water.

20 Claims, 22 Drawing Sheets

Related U.S. Application Data

(60) Provisional application No. 62/510,489, filed on May 24, 2017, provisional application No. 62/510,416, filed on May 24, 2017, provisional application No. 62/510,460, filed on May 24, 2017.

(51) Int. Cl.
  *G06F 1/16* (2006.01)
  *G06F 3/0354* (2013.01)

(52) U.S. Cl.
  CPC ........ *G06F 3/03545* (2013.01); *G06F 3/0436* (2013.01); *G06F 2203/04105* (2013.01)

(56) References Cited

U.S. PATENT DOCUMENTS

| | | |
|---|---|---|
| 4,746,914 A | 5/1988 | Adler |
| 4,825,212 A | 4/1989 | Adler et al. |
| 5,341,687 A | 8/1994 | Stan |
| 5,483,261 A | 1/1996 | Yasutake |
| 5,488,204 A | 1/1996 | Mead et al. |
| 5,591,945 A | 1/1997 | Kent |
| 5,766,493 A | 6/1998 | Shin |
| 5,816,225 A | 10/1998 | Koch et al. |
| 5,825,352 A | 10/1998 | Bisset et al. |
| 5,835,079 A | 11/1998 | Shieh |
| 5,854,450 A | 12/1998 | Kent |
| 5,880,411 A | 3/1999 | Gillespie et al. |
| 5,994,817 A | 11/1999 | Toda |
| 6,078,315 A | 6/2000 | Huang |
| 6,091,406 A | 7/2000 | Kambara et al. |
| RE37,065 E | 2/2001 | Grahn |
| 6,188,391 B1 | 2/2001 | Seely et al. |
| 6,225,985 B1 | 5/2001 | Armstrong et al. |
| 6,229,529 B1 | 5/2001 | Yano et al. |
| 6,310,610 B1 | 10/2001 | Beaton et al. |
| 6,323,846 B1 | 11/2001 | Westerman et al. |
| 6,327,011 B2 | 12/2001 | Kim |
| 6,392,167 B1 | 5/2002 | Nakagawa |
| 6,690,387 B2 | 2/2004 | Zimmerman et al. |
| 6,856,259 B1 | 2/2005 | Sharp |
| 7,015,894 B2 | 3/2006 | Morohoshi |
| 7,079,118 B2 | 7/2006 | Benard et al. |
| 7,098,891 B1 | 8/2006 | Pryor |
| 7,184,064 B2 | 2/2007 | Zimmerman et al. |
| 7,489,308 B2 | 2/2009 | Blake et al. |
| 7,499,039 B2 | 3/2009 | Roberts |
| 7,573,466 B1 | 8/2009 | Marzen et al. |
| 7,663,607 B2 | 2/2010 | Hotelling et al. |
| 7,907,129 B2 | 3/2011 | Idzik et al. |
| 7,978,091 B2 | 7/2011 | Boillot |
| 8,169,404 B1 | 5/2012 | Boillot |
| 8,479,122 B2 | 7/2013 | Hotelling et al. |
| 8,743,091 B2 | 6/2014 | Bernstein |
| 8,749,517 B2 | 6/2014 | Aklil |
| 9,036,855 B2 | 5/2015 | Shah |
| 9,648,409 B2 | 5/2017 | Puskarich |
| 9,698,776 B2 | 7/2017 | Toda et al. |
| 2004/0164970 A1 | 8/2004 | Benard et al. |
| 2005/0017959 A1 | 1/2005 | Kraus et al. |
| 2005/0052432 A1 | 3/2005 | Kraus et al. |
| 2005/0083313 A1 | 4/2005 | Hardie-bick |
| 2005/0248548 A1 | 11/2005 | Tsumura et al. |
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2007/0211031 A1 | 9/2007 | Marc |
| 2007/0240913 A1 | 10/2007 | Schermerhorn |
| 2008/0059761 A1 | 3/2008 | Norman |
| 2008/0114251 A1 | 5/2008 | Weymer et al. |
| 2008/0266266 A1 | 10/2008 | Kent et al. |
| 2010/0026667 A1 | 2/2010 | Bernstein |
| 2013/0093731 A1 | 4/2013 | Scharff et al. |
| 2013/0127783 A1 | 5/2013 | Lee |
| 2013/0234994 A1 | 9/2013 | Hecht et al. |
| 2014/0118307 A1 | 5/2014 | Berget et al. |
| 2015/0054779 A1 | 2/2015 | Horii et al. |
| 2015/0123931 A1 | 5/2015 | Kitchens et al. |
| 2015/0227263 A1 | 8/2015 | Wu et al. |
| 2016/0062498 A1 | 3/2016 | Huppi et al. |
| 2016/0349922 A1 | 12/2016 | Choi |
| 2016/0357279 A1 | 12/2016 | Choi et al. |
| 2016/0357318 A1 | 12/2016 | Chan et al. |
| 2017/0214994 A1 | 7/2017 | Gadonniex et al. |
| 2017/0235434 A1 | 8/2017 | Qutub et al. |
| 2017/0255338 A1 | 9/2017 | Medina et al. |
| 2018/0046302 A1 | 2/2018 | Wang et al. |
| 2018/0210598 A1 | 7/2018 | Lu et al. |
| 2018/0341347 A1 | 11/2018 | Yousefpor et al. |
| 2018/0341359 A1 | 11/2018 | Khajeh et al. |
| 2019/0179471 A1 | 6/2019 | Kim et al. |
| 2019/0266992 A1 | 8/2019 | Lee et al. |
| 2019/0346969 A1 | 11/2019 | Yip et al. |

FOREIGN PATENT DOCUMENTS

| | | |
|---|---|---|
| CN | 102495700 A | 6/2012 |
| CN | 102662535 A | 9/2012 |
| CN | 105683883 A | 6/2016 |
| CN | 105843446 A | 8/2016 |
| CN | 106020540 A | 10/2016 |
| CN | 106227392 A | 12/2016 |
| JP | 2000-163031 A | 6/2000 |
| JP | 2002-342033 A | 11/2002 |
| KR | 10-2006-0126298 A | 12/2006 |
| WO | 1994/002911 A1 | 2/1994 |
| WO | 2002/035460 A1 | 5/2002 |
| WO | 2005/103872 A2 | 11/2005 |
| WO | 2005/103872 A3 | 4/2006 |
| WO | 2014/018118 A1 | 1/2014 |
| WO | 2018/218080 A1 | 11/2018 |

OTHER PUBLICATIONS

Notice of Allowance received for U.S. Appl. No. 16/523,958, dated Jan. 19, 2022, 9 pages.
Applicant Initiated Interview Summary received for U.S. Appl. No. 16/523,958, dated Nov. 29, 2019, 3 pages.
Decision on Appeal received for U.S. Appl. No. 15/989,063, dated Jun. 30, 2021, 11 pages.
Examiner's Answer to Appeal Brief received for U.S. Appl. No. 15/989,063, dated Aug. 25, 2020, 11 pages.
Final Office Action received for U.S. Appl. No. 12/184,232, dated Aug. 27, 2013, 26 pages.
Final Office Action received for U.S. Appl. No. 12/184,232, dated Feb. 20, 2013, 25 pages.
Final Office Action received for U.S. Appl. No. 15/989,063, dated Oct. 16, 2019, 24 pages.
Final Office Action received for U.S. Appl. No. 16/523,958, dated Aug. 4, 2021, 15 pages.
Final Office Action received for U.S. Appl. No. 16/523,958, dated Mar. 6, 2020, 19 pages.
Final Office Action received for U.S. Appl. No. 16/523,958, dated Mar. 12, 2021, 20 pages.
International Search Report received for PCT Patent Application No. PCT/US2018/034484, dated Aug. 16, 2018, 4 pages.
Non-Final Office Action received for U.S. Appl. No. 12/184,232, dated Jul. 25, 2012, 19 pages.
Non-Final Office Action received for U.S. Appl. No. 12/184,232, dated Nov. 18, 2011, 22 pages.
Non-Final Office Action received for U.S. Appl. No. 15/989,063, dated May 31, 2019, 22 pages.
Non-Final Office Action received for U.S. Appl. No. 16/523,958, dated Jun. 29, 2020, 18 pages.
Non-Final Office Action received for U.S. Appl. No. 16/523,958, dated Sep. 6, 2019, 16 pages.
Notice of Allowance received for U.S. Appl. No. 12/184,232, dated Mar. 14, 2014, 9 pages.
Notice of Allowance received for U.S. Appl. No. 15/989,063, dated Jan. 25, 2022, 7 pages.

(56) References Cited

OTHER PUBLICATIONS

Notice of Allowance received for U.S. Appl. No. 15/989,063, dated Oct. 6, 2021, 7 pages.
Pre-Brief Appeal Conference Decision received for U.S. Appl. No. 15/989,063, mailed on Feb. 13, 2020, 2 pages.
Search Report received for Chinese Patent Application No. 201810507207.6, dated Jan. 11, 2021, 5 pages (2 page of English Translation and 3 page of Official Copy).
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

SYSTEM AND METHOD FOR ACOUSTIC TOUCH AND FORCE SENSING

CROSS-REFERENCE TO RELATED APPLICATIONS

This application is a continuation of U.S. patent application Ser. No. 15/989,063 (published as U.S. Publication No. 2018-0341359), filed on May 24, 2018, which claims benefit of U.S. Provisional Application No. 62/510,460, filed on May 24, 2017, U.S. Provisional Application No. 62/510,489, filed on May 24, 2017, and U.S. Provisional Application 62/510,416, filed May 24, 2017, which are hereby incorporated by reference in their entireties for all purposes.

FIELD OF THE DISCLOSURE

This relates generally to touch and/or force sensing systems, and more particularly, to integrated acoustic touch and force sensing systems and methods for acoustic touch and force sensing.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. Capacitive-type touch sensing systems, however, can experience reduced performance due to conductive, electrically-floating objects (e.g., water droplets) in contact with the touch-sensitive surface.

SUMMARY

This relates to acoustic touch and/or force sensing systems and methods for acoustic touch and/or force sensing. The position of an object touching a surface can be determined using time-of-flight (TOF) techniques, for example. Acoustic touch and/or force sensing can utilize transducers, such as piezoelectric transducers, to transmit ultrasonic waves along a surface and/or through the thickness of one or more materials (e.g., a thickness of an electronic device housing). As the wave propagates along the surface and/or through the thickness of the one or more materials, an object (e.g., finger, stylus, etc.) in contact with the surface can interact with the transmitted wave, causing a reflection of at least a portion of the transmitted wave. Portions of the transmitted wave energy after interaction with the object can be measured to determine the touch location of the object on the surface of the device. For example, one or more transducers (e.g., acoustic transducers) coupled to a surface of a device can be configured to transmit an acoustic wave along the surface and/or through the thickness of the one or more materials and can receive a portion of the wave reflected back when the acoustic wave encounters a finger or other object touching the surface. The location of the object can be determined, for example, based on the amount of time elapsing between the transmission of the wave and the detection of the reflected wave. Acoustic touch sensing can be used instead of, or in conjunction with, other touch sensing techniques, such as resistive, optical, and/or capacitive touch sensing. In some examples, the acoustic touch sensing techniques described herein can be used on a metal housing surface of a device, which may be unsuitable for capacitive or resistive touch sensing due to interference (e.g., of the housing with the capacitive or resistive sensors housed in the metal housing). In some examples, the acoustic touch sensing techniques described herein can be used on a glass surface of a display or touch screen. In some examples, an acoustic touch sensing system can be configured to be insensitive to contact on the device surface by water, and thus acoustic touch sensing can be used for touch sensing in devices that may become wet or fully submerged in water.

Additionally or alternatively, a force applied by the object on the surface can also be determined using TOF techniques. For example, one or more transducers can transmit ultrasonic waves through the thickness of a deformable material, and reflected waves from the opposite edge of the deformable material can be measured to determine a TOF or a change in TOF. The TOF, or change in TOF (ATOF), can correspond to the thickness of the deformable material (or changes in thickness) due to force applied to the surface. Thus, the TOF or change in TOF (or the thickness or change in thickness) can be used to determine the applied force. In some examples, using acoustic touch and force sensing can reduce the complexity of the touch and force sensing system by reducing the sensing hardware requirements (e.g., transducers, sensing circuitry/controllers, etc. can be integrated/shared).

DETAILED DESCRIPTION

Figure 1A:
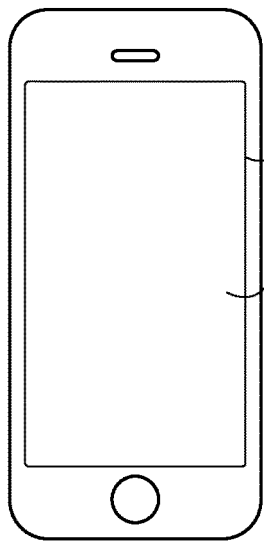
FIGS. 1A-1G illustrate exemplary systems with touch screens that can include acoustic sensors for detecting contact between an object and a surface of the system according to examples of the disclosure.

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

This relates to acoustic touch and/or force sensing systems and methods for acoustic touch and/or force sensing. The position of an object touching a surface can be determined using time-of-flight (TOF) techniques, for example. Acoustic touch and/or force sensing can utilize transducers, such as piezoelectric transducers, to transmit ultrasonic waves along a surface and/or through the thickness of one or more materials (e.g., a thickness of an electronic device housing). As the wave propagates along the surface and/or through the thickness of the one or more materials, an object (e.g., finger, stylus, etc.) in contact with the surface can interact with the transmitted wave, causing a reflection of at least a portion of the transmitted wave. Portions of the transmitted wave energy after interaction with the object can be measured to determine the touch location of the object on the surface of the device. For example, one or more transducers (e.g., acoustic transducers) coupled to a surface of a device can be configured to transmit an acoustic wave along the surface and/or through the thickness of the one or more materials and can receive a portion of the wave reflected back when the acoustic wave encounters a finger or other object touching the surface. The location of the object can be determined, for example, based on the amount of time elapsing between the transmission of the wave and the detection of the reflected wave. Acoustic touch sensing can be used instead of, or in conjunction with, other touch sensing techniques, such as resistive, optical, and/or capacitive touch sensing. In some examples, the acoustic touch sensing techniques described herein can be used on a metal housing surface of a device, which may be unsuitable for capacitive or resistive touch sensing due to interference (e.g., of the housing with the capacitive or resistive sensors housed in the metal housing). In some examples, the acoustic touch sensing techniques described herein can be used on a glass surface of a display or touch screen. In some examples, an acoustic touch sensing system can be configured to be insensitive to contact on the device surface by water, and thus acoustic touch sensing can be used for touch sensing in devices that may become wet or fully submerged in water.

Additionally or alternatively, a force applied by the object on the surface can also be determined using TOF techniques. For example, one or more transducers can transmit ultrasonic waves through the thickness of a deformable material, and reflected waves from the opposite edge of the deformable material can be measured to determine a TOF or a change in TOF. The TOF, or change in TOF (ATOF), can correspond to the thickness of the deformable material (or changes in thickness) due to force applied to the surface. Thus, the TOF or change in TOF (or the thickness or change in thickness) can be used to determine the applied force. In some examples, using acoustic touch and force sensing can reduce the complexity of the touch and force sensing system by reducing the sensing hardware requirements (e.g., transducers, sensing circuitry/controllers, etc. can be integrated/shared).

Figure 1B:
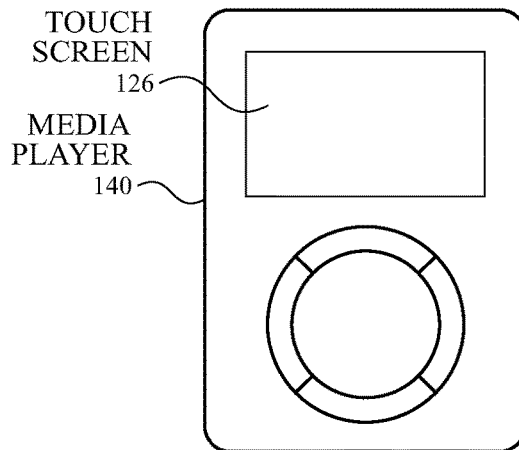
Figure 1C:
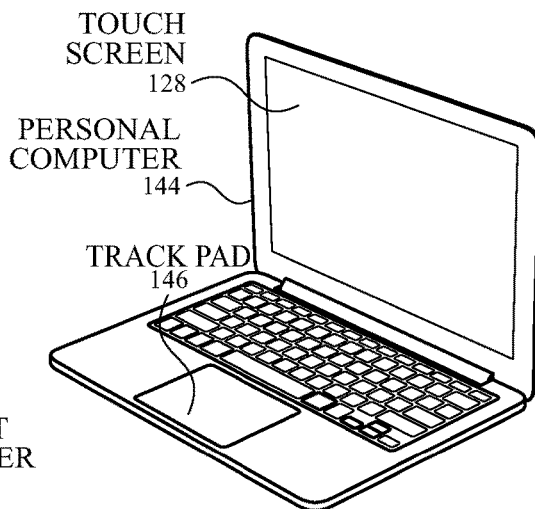
Figure 1D:
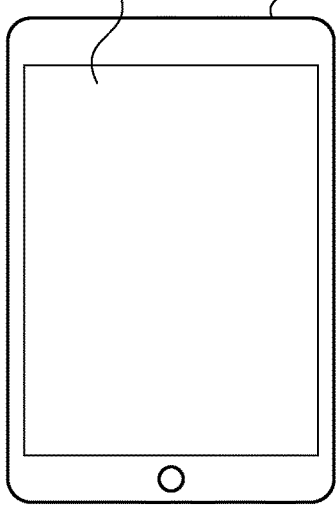
Figure 1E:
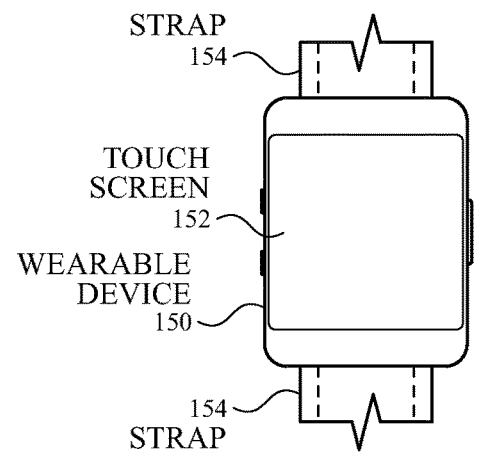
Figure 1F:
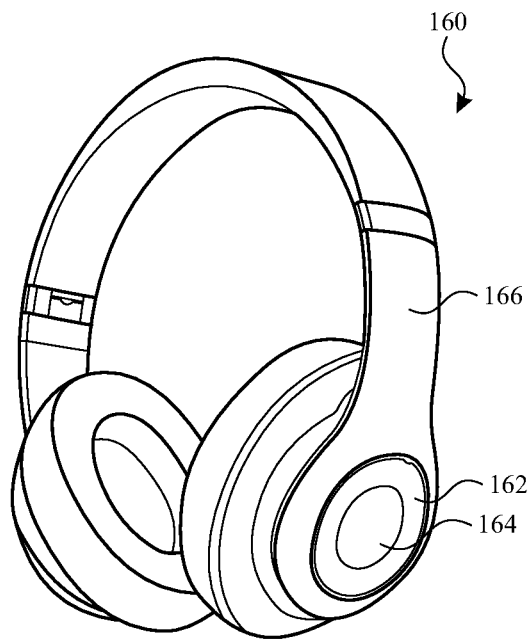
Figure 1G:
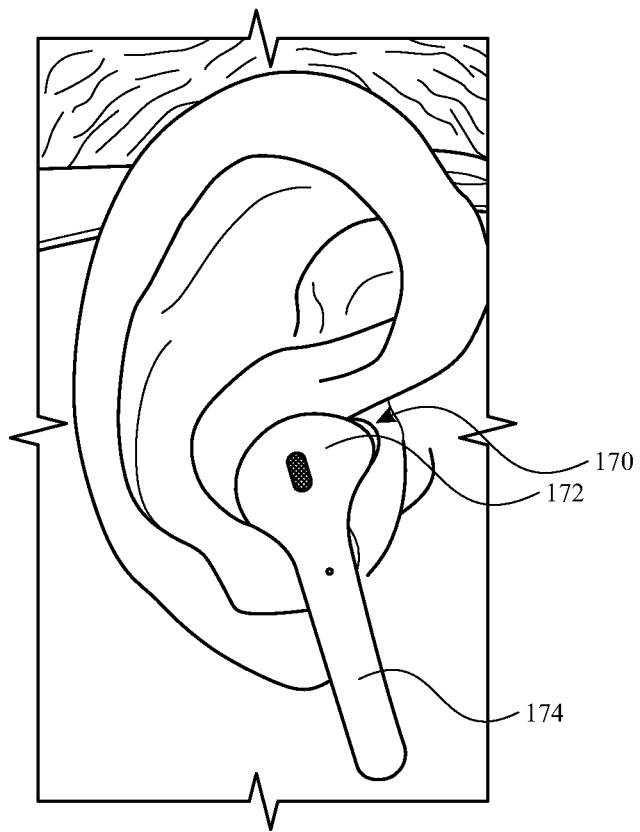

FIGS. 1A-1G illustrate exemplary systems with touch screens that can include acoustic sensors for detecting contact between an object (e.g., a finger or stylus) and a surface of the system according to examples of the disclosure. Detecting contact can include detecting a location of contact and/or an amount of force applied to a touch-sensitive surface. FIG. 1A illustrates an exemplary mobile telephone 136 that includes a touch screen 124 and can include an acoustic touch and/or force sensing system according to examples of the disclosure. FIG. 1B illustrates an example digital media player 140 that includes a touch screen 126 and can include an acoustic touch and/or force sensing system according to examples of the disclosure. FIG. 1C illustrates an example personal computer 144 that includes a touch screen 128 and a track pad 146, and can include an acoustic touch and/or force sensing system according to examples of the disclosure. FIG. 1D illustrates an example tablet computing device 148 that includes a touch screen 130 and can include an acoustic touch and/or force sensing system according to examples of the disclosure. FIG. 1E illustrates an example wearable device 150 (e.g., a watch) that includes a touch screen 152 and can include an acoustic touch and/or force sensing system according to examples of the disclosure. Wearable device 150 can be coupled to a user via strap 154 or any other suitable fastener. FIG. 1F illustrates another example wearable device, over-ear headphones 160, that can include an acoustic touch and/or force sensing system according to examples of the disclosure. FIG. 1G illustrates another example wearable device, in-ear headphones 170, that can include an acoustic touch and/or force sensing system according to examples of the disclosure. It should be understood that the example devices illustrated in FIGS. 1A-1G are provided by way of example, and other types of devices can include an acoustic touch and/or force sensing system for detecting contact between an object and a surface of the device. Additionally, although the devices illustrated in FIGS. 1A-1E include touch screens, in some examples, the devices may have a non-touch-sensitive display (e.g., the devices illustrated in FIGS. 1F and 1G).

Acoustic sensors can be incorporated in the above described systems to add acoustic touch and/or force sensing capabilities to a surface of the system. For example, in some examples, a touch screen (e.g., capacitive, resistive, etc.) can be augmented with acoustic sensors to provide a touch and/or force sensing capability for use in wet environments or under conditions where the device may get wet (e.g., exercise, swimming, rain, washing hands) or for use with non-conductive or partially-conductive touch objects (e.g., gloved or bandaged fingers) or poorly grounded touch objects (e.g., objects not in contact with the system ground of the device). In some examples, an otherwise non-touch sensitive display screen can be augmented with acoustic sensors to provide a touch and/or force sensing capability. In such examples, a touch screen can be implemented without the stack-up required for a capacitive touch screen. In some examples, the acoustic sensors can be used to provide touch and/or force sensing capability for a non-display surface. For example, the acoustic sensors can be used to provide touch and/or force sensing capabilities for a track pad (e.g., trackpad 146 of personal computer 144), a button, a scroll wheel, part or all of the housing or any other surfaces of the device (e.g., on the front, rear or sides). For example, acoustic sensors can be integrated into over-ear headphones 160 (e.g., in exterior circular region 162, interior circular region 164, and/or over-head band 166) or in-ear headphones 170 (e.g., in earbud 172 or protrusion 174) to provide touch and/or force input (e.g., single-touch or multi-touch gestures including tap, hold and swipe). The acoustic sensing surfaces for acoustic touch and/or force sensing can be made of various materials (e.g., metal, plastic, glass, etc.) or a combination of materials.

Figure 2:
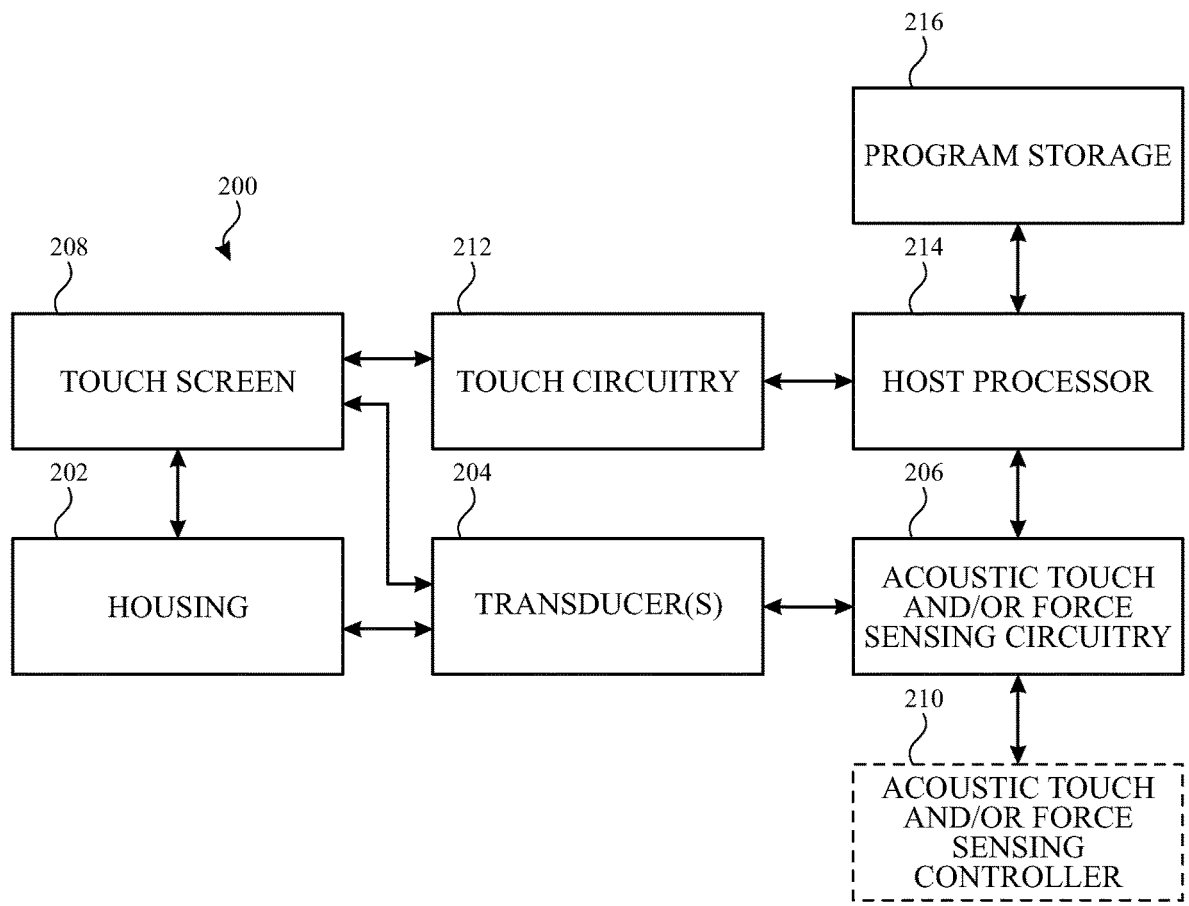
FIG. 2 illustrates an exemplary block diagram of an electronic device including an acoustic touch and/or force sensing system according to examples of the disclosure.

FIG. 2 illustrates an exemplary block diagram of an electronic device including an acoustic touch and/or force sensing system according to examples of the disclosure. In some examples, housing 202 of device 200 (e.g., corresponding to devices 136, 140, 144, 148, and 150 above) can be coupled (e.g., mechanically) with one or more acoustic transducers 204. In some examples, transducers 204 can be piezoelectric transducers, which can be made to vibrate by the application of electrical signals when acting as a transmitter, and generate electrical signals based on detected vibrations when acting as a receiver. In some examples, transducers 204 can be formed from a piezoelectric ceramic material (e.g., PZT or KNN) or a piezoelectric plastic material (e.g., PVDF or PLLA). Similarly, transducers 204 can produce electrical energy as an output when vibrated. In some examples, transducers 204 can be bonded to housing 202 by a bonding agent (e.g., a thin layer of stiff epoxy). In some examples, transducers 204 can be deposited on one or more surfaces (e.g., a cover glass of touch screen 208 and/or a deformable material as described in more detail below) through processes such as deposition, lithography, or the like. In some examples, transducers 204 can be bonded to the one or more surfaces using electrically conductive or non-conductive bonding materials. When electrical energy is applied to transducers 204 it can cause the transducers to vibrate, the one or more surfaces in contact with the transducers can also be caused to vibrate, and the vibrations of the molecules of the surface material can propagate as an acoustic wave through the one or more surfaces/materials. In some examples, vibration of transducers 204 can be used to produce ultrasonic acoustic waves at a selected frequency over a broad frequency range (e.g., 500 kHz-10 MHz) in the medium of the surface of the electronic device which can be metal, plastic, glass, wood, or the like. It should be understood that other frequencies outside of the exemplary range above can be used while remaining within the scope of the present disclosure.

In some examples, transducers 204 can be partially or completely disposed on (or coupled to) a portion of a touch screen 208. For example, touch screen 208 (e.g., capacitive) may include a glass panel (cover glass) or a plastic cover, and a display region of the touch screen may be surrounded by a non-display region (e.g., a black border region surrounding the periphery of the display region of touch screen 208). In some examples, transducers 204 can be disposed partially or completely in the black mask region of touch screen 208 (e.g., on the back side of the glass panel behind the black mask) such that the transducers are not visible (or are only partially visible) to a user. In some examples, transducers 204 can be partially or completely disposed on (or coupled to) a portion of a deformable material (not shown). In some examples, the deformable material can be disposed between touch screen 208 and a rigid material (e.g., a portion of housing 202). In some examples, the deformable material can be silicone, rubber or polyethylene. In some examples, the deformable material can also be used for water sealing of the device.

Device 200 can further include acoustic touch and/or force sensing circuitry 206, which can include circuitry for driving electrical signals to stimulate vibration of transducers 204 (e.g., transmit circuitry), as well as circuitry for sensing electrical signals output by transducers 204 when the transducer is stimulated by received acoustic energy (e.g., receive circuitry). In some examples, timing operations for acoustic touch and/or force sensing circuitry 206 can optionally be provided by a separate acoustic touch and/or force sensing controller 210 that can control timing of and other operations by acoustic touch and/or force sensing circuitry 206. In some examples, touch and/or force sensing controller 210 can be coupled between acoustic touch and/or force sensing circuitry 206 and host processor 214. In some examples, controller functions can be integrated with acoustic touch and/or force sensing circuitry 206 (e.g., on a single integrated circuit). In particular, examples integrating touch and force sensing circuitry and controller functionality into a single integrated circuit can reduce the number of transducers (sensor elements) and electronic chipsets for a touch and force sensing device. Output data from acoustic touch and/or force sensing circuitry 206 can be output to a host processor 214 for further processing to determine a location of and a force applied by an object contacting the device as will be described in more detail below. In some examples, the processing for determining the location of and a force applied by the contacting object can be performed by acoustic touch and/or force sensing circuitry 206, acoustic touch and/or force sensing controller 210 or a separate sub-processor of device 200 (not shown).

In addition to acoustic touch and/or force sensing, device 200 can include additional touch circuitry 212 and optionally a touch controller (not shown) that can be coupled to the touch screen 208. In examples including a touch controller, the touch controller can be disposed between touch circuitry 212 and host processor 214. Touch circuitry 212 can, for example, be capacitive or resistive touch sensing circuitry, and can be used to detect contact and/or hovering of objects (e.g., fingers, styli) in contact with and/or in proximity to touch screen 208, particularly in the display region of the touch screen. Thus, device 200 can include multiple types of sensing circuitry (e.g., touch circuitry 212 and acoustic touch and/or force sensing circuitry 206) for detecting objects (and their positions and/or applied force) in different regions of the device and/or for different purposes, as will be described in more detail below. Although described herein as including a touch screen, it should be understood that touch circuitry 212 can be omitted, and in some examples, touch screen 208 can be replaced by an otherwise non-touch-sensitive display (e.g., but-for the acoustic sensors).

Host processor 214 can receive acoustic or other touch outputs (e.g., capacitive) and/or force outputs and perform actions based on the touch outputs and/or force outputs. Host processor 214 can also be connected to program storage 216 and touch screen 208. Host processor 214 can, for example, communicate with touch screen 208 to generate an image on touch screen 208, such as an image of a user interface (UI), and can use touch sensing circuitry 212 and/or acoustic touch and/or force sensing circuitry 206 (and, in some examples, their respective controllers) to detect a touch on or near touch screen 208 and/or an applied force, such as a touch input and/or force input to the displayed UI. The touch input and/or force input can be used by computer programs stored in program storage 216 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 214 can also perform additional functions that may not be related to touch and/or force processing.

Note that one or more of the functions described herein can be performed by firmware stored in memory and executed by touch circuitry 212 and/or acoustic touch and/or force sensing circuitry 206 (or their respective controllers), or stored in program storage 216 and executed by host processor 214. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that device 200 is not limited to the components and configuration of FIG. 2, but can include other or additional components in multiple configurations according to various examples. Additionally, the components of device 200 can be included within a single device, or can be distributed between multiple devices. Additionally, it should be understood that the connections between the components is exemplary and different unidirectional or bidirectional connections can be included between the components depending on the implementation, irrespective of the arrows shown in the configuration of FIG. 2.

Figure 3A:
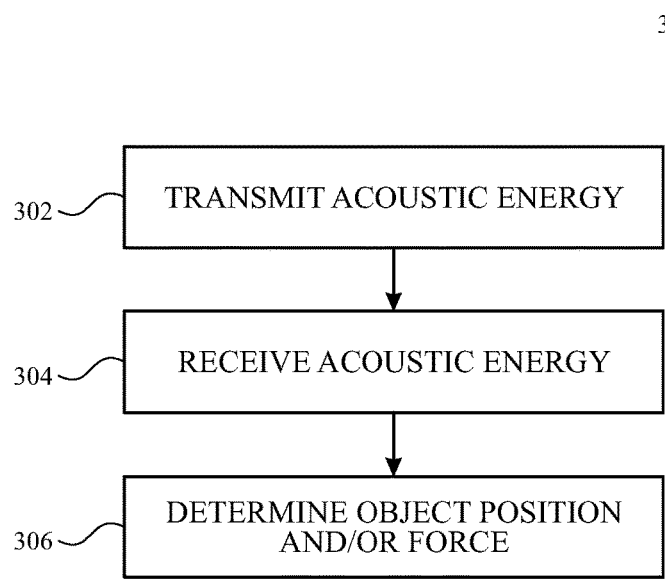
FIG. 3A illustrates an exemplary process for acoustic touch and/or force sensing of an object in contact with a touch and/or force sensitive surface according to examples of the disclosure.
Figure 3B:
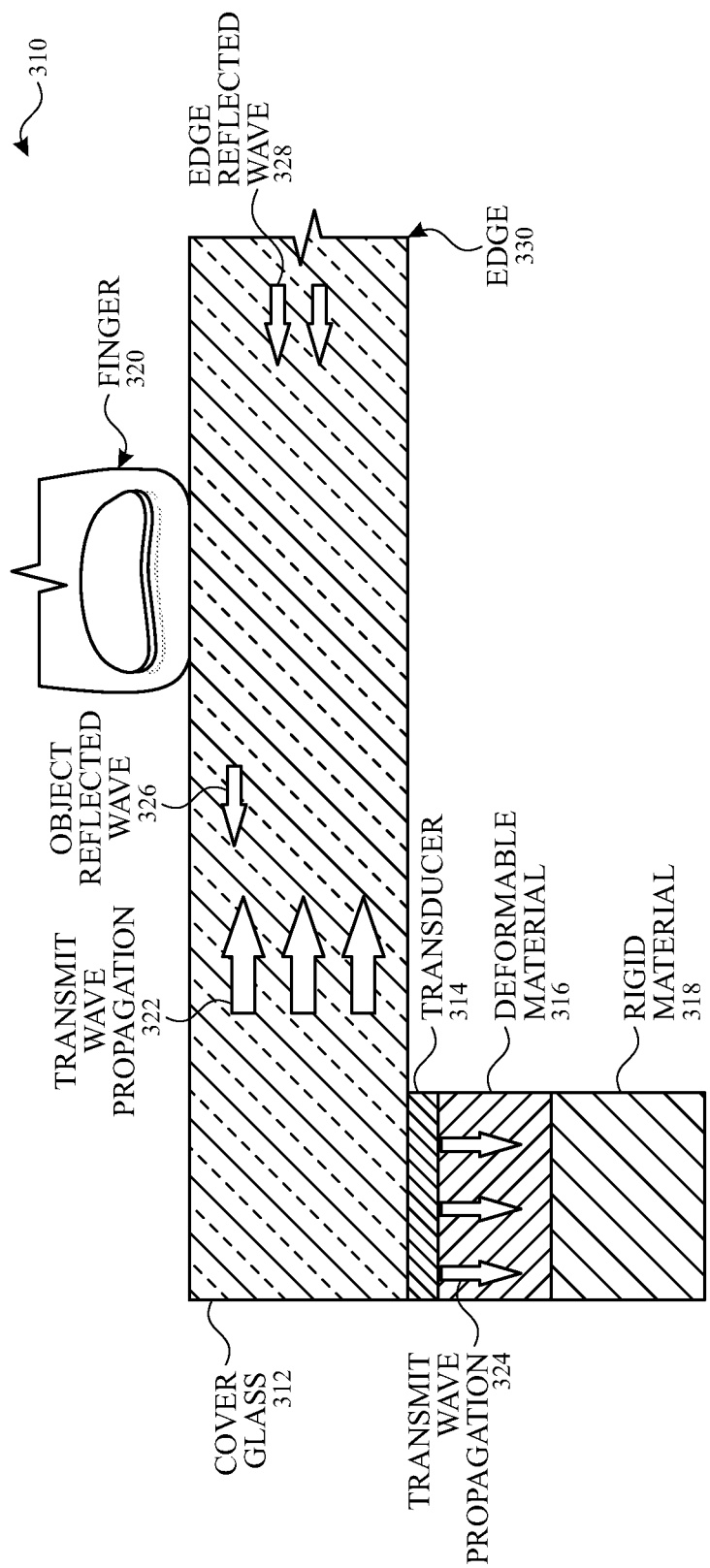
FIG. 3B illustrates an exemplary system, which can perform an exemplary process for acoustic touch and/or force sensing of an object in contact with a touch and/or force sensitive surface, according to examples of the disclosure.

FIG. 3A illustrates an exemplary process 300 for acoustic touch and/or force sensing of an object in contact with a touch and/or force sensitive surface according to examples of the disclosure. FIG. 3B illustrates an exemplary system 310, which can perform an exemplary process 300 for acoustic touch and/or force sensing of an object in contact with a touch and/or force sensitive surface, according to examples of the disclosure. At 302, acoustic energy can be transmitted (e.g., by one or more transducers 204) along a surface and/or through the thickness of a material in the form of an ultrasonic wave, for example. For example, as illustrated in FIG. 3B, transducer 314 can generate a transmit ultrasonic wave 322 in cover glass 312 (or other material capable of propagating an ultrasonic wave). In some examples, the wave can propagate as a compressive wave, a guided wave such as a shear horizontal wave, a Rayleigh wave, a Lamb wave, a Love wave, a Stoneley wave, or a surface acoustic wave. Other propagation modes for the transmitted acoustic energy can also exist based on the properties of the surface material, geometry and the manner of energy transmission from the transducers to the surface of the device. In some examples, the surface can be formed from glass, plastic, or sapphire crystal (e.g., touch screen 208, cover glass 312) or the surface can be formed from metal, ceramics, plastic, or wood (e.g., housing 202). Transmitted energy can propagate along the surface (e.g., cover glass 312) and/or through the thickness until a discontinuity in the surface is reached (e.g., an object, such as a finger 320, in contact with the surface), which can cause a portion of the energy to reflect. In some examples, a discontinuity can occur at edges (e.g., edge 330) of the surface material (e.g., when the ultrasonic wave propagates to the edge of the surface opposite the transducer). When the transmitted energy reaches one of the discontinuities described above, some of the energy can be reflected, and a portion of the reflected energy (e.g., object-reflected wave 326, edge-reflected wave 328) can be directed to one or more transducers (e.g., transducers 204, 314). In some examples, water or other fluids in contact with the surface of the device (e.g., device 200) will not act as a discontinuity to the acoustic waves, and thus the acoustic touch sensing process can be effective for detecting the presence of an object (e.g., a user's finger) even in the presence of water drops (or other low-viscosity fluids) on the surface of the device or even while the device is fully submerged.

At 304, returning acoustic energy can be received, and the acoustic energy can be converted to an electrical signal by one or more transducers (e.g., transducers 204). For example, as illustrated in FIG. 3B, object-reflected wave 326 and edge-reflected wave 328 can be received by transducer 314 and converted into an electrical signal.

At 306, the acoustic sensing system can determine whether one or more objects is contacting the surface of the device, and can further detect the position of one or more objects based on the received acoustic energy. In some examples, a distance of the object from the transmission source (e.g., transducers 204) can be determined from a time-of-flight between transmission and reception of reflected energy, and a propagation rate of the ultrasonic wave through the material. In some examples, baseline reflected energy from one or more intentionally included discontinuities (e.g., edges) can be compared to a measured value of reflected energy corresponding to the one or more discontinuities. The baseline reflected energy can be determined during a measurement when no object (e.g., finger) is in contact with the surface. Deviations of the reflected energy from the baseline can be correlated with a presence of an object touching the surface.

Although process 300, as described above, generally refers to reflected waves received by the same transducer(s) that transmitted the waves, in some examples, the transmitter and receiver functions can be separated such that the transmission of acoustic energy at 302 and receiving acoustic energy at 304 may occur at different co-located transducers (e.g., one transducer in a transmit configuration and one transducer in a receive configuration). In some examples, the acoustic energy can be transmitted along and/or through the surface (e.g., cover glass 312) by one or more transducers (e.g., transducer 314) and received on an opposite edge (e.g., edge 330) of the surface by one or more additional transducers (not shown). The attenuation of the received acoustic energy can be used to detect the presence of and/or identify the position of one or more objects (e.g., finger 320) on the surface (e.g., cover glass 312). Exemplary device configurations and measurement timing examples that can be used to implement process 300 will be described in further detail below. In some examples, the transmitted acoustic energy from transducer 314 can be received at the transmitting transducer and also received at one or more other non-transmitting transducers located in different positions (e.g., at different edges of the surface (e.g., cover glass 312). Energy can reflect from one or more objects at multiple angles, and the energy received at all of the receiving transducers can be used to determine the position of the one or more objects. In some examples, the non-transmitting transducers can be free of artifacts that can be associated with transmitting acoustic energy (e.g., ringing). In some examples, the energy can be received at two transducers perpendicular to the transmitting transistor.

In some examples, the acoustic energy transmitted and received through a deformable material can be used to determine changes in the thickness of the deformable material and/or an applied force. For example, at 302, acoustic energy can be transmitted (e.g., by transducer 314) through the thickness of deformable material 316 in the form of a transmit ultrasonic wave 324. Transmitted energy can propagate through the deformable material 316 until it reaches a discontinuity at the rigid material 318 (e.g., at the opposite edge of the deformable material 316). When the transmitted energy reaches the discontinuity, some of the energy can be reflected, and a portion of the reflected energy can be directed back to transducer 314. At 304, returning acoustic energy can be received, and the acoustic energy can be converted to an electrical signal by transducers 314. At 306, the acoustic sensing system can determine an amount of force applied by one or more objects contacting the surface (e.g., cover glass 312) based on the received acoustic energy. In some examples, a thickness of deformable material 316 can be determined from a time-of-flight between transmission and reception of reflected energy, and a propagation rate of the ultrasonic wave through the material. Changes in the thickness of the deformable material (or the time-of-flight through the deformable material) can be used to determine an amount of applied force, as described in more detail below.

Figure 4:
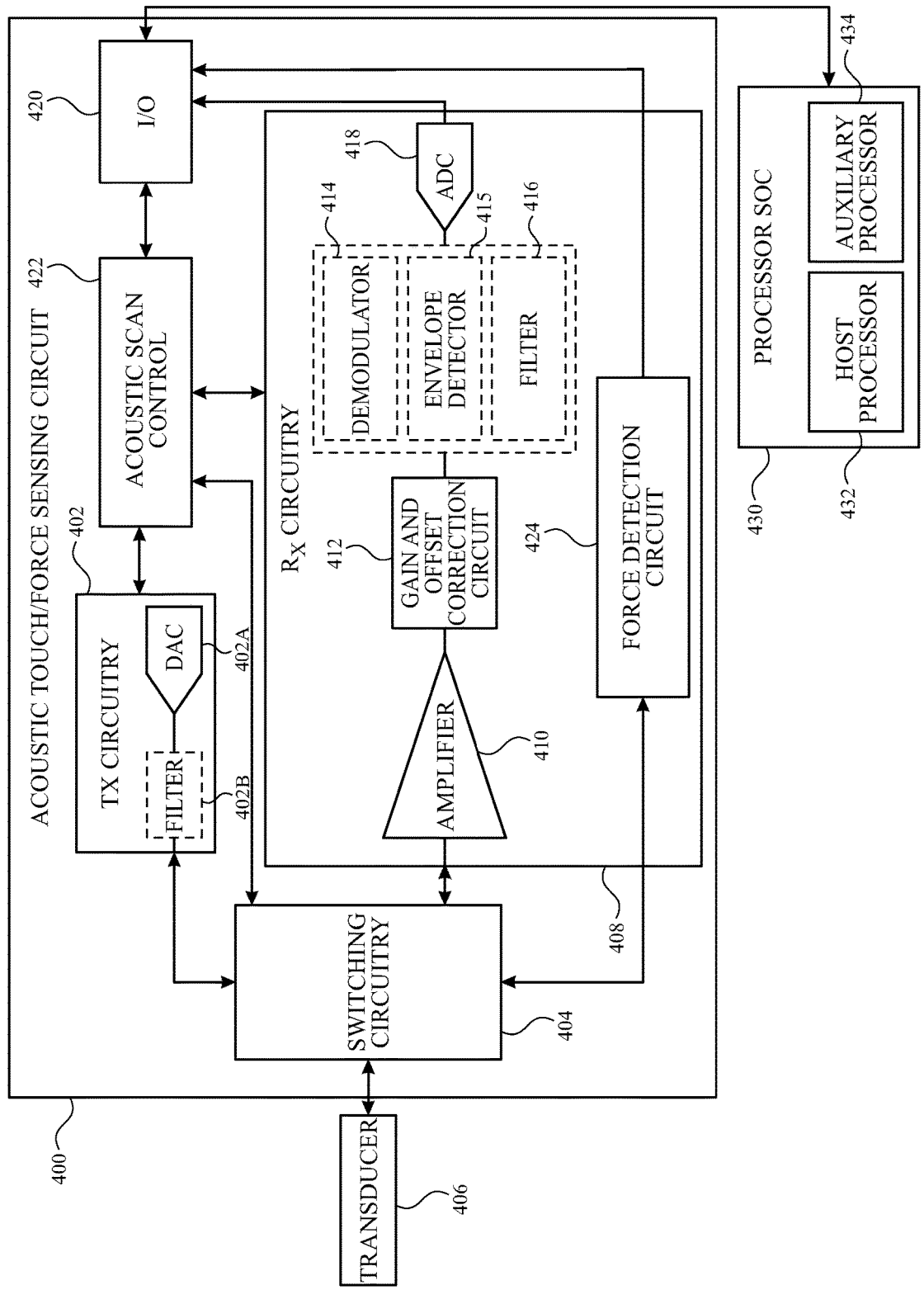
FIG. 4 illustrates an exemplary configuration of an acoustic touch and/or force sensing circuit according to examples of the disclosure.

FIG. 4 illustrates an exemplary configuration of an acoustic touch and/or force sensing circuit 400 according to examples of the disclosure. Acoustic touch and/or force sensing circuit 400 can include transmit circuitry (also referred to herein as Tx circuitry or transmitter) 402, switching circuitry 404, receive circuitry (also referred to herein as Rx circuitry or receiver) 408 and input/output (I/O) circuit 420 (which together can correspond to acoustic touch and/or force sensing circuitry 206) and acoustic scan control logic 422 (which can correspond to acoustic touch and/or force sensing controller 210). Transmitter 402, switching circuitry 404, receiver 408, I/O circuit 420 and/or acoustic scan control logic 422 can be implemented in an application specific integrated circuit (ASIC) in some examples. In some examples, acoustic touch and/or force sensing circuit 400 can also optionally include transducers 406 (which can correspond to transducers 204).

In some examples, a transmitter 402 can generate an electrical signal for stimulating movement of one or more of a plurality of transducers 406. In some examples, the transmitted signal can be a differential signal, and in some examples, the transmitted signal can be a single-ended signal. In some examples, transmitter 402 can be a simple buffer, and the transmitted signal can be a pulse (or burst of pulses at a particular frequency). In some examples, transmitter 402 can include a digital-to-analog converter (DAC) 402A and an optional filter 402B that can be optionally used to smooth a quantized output of DAC 402A. In some examples, characteristics of the transducer itself can provide a filtering property and filter 402B can be omitted. DAC 402A can be used to generate transmit waveform (e.g., any transmit waveform suitable for the touch and/or force sensing operations discussed herein). In some examples, the transmit waveform output can be pre-distorted to equalize the channel. In some examples, the characteristics of each channel, such as the properties of the surface material (and/or deformable material) coupled to transducers 406, the discontinuities in the surface material and/or deformable material, and the reflection characteristics of an edge of the device or deformable material can be measured and stored. In some examples, the channel characteristics can be measured as a manufacturing step (or factory calibration step), and in other examples the characteristics can be measured as a periodic calibration step (i.e., once a month, once a year, etc. depending on how quickly the channel characteristics are expected to change). In some examples, the channel characteristics can be converted to a transfer function of the channel, and the transmit waveform can be configured using the inverse of the channel transfer function such that the returning signal is equalized (e.g., returning signal can be detected as a pulse or a burst of pulses despite the transmitted waveform having a seemingly arbitrary waveform). In some examples, a single differential pulse can be used as a transmit waveform. For example, a bipolar square pulse (where the voltage applied to the transducer can be both positive and negative) can be used as the transmit waveform, and the bipolar square pulse can be implemented using a single-ended or differential implementation. In some examples, an energy recovery architecture can be used to recover some of the energy required for charging and discharging the transducer.

Switching circuitry 404 can include multiplexers (MUXs) and/or demultiplexers (DEMUXs) that can be used to selectively couple transmitter 402 and/or receiver 408 to one of transducers 406 that can be the active transducer for a particular measurement step in a measurement cycle. In a differential implementation, switching circuitry 404 can include two MUXs and two DEMUXs. In some examples, a DEMUX can have a ground connection, and the non-selected DEMUX outputs can be shorted, open, or grounded. In some examples, the same transducer 406 can be coupled to transmitter 402 by switching circuitry 404 (e.g., DEMUXs) during the drive mode and coupled to receiver 408 by switching circuitry 404 (e.g., MUXs) during the receive mode. Thus, in some examples, a single transducer 406 can be used both for transmitting and receiving acoustic energy. In some examples, a first transducer can be coupled to transmitter 402 by switching circuitry 404 (e.g. DEMUXs) and a second transducer can be coupled by switching circuitry 404 (e.g., MUXs) to receiver 408. For example, the transmitting transducer and the receiving transducer can be discrete piezoelectric elements, where the transmitting transducer can be designed for being driven by higher voltages (or currents) to produce sufficient motion in transducer 406 to generate an acoustic wave in the surface of a device (e.g., device 200 above), and the receiving transducer can be designed for receiving smaller amplitude reflected energy. In such a configuration, the transmit-side circuitry (e.g., transmitter 402 and DEMUXs of switching circuitry 404) can be optionally implemented on a high voltage circuit, and the receive-side circuitry (e.g., receiver 408 and MUXs of switching circuitry 404) can be optionally implemented on a separate low voltage circuit. In some examples, switching circuitry 404 (MUXs and DEMUXs) can also be implemented on the high voltage circuit to properly isolate the remaining receive-side circuitry (e.g., receiver 408) during transmission operations by transmit side circuitry. Additionally or alternatively, in some examples, the transmit circuit can include an energy recovery architecture that can be used to recover some of the energy required for charging and discharging the transducer. It should be understood that for a single-ended implementation, switching circuitry 404 can include a single DEMUX and MUX. In such a configuration, transmitter 402 and receiver 408 can be single-ended as well. Differential implementations, however, can provide improved noise suppression over a single-ended implementation.

Receiver 408 can include an amplifier 410 such as a low-noise amplifier (LNA) configured to sense the transducer. Receiver 408 can also include a gain and offset correction circuit 412. The gain and offset correction circuit can include a programmable gain amplifier (PGA) configured to apply gain to increase (or in some cases decrease) the amplitude of the signals received from LNA. The PGA can also be configured to filter (e.g., low pass) the signals received from the LNA to remove high frequency components. Additionally, the PGA circuit can also be configured to perform baselining (offset correction).

In some examples, the output of gain and offset correction circuit 412 can optionally be coupled to one or more analog processing circuits. In some examples, the output of gain and offset correction circuit 412 can be coupled to a demodulation circuit 414 configured to demodulate the received signals (e.g., by I/Q demodulation). In some examples, the output of the gain and offset correction circuit 412 can be coupled to an envelope detection circuit 415 configured to perform envelope detection on the received signals. In some examples, the output of gain and offset correction circuit 412 can be filtered at filter 416. In some examples, these blocks/circuits can be placed in a different order. In some examples, the processing of one or more of these analog processing circuits can be performed in the digital domain.

The received signals, whether raw or processed by one or more of demodulation circuit 414, envelope detection circuit 415 or filter 416, can be passed to an analog-to-digital converter (ADC) 418 for conversion to a digital signal. In some examples, an input/output (I/O) circuit 420 can be used to transmit received data for processing. In some examples, the output of I/O circuit 420 can be transferred to a host processor of the device, or to an auxiliary processor (sub-processor) separate from the host processor. For example, as illustrated, the output of I/O circuit 420 can be coupled to a processor system-on-chip (SoC) 430, which can include one or more processors. In some examples, processor SoC 430 can include a host processor 432 (e.g., an active mode processor) and an auxiliary processor 434 (e.g., a low power processor). In some examples, some digital signal processing can be performed (e.g., by acoustic touch and/or force sensing circuit 400) before transmitting the data to other processors in the system (e.g., processor SoC 430). In some examples, the I/O circuit 420 is not only used for data transfer to processor SoC 430 (e.g., host processor 432), but also is used for writing the control registers and/or firmware download from processor SoC 430.

The components of receiver circuitry 408 described above can be implemented to detect touch (e.g., presence and location of a touch on a surface). In some examples, receiver 408 can also include a force detection circuit 424 to detect applied force (e.g., of the touch on the surface). In some examples, the force detection circuit 424 can include the same or similar components as described above (e.g., amplifier, gain and offset correction, etc.). In some examples, the function of force detection circuit 424 can be performed using the same components described above that are used to determine time-of-flight for touch detection. In some examples, a low-power time gating circuit can be used to determine time-of-flight for force detection. Data from force sensing circuit 424 can be transferred to I/O circuit 420 and/or processor SoC 430 for further processing of force data in a similar manner as described above for touch data. In some examples the same circuitry for touch detection can be used to detect force.

A control circuit, acoustic scan control circuit 422, can be used to control timing and operations of the circuitry of acoustic touch and/or force sensing circuit 400. Acoustic scan control circuit 422 can be implemented in hardware, firmware, software or a combination thereof. In some examples, acoustic scan control circuit 422 can include digital logic and timing control. Digital logic can provide the various components of acoustic touch and/or sensing circuit 400 with control signals. A timing control circuit can generate timing signals for acoustic touch and/or sensing circuit 400 and generally sequence the operations of acoustic touch and/or force sensing circuit 400. In some examples, the acoustic touch and/or force sensing circuit 400 can receive a master clock signal from an external source (e.g., clock from the host processor, crystal oscillator, ring oscillator, RC oscillator, or other high-performance oscillator). In some examples, an on-chip oscillator can be used to generate the clock. In some examples, a master clock signal can be generated by an on-chip phase locked loop (PLL), included as part of acoustic touch and/or force sensing circuit 400, using an external clock as the input. In some examples, a master clock signal can be routed to the acoustic touch sensing circuit from processor SoC 430. The appropriate master clock source can be determined based on a tradeoff between area, thickness of the stack-up, power and electromagnetic interference.

It is to be understood that the configuration of FIG. 4 is not limited to the components and configuration of FIG. 4, but can include other or additional components (e.g., memory, signal processor, etc.) in multiple configurations according to various examples. Additionally, some or all of the components illustrated in FIG. 4 can be included in a single circuit, or can be divided among multiple circuits while remaining within the scope of the examples of the disclosure.

Figure 5A:
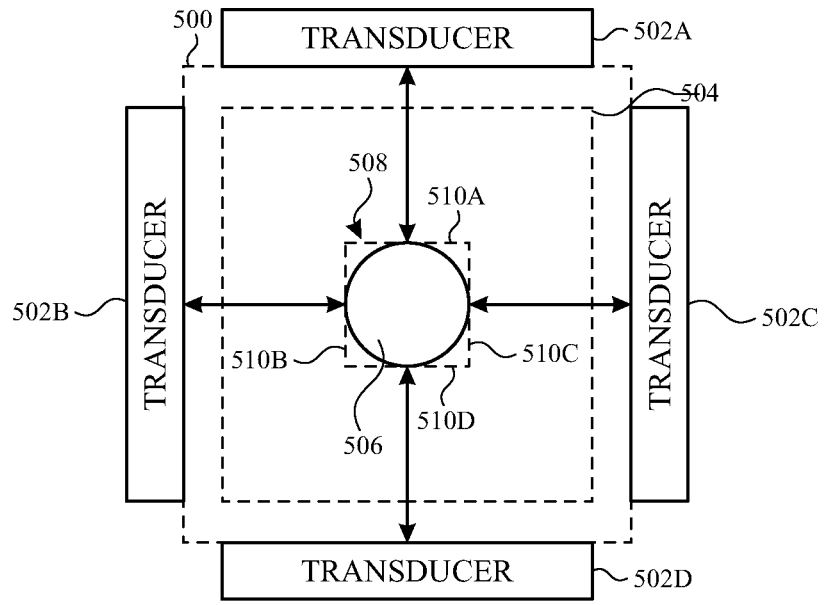
FIGS. 5A-5C illustrate exemplary system configurations and timing diagrams for acoustic touch sensing to determine position using time-of-flight measurements according to examples of the disclosure.
Figure 5B:
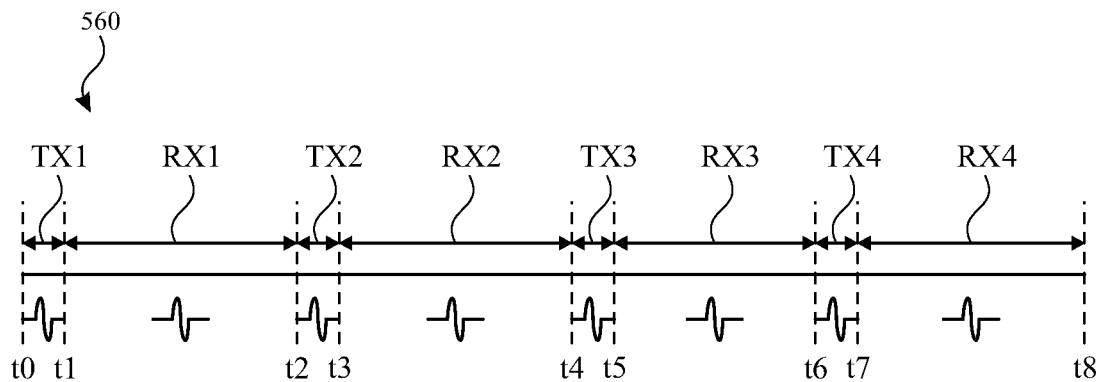
Figure 5C:
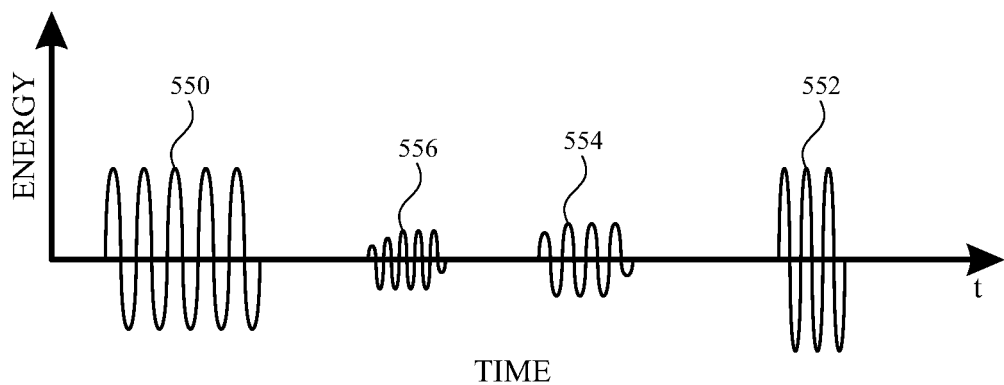

As described herein, various acoustic sensing techniques can be used to determine the position of an object touching a surface and/or its applied force on the surface. In some examples, one or more time-of-flight measurements can be performed using one or more acoustic transducers to determine boundaries of the position of the contacting object. FIGS. 5A-5C illustrate exemplary system configurations and timing diagrams for acoustic touch sensing to determine position using time-of-flight measurements according to examples of the disclosure. FIG. 5A illustrates an exemplary acoustic touch sensing system configuration using four acoustic transducers 502A-D mounted along (or otherwise coupled to) four edges of a surface 500 (e.g., corresponding to cover glass 312). Transducers 502A-D can be configured to generate acoustic waves (e.g., shear horizontal waves) and to receive the reflected acoustic waves. Propagation of shear horizontal waves can be unaffected by water on surface 500 because low viscosity fluids and gases (such as water and air) have a very low shear modulus, and therefore do not perturb the boundary conditions that affect wave propagation. Shear horizontal waves can be highly directional waves such that the active detection region (or active area) 504 can be effectively defined based on the position and dimensions of the acoustic transducers 502A-D. It should be understood, however, that active area can change based on the directionality property of the acoustic waves and the size and placement of acoustic transducers 502A-D. Additionally, it should be understood that although illustrated as transmit and receive transducers (i.e., transceivers), in some examples, the transmit and receive functions can be divided (e.g., between two transducers in proximity to one another, rather than one transmit and receive transducer).

The position of a touch 506 from an object in contact with surface 500 can be determined by calculating TOF measurements in a measurement cycle using each of acoustic transducers 502A-D. For example, in a first measurement step of the measurement cycle, acoustic transducer 502A can transmit an acoustic wave and receive reflections from the acoustic wave. When no object is present, the received reflection can be the reflection from the acoustic wave reaching the opposite edge of surface 500. However, when an object is touching surface 500 (e.g., corresponding to touch 506), a reflection corresponding to the object can be received before receiving the reflection from the opposite edge. Based on the received reflection corresponding to the object received at transducer 502A, the system can determine a distance to the edge (e.g., leading edge) of touch 506, marked by boundary line 510A. Similar measurements can be performed by transducers 502B, 502C and 502D to determine a distance to the remaining edges of touch 506, indicated by boundary lines 510B, 510C and 510D. Taken together, the measured distances as represented by boundary lines 510A-510D can form a bounding box 508. In some examples, based on the bounding box, the acoustic touch sensing system can determine the area of the touch (e.g., the area of the bounding box). Based on the bounding box, the acoustic touch sensing system can determine position of touch 506 (e.g., based on a centroid and/or area of the bounding box).

The acoustic touch sensing scan described with reference to FIG. 5A can correspond to the acoustic touch detection described above with reference to FIGS. 3A and 3B. Acoustic waves transmitted and received along or through cover glass 312 can be used to determine the position/location of an object touching the surface of cover glass 312.

FIG. 5B illustrates an exemplary timing diagram 560 for an acoustic touch sensing scan described in FIG. 5A according to examples of the disclosure. As illustrated in FIG. 5B, each of the transducers can transmit acoustic waves and then receive reflected waves in a series of measurement steps. For example, from t0 to t1 a first transducer (e.g., acoustic transducer 502A) can be stimulated, and reflections at the first transducer can be received from t1 to t2. From t2 to t3 a second transducer (e.g., acoustic transducer 502B) can be stimulated, and reflections at the second transducer can be received from t3 to t4. From t4 to t5 a third transducer (e.g., acoustic transducer 502C) can be stimulated, and reflections at the third transducer can be received from t5 to t6. From t6 to t7 a fourth transducer (e.g., acoustic transducer 502D) can be stimulated, and reflections at the fourth transducer can be received from t7 to t8. Although the transmit (Tx) and receive (Rx) functions are shown back-to-back in FIG. 5B for each transducer, in some examples, gaps can be included between Tx and Rx functions for a transducer (e.g., to minimize capturing portions of the transmitted wave at the receiver), and or between the Tx/Rx functions of two different transducers (such that acoustic energy and the transients caused by multiple reflections from a scan by one transducer does not impact a scan by a second transducer).

In some examples, unused transducers can be grounded (e.g., by multiplexers/demultiplexers in switching circuitry 404).

The distance between an object touching the surface and a transducer can be calculated based on TOF principles. The acoustic energy received by transducers can be used to determine a timing parameter indicative of a leading edge of a touch. The propagation rate of the acoustic wave through the material forming the surface can be a known relationship between distance and time. Taken together, the known relationship between distance and time and the timing parameter can be used to determine distance. FIG. 5C illustrates an exemplary timing diagram according to examples of the disclosure. FIG. 5C illustrates the transducer energy output versus time. Signal 550 can correspond to the acoustic energy at the transducer from the generation of the acoustic wave at a first edge of the surface. Signal 552 can correspond to the acoustic energy at the transducer received from the wave reflected off of a second edge opposite the first edge of the surface. Due to the known distance across the surface from the first edge to the opposite second edge and the known or measured propagation rate of the acoustic signal, the reflection off of the opposite edge of the surface occurs at a known time. Additionally, one or more objects (e.g., fingers) touching the surface can cause reflections of energy in the time between the generation of the wave and the edge reflection (i.e., between signals 550 and 552). For example, signals 554 and 556 can correspond to reflections of two objects touching the surface (or a leading and trailing edge of one object). It should be understood that signals 550-556 are exemplary and the actual shape of the energy received can be different in practice.

In some examples, the timing parameter can be a moment in time that can be derived from the reflected energy. For example, the time can refer to that time at which a threshold amplitude of a packet of the reflected energy is detected. In some examples, rather than a threshold amplitude, a threshold energy of the packet of reflected energy can be detected, and the time can refer to that time at which a threshold energy of the packet is detected. The threshold amplitude or threshold energy can indicate the leading edge of the object in contact with the surface. In some examples, the timing parameter can be a time range rather than a point in time. To improve the resolution of a TOF-based sensing scheme, the frequency of the ultrasonic wave and sampling rate of the receivers can be increased (e.g., so that receipt of the reflected wave can be localized to a narrower peak that can be more accurately correlated with a moment in time).

In some examples (e.g., as illustrated in FIG. 5B), transducers 502A-D can operate in a time multiplexed manner, such that each transducer transmits and receives an acoustic wave at a different time during a measurement cycle so that the waves from one transducer do not interfere with waves from another transducer. In other examples, the transducers can operate in parallel or partially in parallel in time. The signals from the respective transducers can then be distinguished based on different characteristics of the signals (e.g., different frequencies, phases and/or amplitudes).

Although four transducers are illustrated in FIG. 5A, in some examples, fewer transducers can be used. For example, when using an input object with known dimensions (e.g., stylus or a size-characterized finger), as few as two transducers mounted along two perpendicular edges can be used. Based on the known dimensions of an object, a bounding box 518 can be formed by adding the known dimensions of the object to the first and second distances, for example.

Additionally, although FIG. 5A illustrates detection of a single object (e.g., single touch), in some examples, the acoustic touch sensing system can use more transducers and be configured to detect multiple touches (e.g., by replacing each of transducers 502A-D with multiple smaller transducers).

TOF schemes described with reference to FIGS. 5A-5C can provide for touch sensing capability using a limited number of transducers (e.g., as compared with a number of electrodes/touch nodes of a capacitive touch sensing system) which can simplify the transmitting and receiving electronics, and can reduce time and memory requirements for processing. Although FIGS. 5A-5C discuss using a bounding box based on TOF measurements to determine position of an object, in other examples, different methods can be used, including applying matched filtering to a known transmitted ultrasonic pulse shape, and using a center of mass calculation on the filtered output (e.g., instead of a centroid).

Figure 6A:
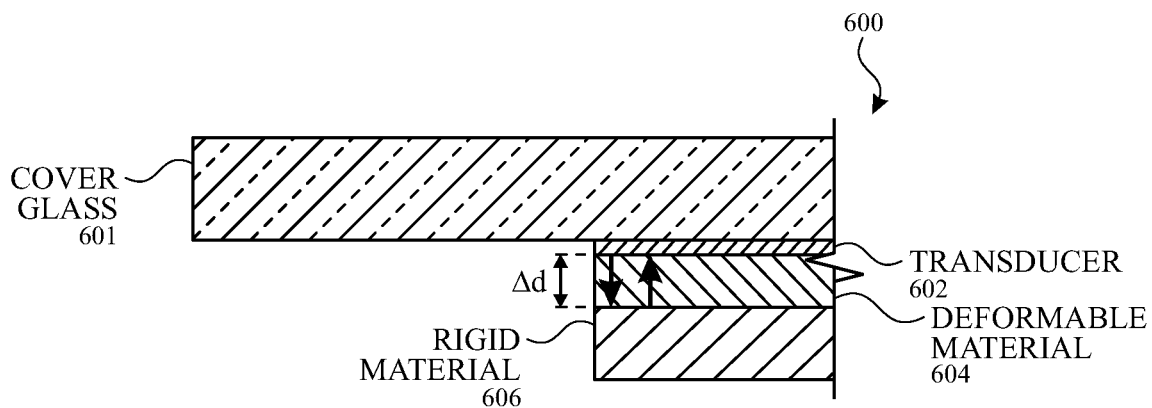
FIGS. 6A-6D illustrate exemplary system configurations and timing diagrams for acoustic force sensing to determine an amount of applied force using a time-of-flight measurement according to examples of the disclosure.

In some examples, a time-of-flight measurement can be performed using one or more acoustic transducers to determine an amount of force applied by an object touching a surface. FIGS. 6A-6D illustrate exemplary system configurations and timing diagrams for acoustic force sensing to determine an amount of applied force using a time-of-flight measurement according to examples of the disclosure. FIG. 6A illustrates an exemplary acoustic force sensing system stack-up 600 including a deformable material 604 in between two rigid surfaces. One of the rigid surfaces can be a cover glass 601 (e.g., corresponding to cover glass 312). The second of the rigid surfaces can be a portion of a device housing, for example (e.g., corresponding to housing 202). An acoustic transducer 602 (e.g., corresponding to transducer 314) can mounted to (or otherwise coupled to) the deformable material 604. For example, as illustrated in FIG. 6A, transducer 602 can be disposed between cover glass 601 and deformable material 604. Transducer 602 can be configured to generate acoustic waves (e.g., shear horizontal waves) and to receive the reflected acoustic waves from the discontinuity at the edge between deformable material 604 and rigid material 606. It should be understood that although illustrated as transmit and receive transducers (i.e., transceivers), in some examples, the transmit and receive functions can be divided (e.g., between two transducers in proximity to one another, rather than one transmit and receive transducer). Shear horizontal waves can be highly directional waves such that the time of flight can be effectively measure the thickness of the deformable material. A baseline thickness (or time-of-flight) can be determined for a no-force condition, such that changes in thickness (Δd) (or time-of-flight) can be measured. Changes in thickness or time-of-flight can correspond to amount of applied force.

Figure 6B:
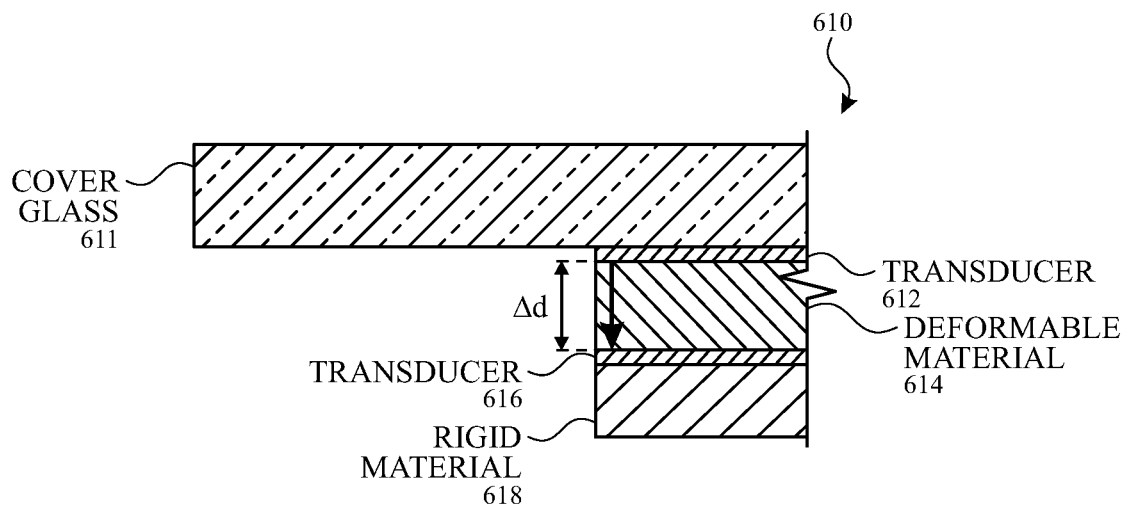
Figure 6C:
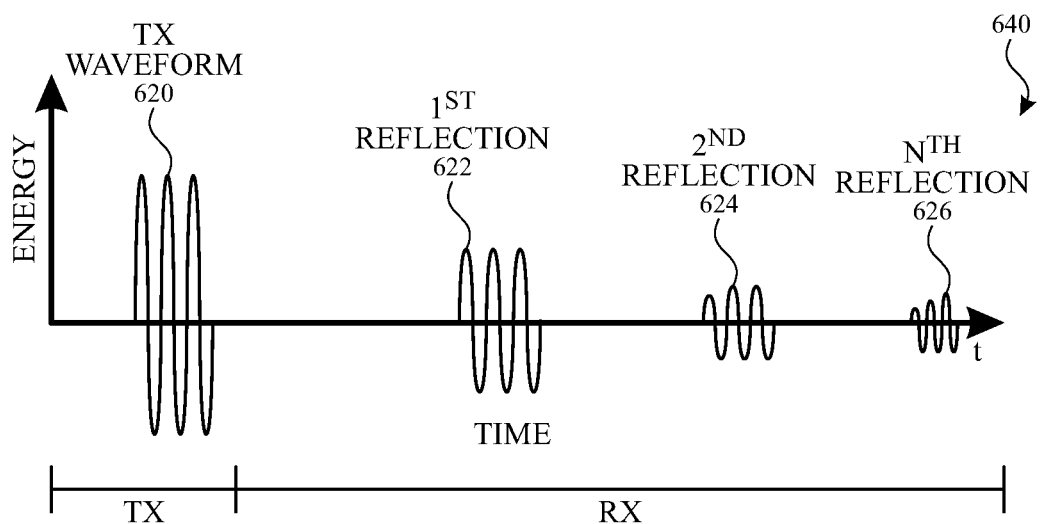
Figure 6D:
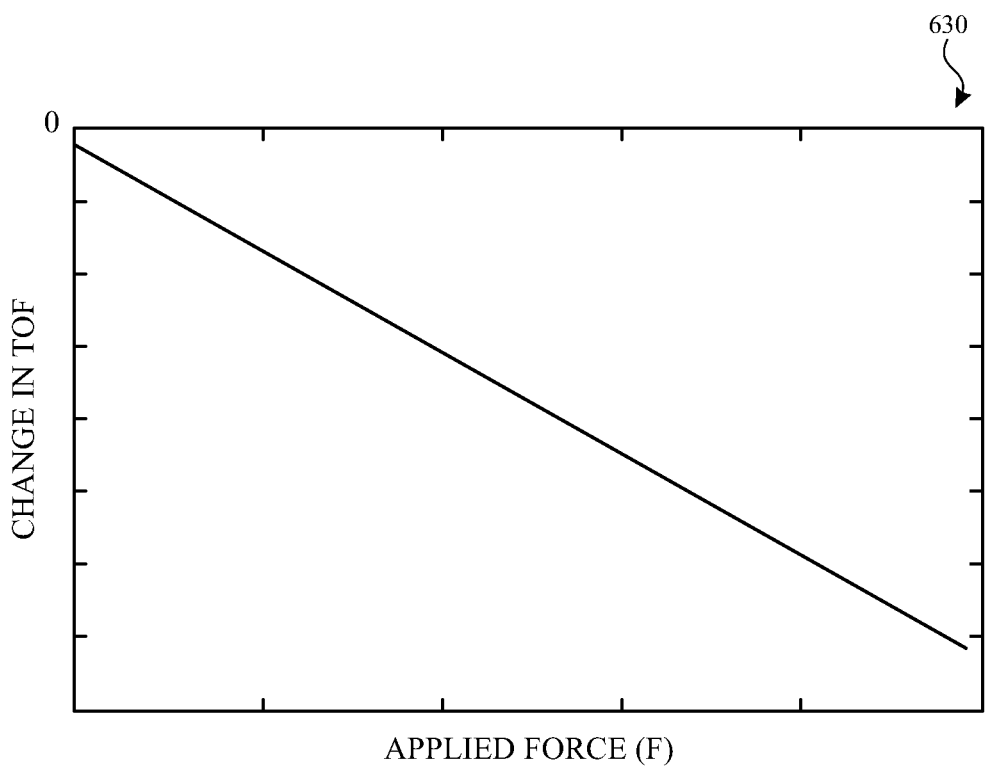

For example, plot 630 of FIG. 6D illustrates an exemplary relationship between time-of-flight (or thickness) and applied force according to examples of the disclosure. For example, in a steady state condition, where there is no change in time-of-flight across the deformable material 604, the applied force can be zero. As the time-of flight varies (e.g., decreases), the applied force can vary as well (e.g., increase). Plot 630 illustrates a linear relationship between TOF and force, but in some examples, the relationship can be non-linear. The relationship between TOF and applied force can be empirically determined (e.g., at calibration) using a correlation. In some examples, the calibration can include linearizing the inferred applied force and normalizing the measurements (e.g., removing gain and offset errors). In some examples, the Young's modulus of the deformable material can be selected below a threshold to allow a small applied force to introduce a detectable normal deformation.

FIG. 6B illustrates another exemplary acoustic force sensing system stack-up 610 including a deformable material 614 in between two rigid surfaces (e.g., between cover glass 611 and rigid material 618). An acoustic transducer 612 can mounted to (or otherwise coupled to) one side of deformable material 614, and a second acoustic transducer 616 can be mounted to (or otherwise coupled to) a second side (opposite the first side) of deformable material 614. For example, as illustrated in FIG. 6B, transducer 612 can be disposed between cover glass 611 and deformable material 614 and transducer 616 can be disposed between rigid material 618 and deformable material 614. Transducer 612 can be configured to generate acoustic waves (e.g., shear horizontal waves) and transducer 616 can be configured to receive the acoustic waves. The configuration of transducers in stack-up 610 can be referred to as a "pitch-catch" configuration in which one transducer on one side of a material transmits acoustic waves to a second transducer on an opposite side, rather than relying on a reflected acoustic wave. The time-of-flight between the time of transmission and the time of receipt of the acoustic wave can be measured to determine the amount of applied force in a similar manner as discussed above with respect to FIG. 6D.

FIG. 6C illustrates an exemplary timing diagram 640 according to examples of the disclosure. FIG. 6C illustrates the transducer energy output versus time. Signal 620 can correspond to the acoustic energy at transducer 602 from the generation of the acoustic wave at a first edge of the deformable material 604. Signal 622 can correspond to the acoustic energy at transducer 602 received from a first wave reflected off of a second edge, opposite the first edge, of the deformable material 604. Due to the known distance across the surface from the first edge to the opposite, second edge (under steady-state) and the known or measured propagation rate of the acoustic signal, the reflection off of the opposite edge of the surface occurs at a known time. In some examples, rather than using the first reflection, a different reflection of the acoustic energy can be used to determine time of flight. For example, signal 624 can refer to the acoustic energy at transducer 602 received from a second wave reflected off of the second edge of deformable material 604 (e.g., signal 622 can reflect off of the first side of 604 deformable material and reflect a second time off of the second edge of deformable material 604). In some examples, signal 556 can correspond to an integer number reflection after repeated reflections between the two edges of deformable material 604. It should be understood that signals 620-626 are exemplary and the actual shape of the energy received can be different in practice. In some examples, the choice of which reflection to use for the time-of-flight calculation for force sensing can be a function of the thickness of the material and the frequency of the transmitted wave.

In some examples, rather than using time-of-flight measurements to determine thickness of the deformable material, other methods can be used. For example, transducer 602 can stimulate the deformable material 604 with ultrasonic waves at a resonant frequency. As the deformable material 604 changes in thickness due to applied force, the resonant frequency can shift. The change in resonant frequency can be measured to determine the applied force. Using a resonant frequency can result in better signal-to-noise ratio (SNR) performance and better accuracy as compared with the time-of-flight method.

As described above with reference to FIGS. 3A-3B, in some examples acoustic touch and force sensing can both be performed. In some examples, the two operations can be time-multiplexed. Transducers 502A-D (e.g., one of which can correspond to transducer 314) can generate transmit waveforms and receive reflections to determine a location/position of touch on a surface (e.g., cover glass 312) as described with reference to timing diagram 560 during an acoustic touch sensing phase. Transducer 602 (e.g., corresponding to transducer 314) can generate a transmit waveform and receive a reflection to determine an amount of force applied to the surface (e.g., cover glass 312) as described with reference to timing diagram 640 during an acoustic force sensing phase.

Figure 7:
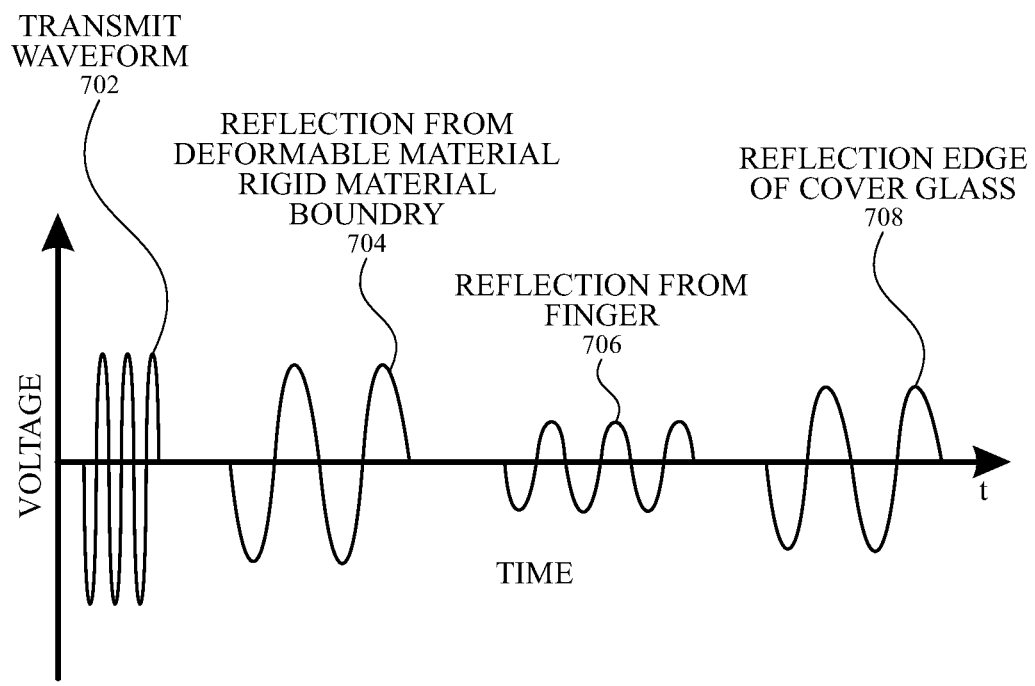
FIG. 7 illustrates a timing diagram for acoustic touch and force sensing according to examples of the disclosure.

In some examples, the acoustic touch and force sensing can be performed using transmit waveforms generated at the same time. FIG. 7 illustrates a timing diagram 700 for acoustic touch and force sensing according to examples of the disclosure. Signal 702 can correspond to a transmit waveform generated by a transducer (e.g., transducer 314) to simultaneously propagate in deformable material 316 and in cover glass 312. Signal 704 can correspond to a reflection (e.g., a first reflection) from the boundary between deformable material 316 and rigid material 318. Signal 706 can correspond to a reflection from an object (e.g., a finger) on the surface of cover glass 312. Signal 708 can correspond to a reflection from the opposite edge of cover glass 312. Based on the timing of signal 704, the acoustic touch and force sensing circuitry can measure a time-of-flight across the deformable material. Based on the timing of signals 706 and/or 708, the acoustic touch and force sensing circuitry can measure the time-of-flight along the surface of cover glass 312 to an object (or an edge when no object is contacting the cover glass). The time-of-flight measurements for touch can be repeated for each transducer 502A-D (e.g., four times) to determine the location/position of the object. The time-of-flight measurements can optionally be repeated (e.g., for each of transducers 502A-D) to measure force applied to the cover glass 312. In some examples, an average force measurement can be determined from repeated force measurements. In some examples, the repeated measurements can indicate relative force applied to different edges of the cover glass. In some examples, the measurements and different edges of the cover glass can be combined to determine an applied force.

Performing acoustic touch and force sensing using one or more shared transducers can provide for both touch and force information with one set of ultrasonic transducers (e.g., 502A-D) and one sensing circuit (e.g., acoustic touch and/or force sensing circuit 400). As a result, the touch and force sensing systems can potentially be reduced in size, in complexity and in power consumption.

Performance of ultrasonic touch and force sensing using ultrasonic waves transmitted into deformable material 316 and cover glass 312 at the same time can depend, in some examples, on the separation between the transmitted ultrasonic waves for touch and for force. For example, FIG. 7 illustrates signals 704 and 706 corresponding to force and touch reflections, respectively, that can be well separated in time (e.g., such that the force reflections arrive in a dead zone for touch reflections). In practice, an integration of acoustic touch and force sensing can subject each measurement (touch/force) to noise/interference from the other measurement (force/touch).

In some examples, interference between ultrasonic waves in the deformable material and the cover glass can be reduced or eliminated based on the design of the deformable material. For example, the deformable material can be selected to have an ultrasonic attenuation property above a threshold, such that the signal in the deformable material can be damped before reflections in the cover glass are received. In some examples, the thickness of the deformable material can be selected to allow for one or more reflections through the deformable material to be received before reflections from the cover glass. In some examples, the reflection (e.g., first, second, nth) through the deformable material can be selected such that the reflection of interest occurs between reflections from the cover glass can be received. In some examples, an absorbent material can be coupled to the deformable material to further dampen ringing of ultrasonic signals in the deformable material. In some examples (e.g., when force and touch ultrasonic waves do not overlap in time), more than one of the transducers (and in some cases all of the transducers) can transmit a wave and receive the reflections at the same time to measure the force applied. Then, individual transducers can transmit waves and receive reflected waves sequentially for touch detection.

Processing data from acoustic touch and/or force detection scans can be performed by different processing circuits of an acoustic touch and/or force sensing system. For example, as described above with respect to FIG. 4, an electronic device can include an acoustic touch and force sensing circuit 400 and a processor SoC 430 (e.g., including a host processor 432 and an auxiliary processor/sub-processor 434). As described in detail below, processing of touch and/or force data can be performed by one or more of these processors/circuits, according to various examples. For example, according to the various examples, the processing of touch and/or force data can be performed by the acoustic touch and force sensing circuit, by the processor SoC, or partially by the acoustic touch and force sensing circuit and partially by the processor SoC. The description of the data processing below first addresses touch data processing and then addresses force data processing.

As described below in more detail, in some examples, raw touch sensing data can be transmitted to a processor SoC to be processed by one or more processors of processor SoC (e.g., host processor 432 and an auxiliary processor/sub-processor 434). In some examples, the touch sensing data can be processed in part by analog processing circuits (e.g., as described above with reference to FIG. 4) and/or digital processing circuits (e.g., averaging of ADC outputs) of an acoustic touch (and/or force) sensing circuit. The partially processed touch sensing data can be transmitted to the processor SoC for further processing. In some examples, an acoustic touch (and/or force) sensing circuit can process the touch sensing data and supply the processor SoC with high level touch information (e.g., the centroid of the touch). The acoustic touch and force sensing circuit can be referred to as an acoustic touch sensing circuit to simplify the description of touch data processing among the various processors and circuits below.

In some examples, an auxiliary processor (e.g., auxiliary processor 434) can be a low power processor that can remain active even when a host processor (e.g., host processor 432) can be idle and/or powered down. An acoustic touch sensing circuit (e.g., corresponding to acoustic touch and force sensing circuit 400) can perform acoustic touch sensing scans and generate acoustic touch data. The acoustic touch data can be transferred to the auxiliary processor for processing according one or more touch sensing algorithms. For example, in a low-power mode, the acoustic touch sensing circuit can perform a low power touch detection scan. The low power touch detection scan can include receiving reflections from a barrier (e.g., surface edge) opposite a transducer for one or more transducers (e.g., from one transducer rather than the four illustrated in FIG. 5A). The acoustic touch data corresponding to the received reflections from the barrier(s) can be transmitted to the auxiliary processor via a communication channel and processed by the auxiliary processor to determine the presence or absence of an object touching the sensing surface. Once an object is detected touching the sensing surface, the system can transition from the low-power mode to an active mode, and the acoustic touch sensing circuit can perform an active mode touch detection scan. Additionally or alternatively, in some examples, a low power force detection scheme (e.g., performed using one transducer) can be used in the low-power mode. The active mode touch detection scan can include, for example, scanning the sensing surface as described above with respect to FIG. 5A. The acoustic touch data corresponding to the active mode touch detection scan can be transmitted to the auxiliary processor via a communication channel and processed by the auxiliary processor to determine the location of the object. In some examples, determining the location of the object can include determining the area and/or centroid of the object. The host processor can receive the location of the object touching the surface from the auxiliary processor and perform an action based thereon.

In some examples, the acoustic touch sensing circuit can perform some processing before sending acoustic touch data to the auxiliary processor. For example, to reduce the requirements for the data communication channel between the acoustic touch sensing circuit and the auxiliary processor, the acoustic touch sensing circuit can include a digital signal processor which can average samples from the ADC output. Averaging the samples can compress the amount of acoustic touch data to be communicated to the auxiliary processor. The averaging performed by the digital signal processor can be controlled by control circuitry (e.g., acoustic scan control logic 422) in the acoustic touch sensing circuit. In some examples, the transmit signal can be coded to allow for averaging without a time penalty. Although averaging is described, in other examples, other forms of processing can be applied to the acoustic touch data before transferring the acoustic touch data.

In some examples, the data communication channel between the acoustic touch sensing circuit and the auxiliary processor can be a serial bus, such as a serial peripheral interface (SPI) bus. In addition, the communication channel can be bidirectional so information can also be transmitted from the auxiliary processor to the acoustic touch sensing circuit (e.g., register information used for programming acoustic touch sensing circuit). Additionally, the acoustic touch sensing circuit can receive one or more synchronization signals from the auxiliary processor configured to synchronize acoustic touch sensing scanning operations by the acoustic touch sensing circuit. Additionally, the acoustic touch sensing circuit can generate an interrupt signal configured to provide for proper acoustic data transfer from the acoustic touch sensing circuit to the auxiliary processor. In some examples, the detection and the processing for the low power touch detection mode can be done on-chip (e.g., by the acoustic touch sensing circuit). In these examples, interrupt signals can be used to indicate (e.g., to the auxiliary processor) when a finger is detected on the surface of the device.

In some examples, the acoustic touch sensing circuit can perform acoustic touch sensing scans and generate acoustic touch data. The acoustic touch data can be transferred to the auxiliary processor and/or the host processor for processing according one or more touch sensing algorithms. For example, in a low-power mode, the acoustic touch sensing circuit can perform a low power detection scan as described herein. The acoustic touch data can be transmitted to the auxiliary processor via a communication channel and processed by the auxiliary processor to determine the presence or absence of an object touching the sensing surface. Once an object is detected touching the sensing surface, the system can transition from the low-power mode to an active mode, and the acoustic touch sensing circuit can perform an active mode detection scan as described herein. The acoustic touch data corresponding to the active mode detection scan can be transmitted to the host processor via a high-speed communication channel and processed by the host processor to determine the location of the object. In some examples, the data transfer via the high-speed communication channel can be done in a burst mode. In some examples, determining the location of the object can include determining the area and/or centroid of the object. The host processor can perform an action based on the location.

In some examples, the high-speed communication channel can provide sufficient bandwidth to transfer raw acoustic touch data to the host processor, without requiring processing by the acoustic touch sensing circuit. In some examples, the high-speed communication channel can include circuitry to serialize the acoustic touch data (e.g., a serializer) and transfer the serialized acoustic touch data using a low-voltage differential signal (LVDS) communication circuit. In some examples, other I/O blocks can be utilized for the data transfer. In some examples, the acoustic touch sensing circuit can perform some processing (e.g., averaging) before sending acoustic touch data to the host processor. In some examples, the amount of data resulting from a low power detection scan can be relatively small (compared with an active mode detection scan) such that the raw acoustic touch data can be transferred to the auxiliary processor without requiring processing by the acoustic touch sensing circuit. In some examples, the acoustic touch sensing circuit can perform some processing (e.g., averaging) before sending acoustic touch data to the host processor. The other aspects of operation (e.g., data transfer from the auxiliary processor to acoustic touch sensing circuit, synchronization signals and interrupt signals, etc.) can be the same as or similar to the description above. Although described above as processing acoustic touch data from low power detection scans in the auxiliary processor and acoustic touch data from active mode detection scans in the host processor, it should be understood that in some examples, the host processor can perform processing for both low power detection scans and active mode detection scans.

In some examples, the acoustic touch sensing circuit can include an acoustic touch digital signal processor (DSP). In some examples, the acoustic touch DSP can be a separate chip coupled between the acoustic touch sensing circuit and the processor SoC. The acoustic touch sensing circuit can perform acoustic touch sensing scans and generate acoustic touch data. The acoustic touch data can be transferred to the acoustic touch DSP for processing according one or more touch sensing algorithms. For example, in a low-power mode, the acoustic touch sensing circuit can perform a low power detection scan as described herein. The acoustic touch data can be transmitted to the acoustic touch DSP via a communication channel and processed by the acoustic touch DSP to determine the presence or absence of an object touching the sensing surface. In some examples, the acoustic touch sensing circuit can process the acoustic touch data to determine the presence or absence of the object touching the surface. Once an object is detected touching the sensing surface, the system can transition from the low-power mode to an active mode, and the acoustic touch sensing circuit can perform an active mode detection scan as described herein. The acoustic touch data corresponding to the active mode detection scan can be transmitted to the acoustic touch DSP via a high-speed communication channel and processed by the acoustic touch DSP to determine the location of the object. In some examples, determining the location of the object can include determining the area and/or centroid of the object. The location can be passed to the auxiliary processor and/or the host processor, and the auxiliary processor and/or the host processor can perform an action based on the location.

In some examples, the high-speed communication channel can provide sufficient bandwidth to transfer raw acoustic touch data to the acoustic touch DSP, without requiring processing by the acoustic touch sensing circuit. In some examples, the high-speed communication channel can include circuitry to serialize the acoustic touch data (e.g., CMOS serializer) and transfer the serialized acoustic touch data using a low-voltage differential signal (LVDS) communication circuit. In some examples, the acoustic touch sensing circuit can perform some processing (e.g., averaging) before sending acoustic touch data to the acoustic touch DSP. In some examples, the amount of data resulting from a low power detection scan can be relatively small (compared with an active mode detection scan) such that the raw acoustic touch data can be transferred to the acoustic touch DSP without requiring processing by the acoustic touch sensing circuit. In some examples, the data from low power detection scans can also be transferred to the acoustic touch DSP via the high-speed communication channel.

Data transfer from the auxiliary processor to the acoustic touch sensing circuit, synchronization signals and interrupt signals can be the same as or similar to the description above, except that, in some examples, the various signals and data can pass through the acoustic touch DSP.

In some examples, the acoustic touch sensing circuit can perform acoustic touch sensing scans and generate acoustic touch data. The acoustic touch data (e.g., for a low-power detection scan) can be processed by the acoustic touch sensing circuit to determine the presence or absence of the object touching the sensing surface. Once an object is detected touching the sensing surface, the system can transition from the low-power mode to an active mode, and the acoustic touch sensing circuit can perform an active mode detection scan as described herein. The acoustic touch data corresponding to the active mode detection scan can be processed by the acoustic touch sensing circuit to determine the location of the object. In some examples, determining the location of the object can include determining the area and/or centroid of the object. The presence and/or location of the object can be passed to the auxiliary processor and/or the host processor, and the auxiliary processor and/or the host processor can perform an action based on the presence and/or location of the object.

In some examples, the amount of post-processing information (e.g., centroid) can be relatively small (compared with raw acoustic touch data) such that the information can be transferred to the auxiliary processor and/or the host processor via a serial communication bus (e.g., SPI), without a high-speed data channel.

Data transfer from the auxiliary processor to acoustic touch sensing circuit, synchronization signals and interrupt signals can be the same as or similar to the description above. In some examples, separate data communication channels can be provided between the acoustic touch sensing circuit and each of the auxiliary processor and the host processor. In some examples, the data communication channel can be a shared bus (e.g., shared SPI bus) between the acoustic touch sensing circuit and each of the auxiliary processor and the host processor.

The acoustic touch sensing circuit, as described herein, can be powered down or put in a low power state when not in use. In some examples, the acoustic touch sensing circuit can be on only during acoustic touch detection scans (e.g., during Tx and Rx operations). In some examples, the acoustic touch sensing circuit can be on in a low power state at all time (e.g., running at a low frame rate, performing a low power detection scan), and can transition into an active mode state when an object is detected.

In a similar manner, processing force data can be performed by different processing circuits of an acoustic touch and/or force sensing system. For example, as described above with respect to FIG. 4, an electronic device can include an acoustic touch and force sensing circuit 400 and a processor SoC 430 (e.g., including a host processor 432 and an auxiliary processor/sub-processor 434). In some examples, force detection circuit 424 can duplicate (or reuse) the touch sensing circuitry of FIG. 4 to collect and/or processes force data. In some examples, raw force sensing data can be transmitted by a force detection circuit 424 to a processor SoC to be processed by one or more processors of processor SoC (e.g., host processor 432 and an auxiliary processor/sub-processor 434). In some examples, the force sensing data can be processed in part by analog processing circuits and/or digital processing circuits of an acoustic force (and/or touch) sensing circuit. The partially processed force sensing data can be transmitted to the processor SoC for further processing. In some examples, an acoustic force (and/or touch) sensing circuit can process the force sensing data and supply the processor SoC with force information (e.g., an amount of applied force). Additionally, a low power force detection scan can be used in addition to or in place of a low power touch detection scan described above (e.g., to cause the device to exit a low power or idle mode). The low power force detection scan can include, for example, determining force applied to the surface using fewer than all transducers (e.g., one transducer).

Figure 8A:
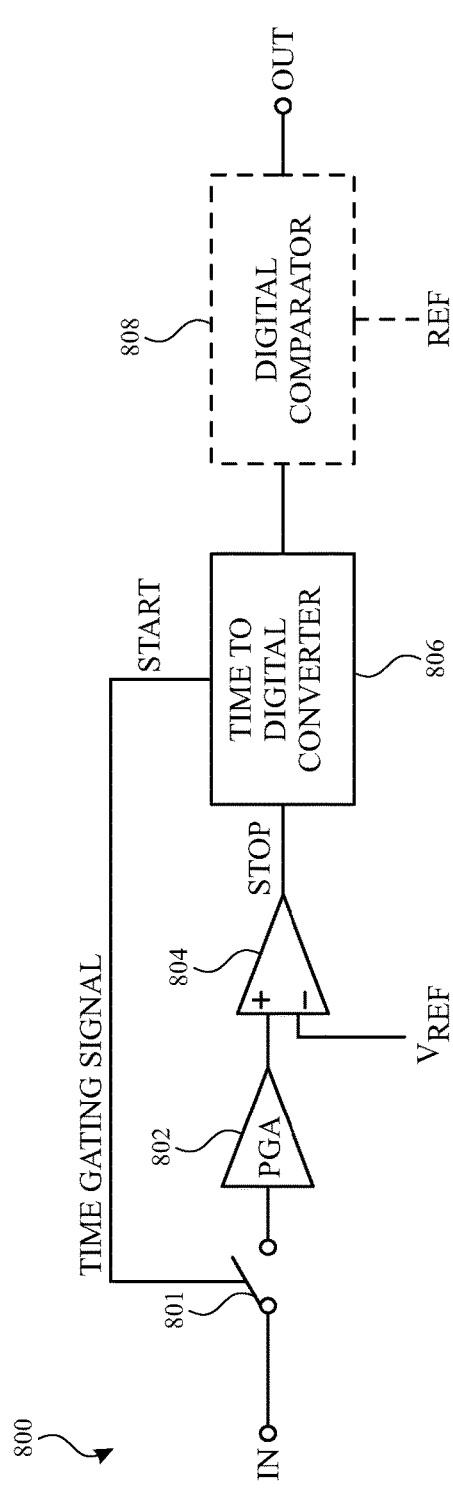
FIGS. 8A-C illustrate exemplary circuits for force detection according to examples of the disclosure.
Figure 8B:
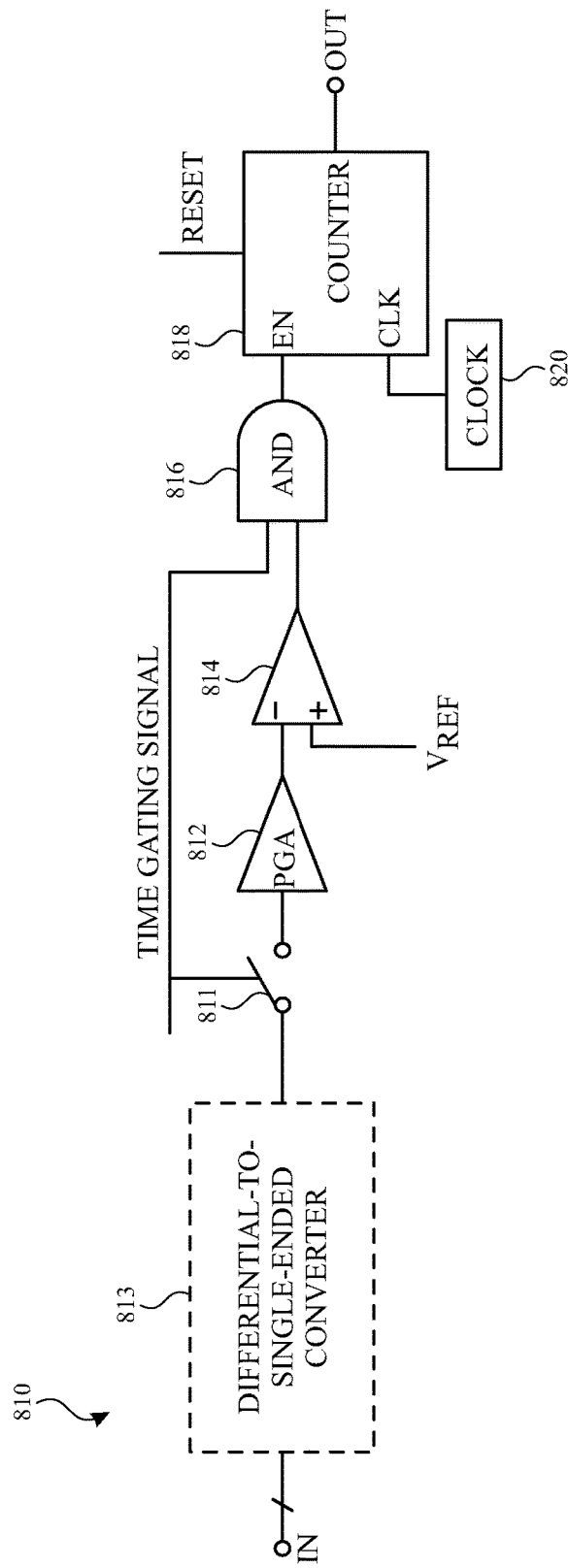
Figure 8C:
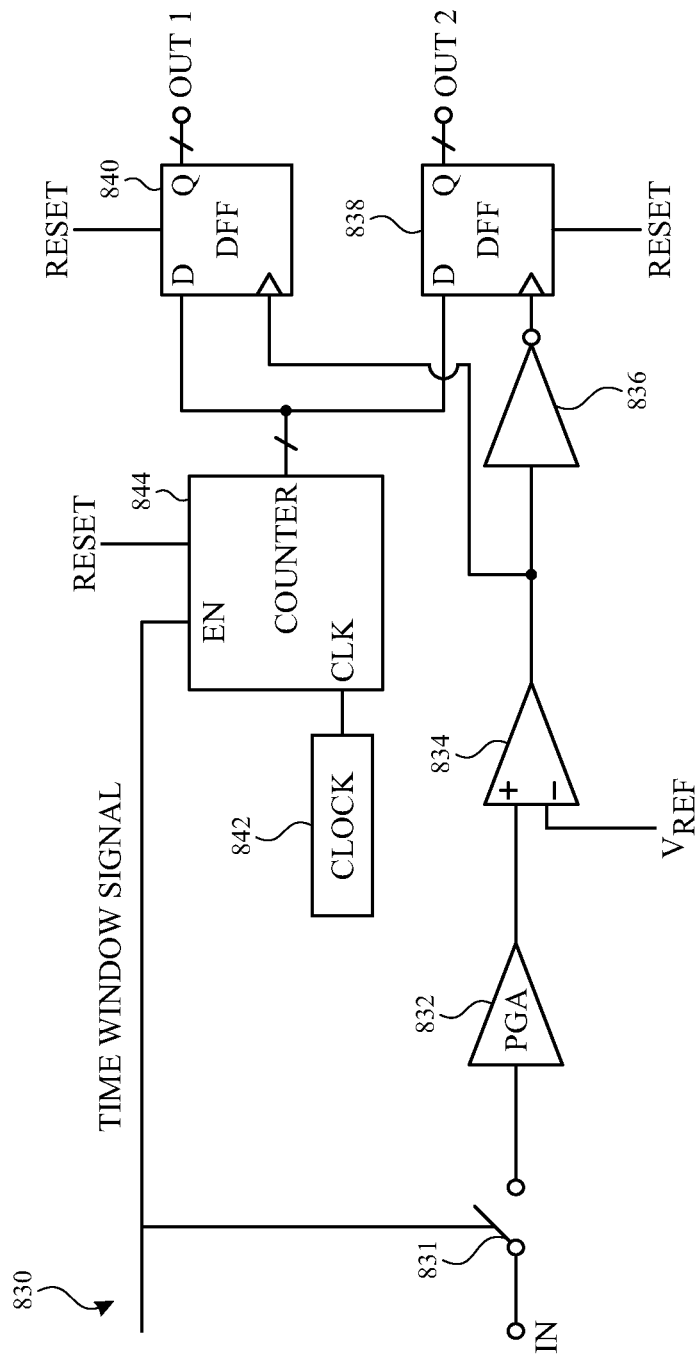

In some examples, force detection circuit 424 can be simplified with respect to touch detection circuitry to reduce power and hardware requirements. FIGS. 8A-C illustrate exemplary circuits for force detection according to examples of the disclosure. It should be understood that the circuits of FIGS. 8A-C are exemplary, and other circuits can be used for force sensing. Additionally, although the circuits of FIGS. 8A-C can be single-ended circuits, partially or fully differential circuits can also be used. FIG. 8A illustrates an exemplary force detection circuit 800 according to examples of the disclosure. Force detection circuit 800 can include a gate (or switch) 801, a programmable gain amplifier (PGA) 802, an analog comparator 804, a time-to-digital signal converter 806 and, optionally, a digital comparator 808. A gate timing signal can be used to activate gate 801 (e.g., close a switch) between the input from the transducer used to measure force and the PGA 802. The gate timing signal can also be used to start timing by time-to-digital signal converter 806. The output of PGA 802 can be input into comparator 804, which can be used for finding a reliable transition edge of the receive signal. When the comparator transitions, the timing by the time-to-digital signal converter 806 stops. The digital output (e.g., a digitized number) of the time-to-digital signal converter 806, which can be proportional to the applied force, can be sent from the acoustic force (and/or touch) sensing circuit to a processor. In some examples, an optional digital comparator 808 can be used to transmit force reading exceeding a threshold amount of force. In some examples, a time window can be selected and all or some of the threshold crossing time stamps can be sent from the acoustic force (and/or touch) sensing circuit to the processor SoC, and the time stamps can be used to detect the time-of-flight change (and therefore the force applied). In some examples, the digitized data for a given time window can be sampled at two different times (one time without and one time with the force applied) and the correlation between the two time-of-flight measurements can be used to determine the change in time-of-flight (and therefore applied force).

FIG. 8B illustrates an exemplary force detection circuit 810 according to examples of the disclosure. Force detection circuit 810 can include a gate (or switch) 811, a PGA 812, a differential-to-single-ended converter circuit 812, an analog comparator 814, a logical AND gate 816, a digital counter 818 and a clock 820. A gate timing signal can be used to activate gate 811 (e.g., close a switch) between the input from the transducer used to measure force and the differential-to-single-ended converter circuit 812. The single-ended output of the differential-to-single-ended converter circuit 812 can be provided to PGA 812. The gate timing signal can also be output to logical AND gate 816. When the gate timing signal and the output of analog comparator 814 can both be high, counter 818 can start timing based on a clock signal from clock 820. The output of PGA 812 can be input into comparator 814, which can be used for finding a reliable transition edge of the receive signal. When the comparator transitions, the timing by the counter 818 can be stopped. The digital output (e.g., a digitized number) from counter 818, which can be proportional to the applied force, can be sent from the acoustic force (and/or touch) sensing circuit to a processor.

It should be understood exemplary force detection circuits 800 and 810 can be reconfigured to output the threshold crossing on a rising edge, a falling edge or both edges of the received signal. Force detection circuits 800 and 810 as illustrated in FIGS. 8A and 8B output the rising edge threshold crossings after each rising edge of the time gating signal. In some examples, threshold crossings can be detected on both rising and falling edges of the input signal. FIG. 8C illustrates an exemplary force detection circuit 830 according to examples of the disclosure. Force detection circuit 830 can include a gate (or switch) 831, a PGA 832, an analog comparator 834, a logical inverter 836, n-bit D-Flip Flops 838 and 840, a clock 842 and a digital counter 844. A reset signal can be used to reset D-Flip Flops 838 and 840. A time window signal can be used to activate gate 831 between the input from the transducer used to measure force and PGA 832. The time window signal can also enable counter 844 to start timing based on a clock signal from clock 842. The output of PGA 832 can be input into comparator 834, which can be used for finding reliable transition edges of the receive signal. The output of comparator 834 can be used to clock D-Flip Flops 838 and 840. D-Flip Flop 838 can be clocked with an inverted version of the comparator output to detect the opposite edge. D-Flip Flops 838 and 840 can receive the output of counter 844 as data inputs, and output the count of counter 844 for a rising and falling edge transition, respectively. The digital outputs (e.g., digitized numbers) of D-Flip Flops 838 and 840, which can be proportional to the applied force, can be sent from the acoustic force (and/or touch) sensing circuit to a processor.

Figure 9:
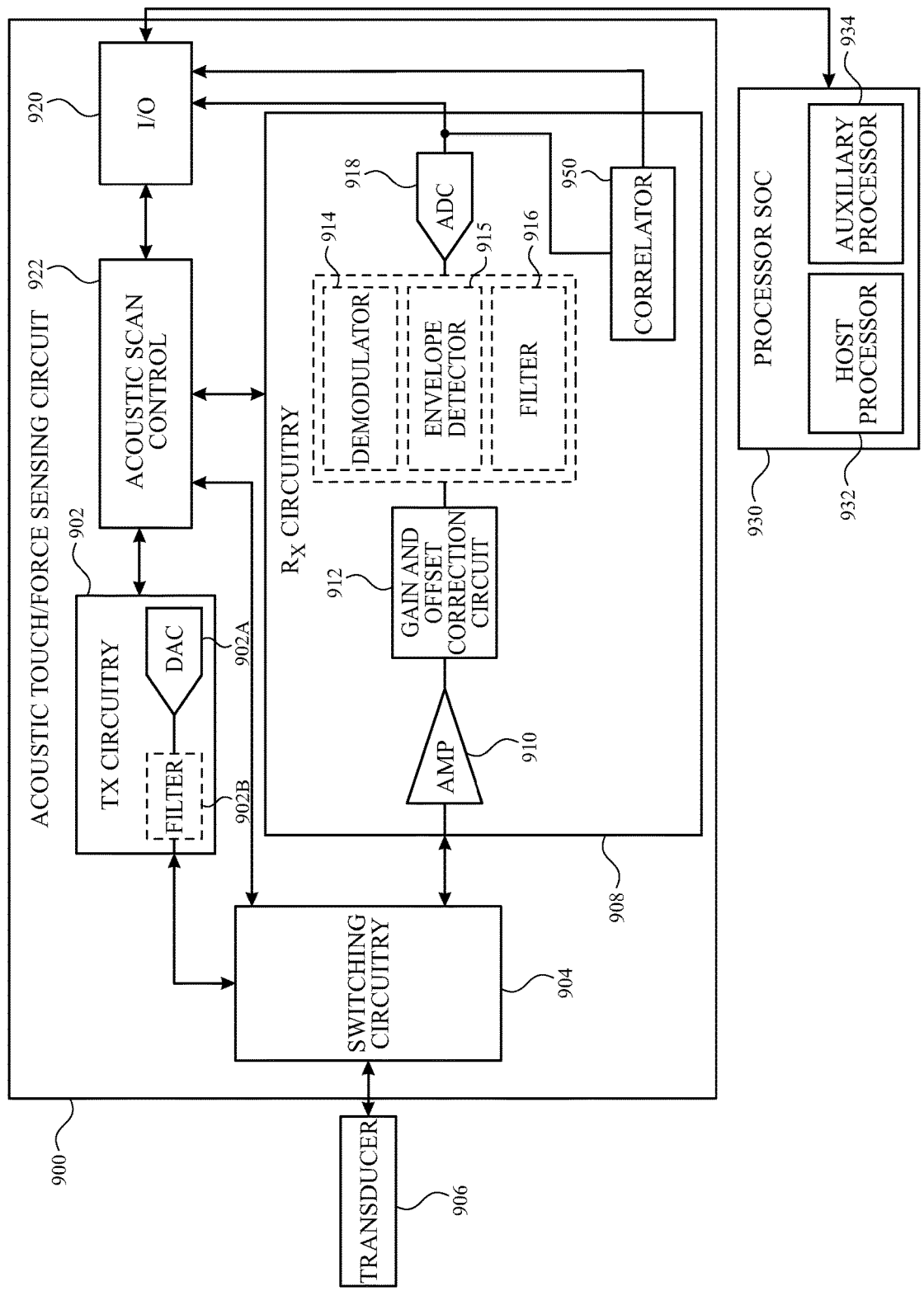
FIG. 9 illustrates an exemplary configuration of an acoustic touch and/or force sensing circuit according to examples of the disclosure.

As discussed above, in some examples, the force data can be sampled at two different times (one time without and one time with the force applied) and the correlation between the two time-of-flight measurements can be used to determine the change in time-of-flight (and therefore applied force). FIG. 9 illustrates an exemplary configuration of an acoustic touch and/or force sensing circuit according to examples of the disclosure. The circuitry illustrated in FIG. 9 can correspond to the corresponding circuitry illustrated in FIG. 4, implemented to detect force, for example. Unlike FIG. 4, the acoustic touch and/or force sensing circuitry of FIG. 9 can include a correlator 950. Correlator 950 can be a digital correlator configured to correlate force data for a no-applied force case (e.g., baseline) with measured force data that may include an applied force. The correlation can indicate a change in the time of flight (or resonance) in the deformable material, and thereby indicate an applied force.

Figure 10A:
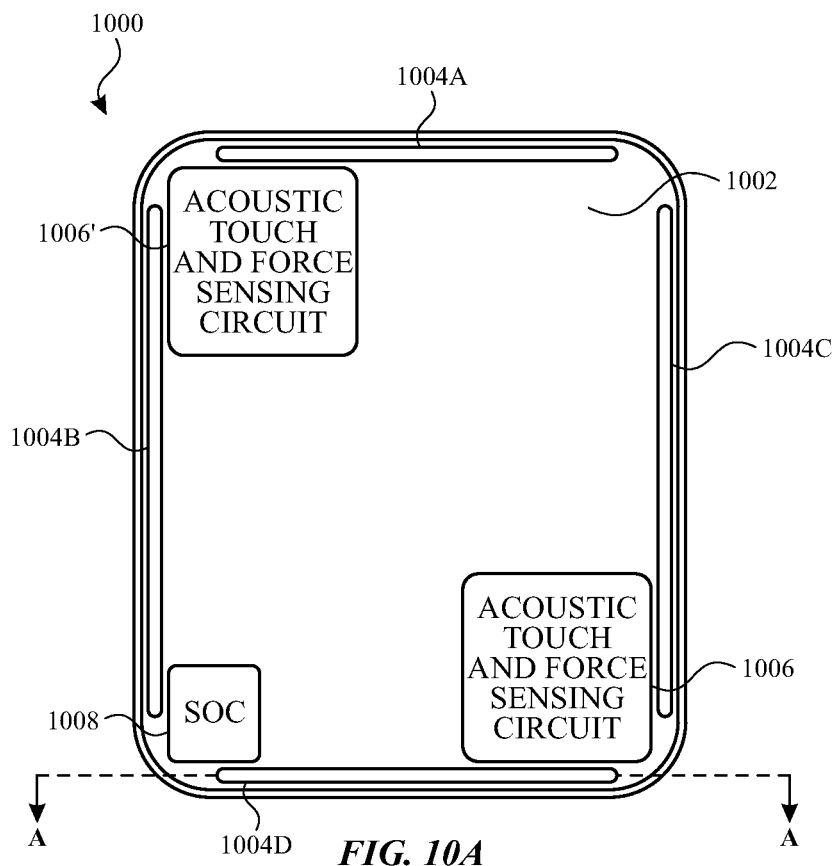
FIGS. 10A-10E illustrate exemplary integration of an acoustic touch and force sensing circuit and/or one or more processors with transducers mechanically and acoustically coupled to a surface and/or a deformable material according to examples of the disclosure.

As described above, acoustic touch and force sensing scans performed by an acoustic touch and force sensing circuit can involve stimulating and sensing one or more transducers. FIGS. 10A-10E illustrate exemplary integration of an acoustic touch and force sensing circuit and/or one or more processors (e.g., processor SoC) with transducers mechanically and acoustically coupled to a surface (e.g., glass, plastic, metal, etc.) and/or a deformable material (e.g., silicone, rubber, etc.) according to examples of the disclosure. FIG. 10A illustrates an exemplary acoustic touch and force sensing system configuration 1000 using four acoustic transducers 1004A-D mounted along (or otherwise coupled to) four edges of a surface 1002 (e.g., underside of a cover glass). Transducers 1004A-D can be configured to generate acoustic waves (e.g., shear horizontal waves) and to receive the reflected acoustic waves. Additionally, the acoustic transducers 1004A-D can also be mounted over (or otherwise coupled to) a deformable material (e.g., gasket) disposed between the surface 1002 and a rigid material (e.g., a portion of the housing). One or more acoustic touch and force sensing circuits can be included. For example, FIG. 10A illustrates a first acoustic touch and force sensing circuit 1006 positioned proximate to neighboring edges of transducers 1004C and 1004D. Likewise, a second acoustic touch and force sensing circuit 1006' can be positioned proximate to neighboring edges of transducers 1004A and 1004B. Placement of acoustic touch and force sensing circuits as illustrated can reduce routing between transducers 1004A-D and the respective acoustic touch and force sensing circuits. Processor SoC 1008 can be coupled to the one or more acoustic touch and force sensing circuits to perform various processing as described herein. In some examples, some or all of the drive circuitry (Tx circuitry) and/or some or all of the receive circuitry (Rx circuitry) of the touch and force sensing circuit can be implemented on different silicon chips.

Figure 10B:
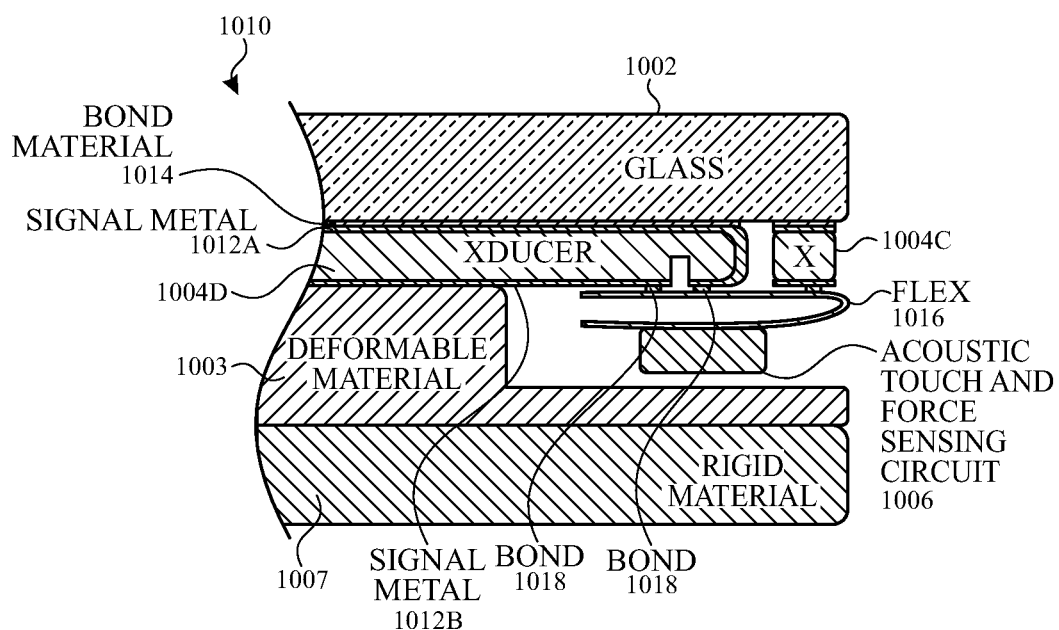

In some examples, transducers 1004A-D can be coupled to one or more acoustic touch and force sensing circuits via a flex circuit (e.g., flexible printed circuit board). FIG. 10B illustrates a view 1010 of exemplary acoustic touch and force sensing system configuration 1000 along view AA of FIG. 10A. As illustrated in FIG. 10B, transducer 1004D can be coupled to surface 1002 by a bonding between a bonding material layer 1014 on an underside of surface 1002 and a first signal metal layer 1012A on one side of transducer 1004D. In some examples, the bonding material layer 1014 can be electrically conductive (e.g., a metal layer). In some examples, the bonding material layer 1014 can be electrically non-conductive. The first signal metal layer 1012A on one side of transducer 1004D and a second signal metal layer 1012B on a second side of transducer 1004D can provide two terminals of transducer 1004D to which stimulation signals can be applied and reflections can be received. The first signal metal layer 1012A can wrap around from one side of transducer 1004D to an opposite side to enable bonding of both signal metal layers of the transducer 1004D on one side of transducer 1004D. In FIG. 10B, acoustic touch and force sensing circuit 1006 can be coupled to a flex circuit 1016 and the flex circuit can be respectively bonded to signal metal layers 1012A and 1012B of transducer 1004D (e.g., via bonds 1018). Likewise, transducer 1004C can be coupled to surface 1002 (e.g., via bond metal layer/first signal metal layer bonding) and to acoustic touch and force sensing circuit 1006 by bonding a flex circuit to signal metal layers on the transducer side opposite the surface. Similarly, transducers 1004A and 1004B can be coupled to surface 1002 and second acoustic touch and force sensing circuit 1006'.

Transducers 1004A-D can also be coupled to deformable material 1003. For example, deformable material 1003 can be a gasket disposed between the surface 1002 and a rigid material 1007. When assembled, deformable material 1003 (e.g., gasket) can form a water-tight seal between surface 1002 (e.g., cover glass) and a rigid material 1007 (e.g., housing). Transducers 1004A-D in contact with deformable material 1003 can apply stimulation signals to and receive reflections from the deformable material 1007. In a similar manner, transducers 1004A-D can also be coupled to deformable material 1003 as illustrated in FIGS. 10C-E.

In some examples, transducers 1004A-D can be coupled to acoustic touch and force sensing circuits via an interposer (e.g., rigid printed circuit board). FIG. 10C illustrates a view 1020 of exemplary acoustic touch and force sensing system configuration 1000 along view AA. Transducers 1004C and 1004D can be coupled to surface 1002 as illustrated in and described with respect to FIG. 10B. Rather than coupling acoustic touch and force sensing circuit 1006 to a flex circuit 1016 and bonding the flex circuit to signal metal layers 1012A and 1012B of transducer 1004D, however, in FIG. 10C, an interposer 1022 can be bonded to signal metal layers 1012A and 1012B of transducer 1004D (e.g., via bonds 1024). Acoustic touch and force sensing circuit 1006 can be bonded or otherwise coupled to interposer 1022. Similarly, transducers 1004A and 1004B can be coupled to surface 1002 and second acoustic touch and force sensing circuit 1006'. In some examples, transducers 1004A-D can be directly bonded to acoustic touch and force sensing circuits. FIG. 10D illustrates a view 1030 of exemplary acoustic touch and force sensing system configuration 1000 along view AA. Transducers 1004C and 1004D can be coupled to surface 1002 as illustrated in and described with respect to FIG. 10B. Rather than coupling acoustic touch and force sensing circuit 1006 to a flex circuit or interposer and bonding the flex circuit/interposer to signal metal layers 1012A and 1012B of transducer 1004D, however, in FIG. 10D, an acoustic touch and force sensing circuit 1006 can be bonded to signal metal layers 1012A and 1012B of transducer 1004D (e.g., via bonds 1032). Similarly, transducers 1004A and B can be coupled to surface 1002 and second acoustic touch and force sensing circuit 1006'.

Figure 10C:
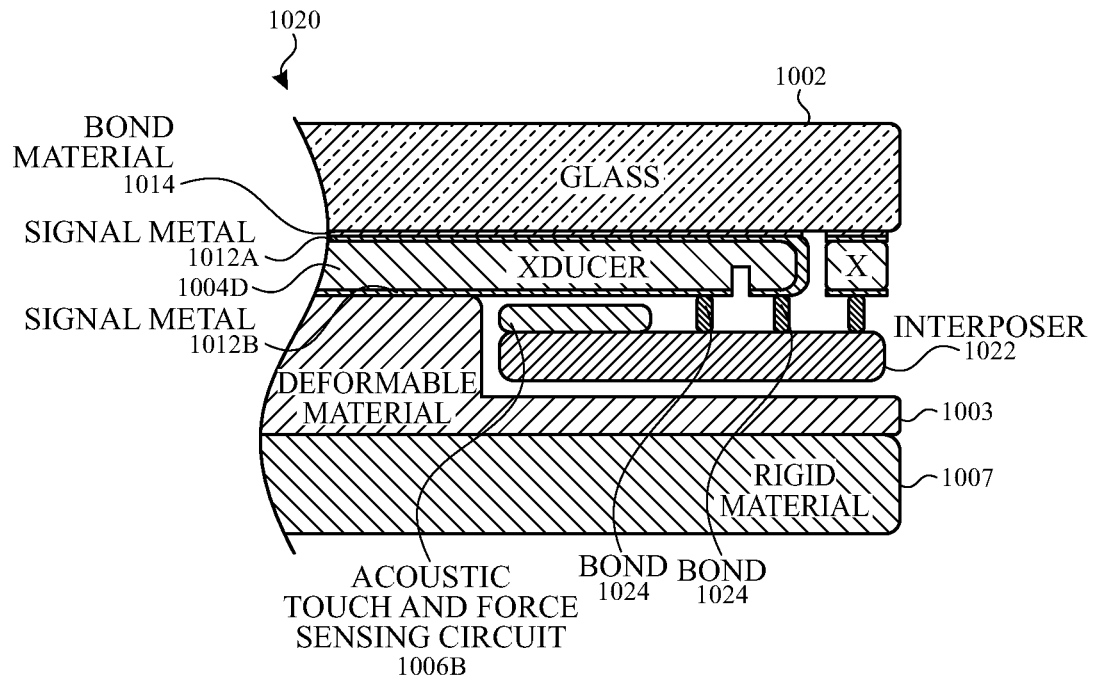
Figure 10D:
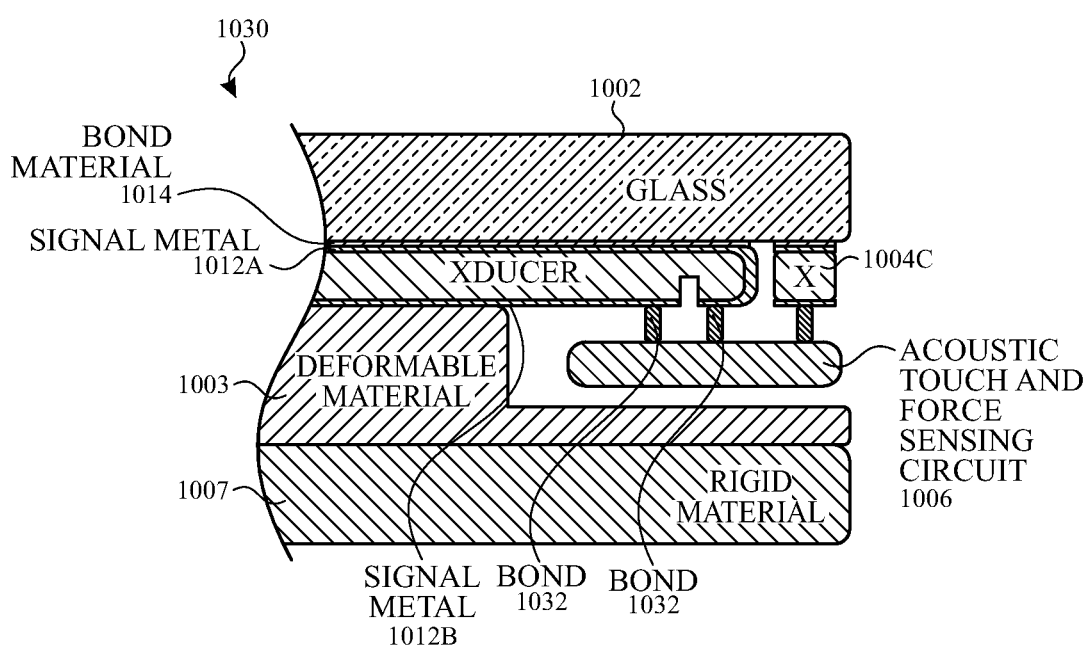
Figure 10E:
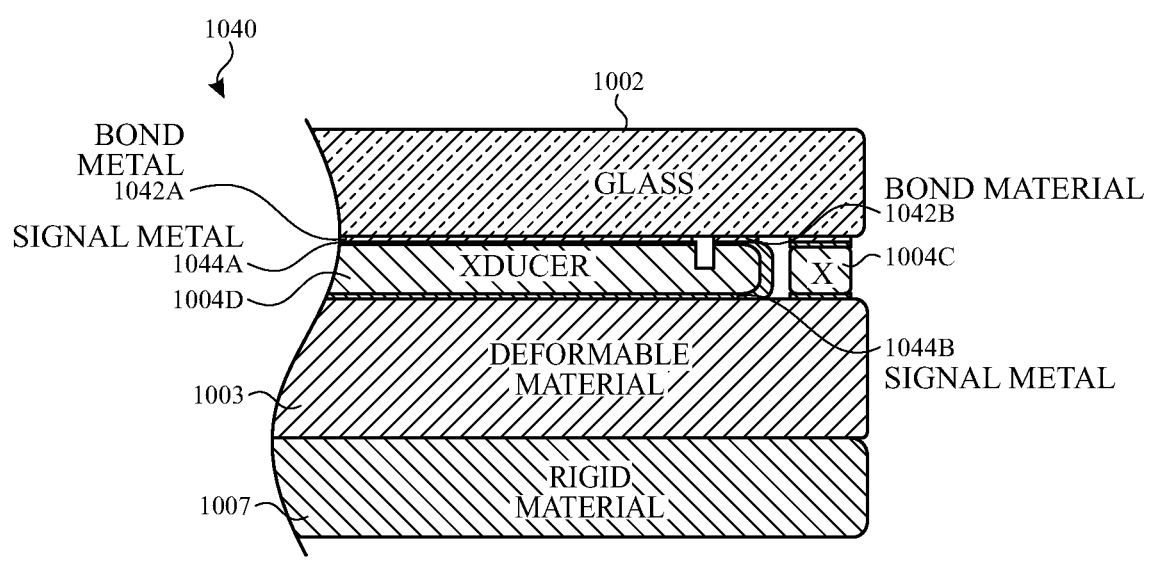

In FIGS. 10B-D, signal metal layer 1012A was routed away from surface 1002 and both signal metal layers 1012A and 1012A were bonded to an acoustic touch and force sensing circuit via bonding on a side of transducer 1004D separate from surface 1002 (e.g., via flex circuit, interposer or direct bond). In some examples, the acoustic touch and force sensing circuits can be bonded to routing on surface 1002. FIG. 10E illustrates a view 1040 of exemplary acoustic touch and force sensing system configuration 1000 along view AA. Unlike in FIG. 10A, for example, transducer 1004D can be coupled to surface 1002 via two separate portions of metal bond layer. A first portion of the metal bond layer 1042A can be bonded to a first signal metal layer 1044A (using a metal to metal conductive bonding), and a second portion of the metal bond layer 1042B can be bonded to a second signal metal layer 1044B (which can optionally be wrapped around transducer 1004D). Although not shown, the first and second portions of the metal bond layer 1042A and 1042B can be routed along the underside of surface 1002 and bond connections can be made with a flex circuit or interposer including an acoustic touch and force sensing circuit, or directly to the acoustic touch and force sensing circuit. Likewise, transducer 1004C can be coupled to surface 1002 and acoustic touch and force sensing circuit 1006 via routing on the surface. Similarly, transducers 1004A and 1004B can be coupled to surface 1002 and coupled to second acoustic touch and force sensing circuit 1006' via routing on the surface. It should be noted, that one advantage of the integration illustrated in FIG. 10E over the integrations of FIGS. 10B-D, can be that the deformable material 1003 can have a more uniform shape around the perimeter of the device. In contrast, as illustrated in FIGS. 10B-D, the deformable material may include a cutout or notch or have different properties (e.g., different thickness) where the acoustic touch and force sensing circuit (and/or flex circuit or interposer) is located. Alternatively, the transducer can be made thinner in the electrical connection area to accommodate for the electrical connection in FIGS. 10B-D without a notch or cutout. In some examples, pitch-catch force sensing can be used. In such examples, a receive transducer can be added between the deformable material 1003 and rigid material 1007 (e.g., as illustrated in FIG. 6B.)

It should be understood that the exemplary integration of an acoustic touch and force sensing circuit, transducers and a surface described herein are exemplary and many other techniques can be used. Transducers can be attached to the edge of the cover glass (e.g., on a side of the cover glass) or underneath the cover glass. In some examples, the transducers can be integrated in a notch in the cover glass. In all of the integrations of the transducers and the cover glass, the attachment and the bonding should be done in a way that can allow for the desired acoustic wave to be generated and propagated in the cover glass (or on top of the cover glass). In some examples, matching or backing materials can be added to the transducers to increase their performance as well as the matching to the target surface medium (e.g., cover glass). Likewise, matching or backing materials can be added to the transducers interfacing with deformable material 1003 to increase performance of force detection as well as the matching to the deformable material medium. In some examples, transducers for touch detection can be implemented on the edges of the cover glass and the transducers for force detection can be implemented on the corners of the cover glass.

Figure 11:
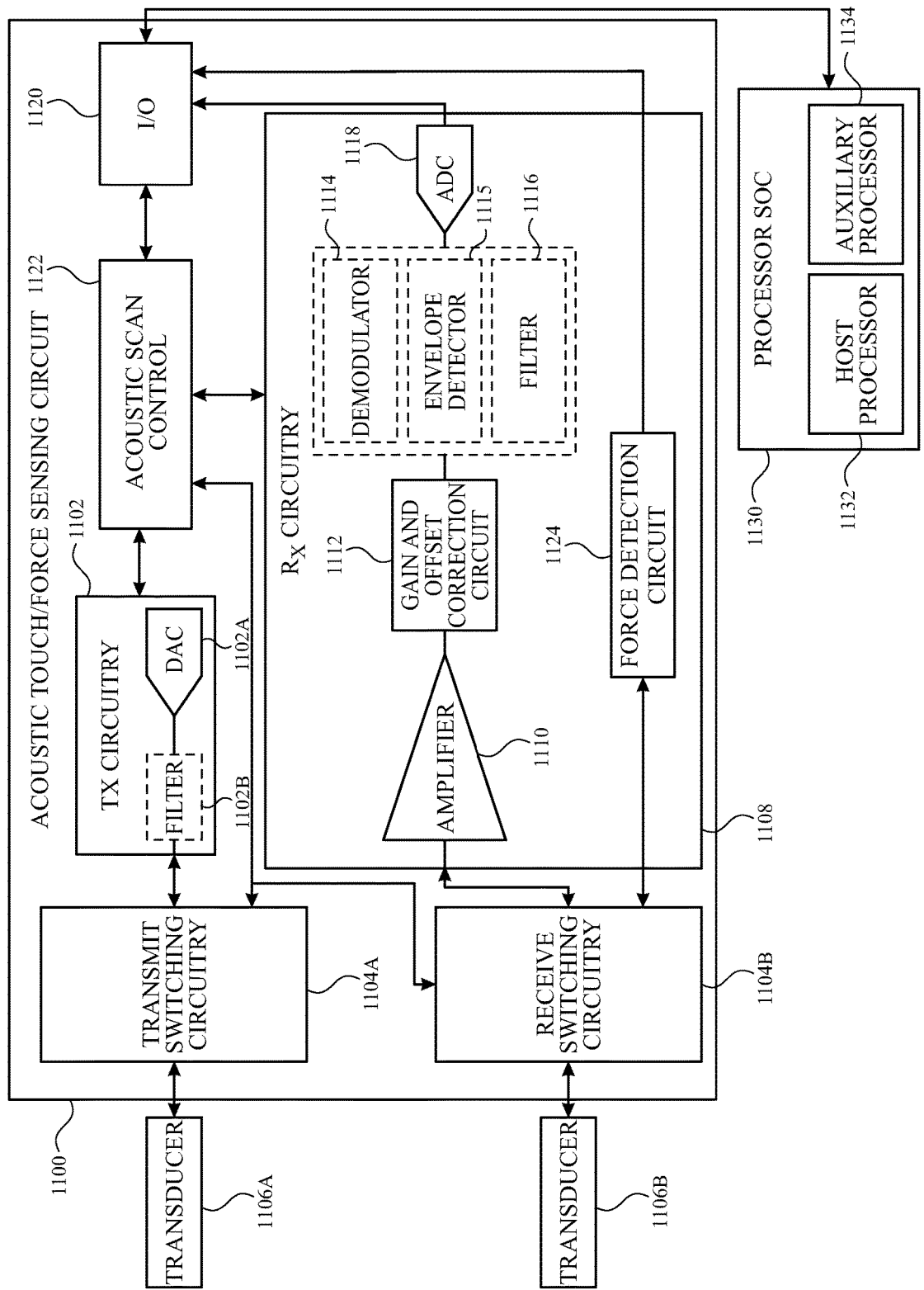
FIG. 11 illustrates an exemplary configuration of an acoustic touch and force sensing circuit according to examples of the disclosure.

As described above, in some examples, the transmitter and receiver functions can be separated such that the transmission of acoustic energy at 302 and the receiving of acoustic energy at 304 may not occur at the same transducer. In some examples, the transmit transducer and the receive transducer can be made of different materials to maximize the transmit and receive efficiencies, respectively. In some examples, having separate transmit and receive transducers can allow for high voltage transmit circuitry and low voltage receive circuitry to be separated (for touch and/or force sensing circuits). FIG. 11 illustrates an exemplary configuration of an acoustic touch and force sensing circuit 1100 according to examples of the disclosure. The configuration of FIG. 11, like the configuration of FIG. 4, can include an acoustic touch and force sensing circuit 1100 and a processor SoC 1130. As described above, processor SoC 1130 can include a host processor 1132 (e.g., corresponding to processor 432) and an auxiliary processor 1134 (corresponding to auxiliary processor 434). Likewise, acoustic touch and force sensing circuit 1100 can include transmitter 1102 (corresponding to transmitter 402), transmit switching circuitry 1104A (corresponding to demultiplexers of switching circuitry 404), receive switching circuitry 1104B (e.g., corresponding to multiplexers of switching circuitry 404), an amplifier 1110 (e.g., corresponding to amplifier 410), gain and offset correction circuit 1112 (e.g., corresponding to gain and offset correction circuit 412), demodulation circuit, envelope detection circuit, and/or filter 1114-1116 (e.g., corresponding to demodulation circuit 414, envelope detection circuit 415, and/or filter 416), ADC 1118 (e.g., corresponding to ADC 418) and I/O circuit 1120 (e.g., corresponding to I/O circuit 420). Acoustic touch and force sensing circuit 1100 can also include a force detection circuit 1124 (e.g., corresponding to force detection circuit 424). The operation of these components can be similar to that described above with respect to FIG. 4, and is omitted here for brevity. Unlike FIG. 4, which includes transducers 406 performing both transmit and receive operations, the configuration illustrated in FIG. 11 can include transducers 1106A operating as transmitters and separate transducers 1106B operating as receivers. Transducers 1106A and 1106B can co-located at locations where transmit and receive transducers are previously described. For example, transducer 502A can be replaced by a first transducer configured to transmit and a second transducer configured to receive.

It is to be understood that the configuration of FIG. 11 is not limited to the components and configuration of FIG. 11, but can include other or additional components in multiple configurations according to various examples. Additionally, some or all of the components illustrated in FIG. 11 can be included in a single circuit, or can be divided among multiple circuits while remaining within the scope of the examples of the disclosure. In some examples, some or all of the transmit circuitry 1102 and transmit switching circuitry 1104A can be implemented in one chip and some or all of the receive circuitry 408 and receive switching circuitry 404B can be implemented in a second chip. The first chip including transmit circuitry can receive and/or generate via a voltage boosting circuit a high voltage supply for stimulating the surface. The second chip including the receive circuitry can operate without receiving or generating a high voltage supply. In some examples, more than two chips can be used, and each chip can accommodate a portion of the transmit circuitry and/or receive circuitry.

Figure 12A:
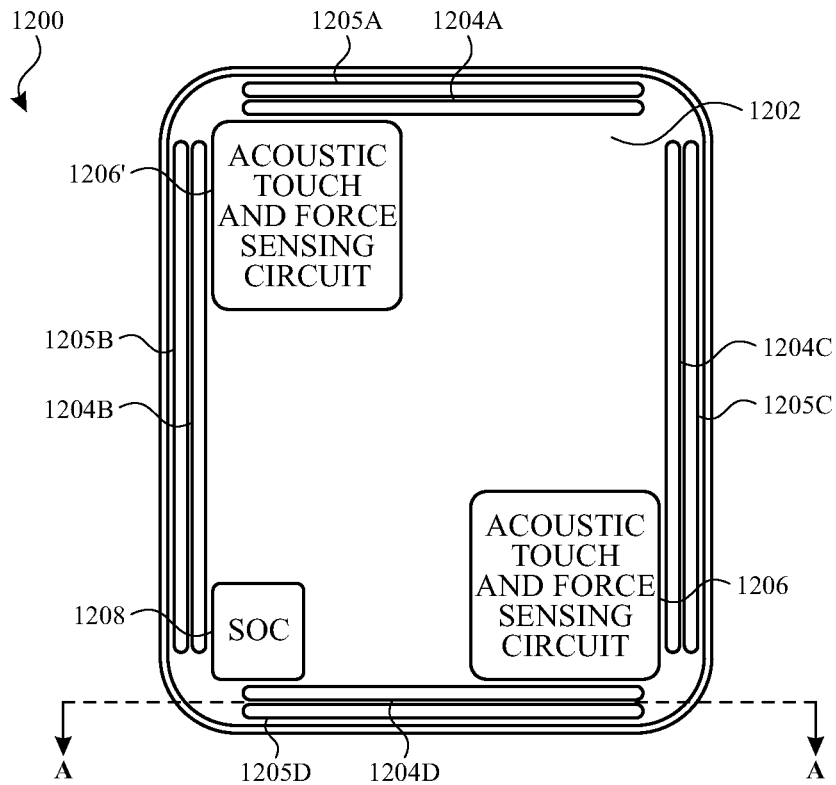
FIGS. 12A-12E illustrate exemplary integration of an acoustic touch and force sensing circuit and/or one or more processors with groups of transducers mechanically and acoustically coupled to a surface and/or a deformable material according to examples of the disclosure.

FIGS. 12A-12E illustrate exemplary integration of an acoustic touch and force sensing circuit and/or one or more processors (e.g., processor SoC) with groups of transducers (e.g., one transmitting and one receiving) mechanically and acoustically coupled to a surface (e.g., glass, plastic, metal, etc.) and/or a deformable material (e.g., silicone, rubber, etc.) according to examples of the disclosure. FIG. 12A illustrates an exemplary acoustic touch and force sensing system configuration 1200 using eight acoustic transducers, including four transmit transducers 1204A-D and four receive transducers 1205A-D mounted along (or otherwise coupled to) four edges of a surface 1202 (e.g., cover glass). Transmit transducers 1204A-D can be configured to generate acoustic waves (e.g., shear horizontal waves) and receive transducers 1205A-D can be configured to receive the reflected acoustic waves. Additionally, the acoustic transducers 1204A-D and 1205A-D can also be mounted over (or otherwise coupled to) a deformable material (e.g., gasket) disposed between the surface 1002 and a rigid material (e.g., a portion of the housing). One or more acoustic touch and force sensing circuits can be included. For example, FIG. 12A illustrates a first acoustic touch and force sensing circuit 1206 positioned proximate to neighboring edges of transmit transducers 1204C-D and receive transducers 1205C-D. Likewise, a second acoustic touch and force sensing circuit 1206' can be positioned proximate to neighboring edges of transmit transducers 1204A-B and receive transducers 1205A-B. Placement of acoustic touch and force sensing circuits as illustrated can reduce routing between transducers and corresponding acoustic touch and force sensing circuits. Processor SoC 1208 can be coupled to the one or more acoustic touch and force sensing circuits.

Figure 12B:
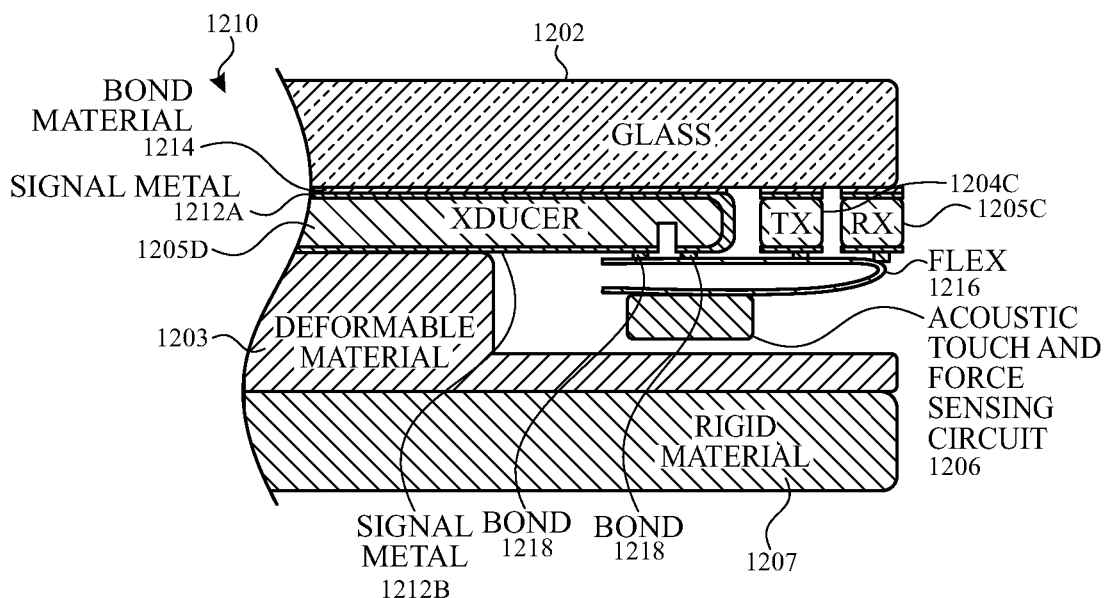

In some examples, transducers 1204A-D/1205A-D can be coupled to acoustic touch and force sensing circuits via a flex circuit (e.g., flexible printed circuit board). FIG. 12B illustrates a view 1210 of exemplary acoustic touch and force sensing system configuration 1200 along view AA of FIG. 12A. As illustrated in FIG. 12B, receiver transducer 1205D can be coupled to surface 1202 by a bonding between a bond material layer 1214 on an underside of surface 1202 and a first signal metal layer 1212A on one side of receive transducer 1205D. In some examples, the bonding material layer 1214 can be electrically conductive (e.g., a metal layer). In some examples, the bonding material layer 1214 can be electrically non-conductive. The first signal metal layer 1212A on one side of receive transducer 1205D and a second signal metal layer 1212B on a second side of receive transducer 1205D can provide two terminals of receive transducer 1205D from which reflections can be received. The first signal metal layer 1212A can wrap around from one side of receive transducer 1205D to an opposite side to enable bonding of both signal metal layers of receive transducer 1205D on one side of receive transducer 1205D. In FIG. 12B, acoustic touch and force sensing circuit 1206 can be coupled to a flex circuit 1216 and the flex circuit can be respectively bonded to signal metal layers 1212A and 1212B of receive transducer 1205D (e.g., via bonds 1218). Similarly transmit circuit 1204D (not shown) can be coupled to surface 1202 and can provide two terminals to which stimulation signals can be applied. The flex circuit can be bonded to respective signal metal layers of transmit transducer 1204D. Likewise, transmit transducer 1204C and receive transducer 1204D can be coupled to surface 1202 (e.g., via bond metal layer/first signal mental layer bonding) and to acoustic touch and force sensing circuit 1206 by bonding the flex circuit to signal metal layers on the side of the transducer opposite the surface. Similarly, transmit transducers 1204A-B and receive transducers 1205A-B can be coupled to surface 1202 and second acoustic touch and force sensing circuit 1206'.

Transducers 1204A-D and 1205A-D can also be coupled to deformable material 1203. For example, deformable material 1203 can be a gasket disposed between the surface 1202 and a rigid material 1207. When assembled, deformable material 1203 (e.g., gasket) can form a water-tight seal between surface 1202 (e.g., cover glass) and a rigid material 1207 (e.g., housing). Transducers 1204A-D and 1205A-D in contact with deformable material 1203 can apply stimulation signals to and receive reflections from the deformable material 1207. In a similar manner, transducers 1204A-D and/or 1205A-D can also be coupled to deformable material 1203 as illustrated in FIGS. 12C-E.

In some examples, transmit transducers 1204A-D and receive transducers 1205A-D can be coupled to acoustic touch and force sensing circuits via an interposer (e.g., rigid printed circuit board). FIG. 12C illustrates a view 1220 of exemplary acoustic touch and force sensing system configuration 1200 along view AA. Transmit transducers 1204C-D and receive transducers 1205C-D can be coupled to surface 1202 as illustrated in and described with respect to FIG. 12B. Rather than coupling acoustic touch and force sensing circuit 1206 to a flex circuit 1216 and bonding the flex circuit to signal metal layers 1212A and 1212B of receive transducer 1205D, however, in FIG. 12C, an interposer 1222 can be bonded to signal metal layers 1212A and 1212B of receive transducer 1205D (e.g., via bonds 1224). Acoustic touch and force sensing circuit 1206 can be bonded or otherwise coupled to interposer 1222. Similarly, the remaining transducers (transmit and receive) can be coupled to surface 1202 and the first or second acoustic touch and force sensing circuits 1206 and 1206'.

In some examples, transmit transducers 1204A-D and receive transducers 1205A-D can be directly bonded to acoustic touch and force sensing circuits. FIG. 12D illustrates a view 1230 of exemplary acoustic touch and force sensing system configuration 1200 along view AA. Transmit transducers 1204C-D and receive transducers 1205C-D can be coupled to surface 1202 as illustrated in and described with respect to FIG. 12B. Rather than coupling acoustic touch and force sensing circuit 1206 to a flex circuit or interposer and bonding the flex circuit/interposer to signal metal layers 1212A and 1212B of receive transducer 1205D, however, in FIG. 12D, an acoustic touch and force sensing circuit 1206 can be bonded to signal metal layers 1212A and 1212B of receive transducer 1205D (e.g., via bonds 1232). Similarly, the remaining transducers (transmit and receive) can be coupled to surface 1202 and the first or second acoustic touch and force sensing circuits 1206 and 1206'.

Figure 12C:
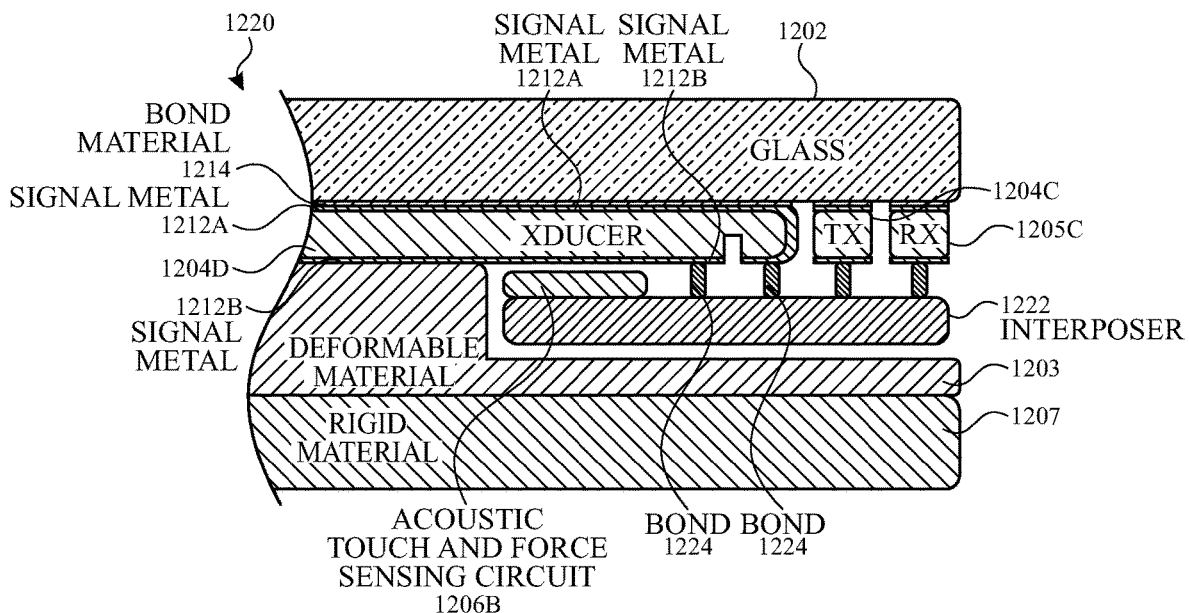
Figure 12D:
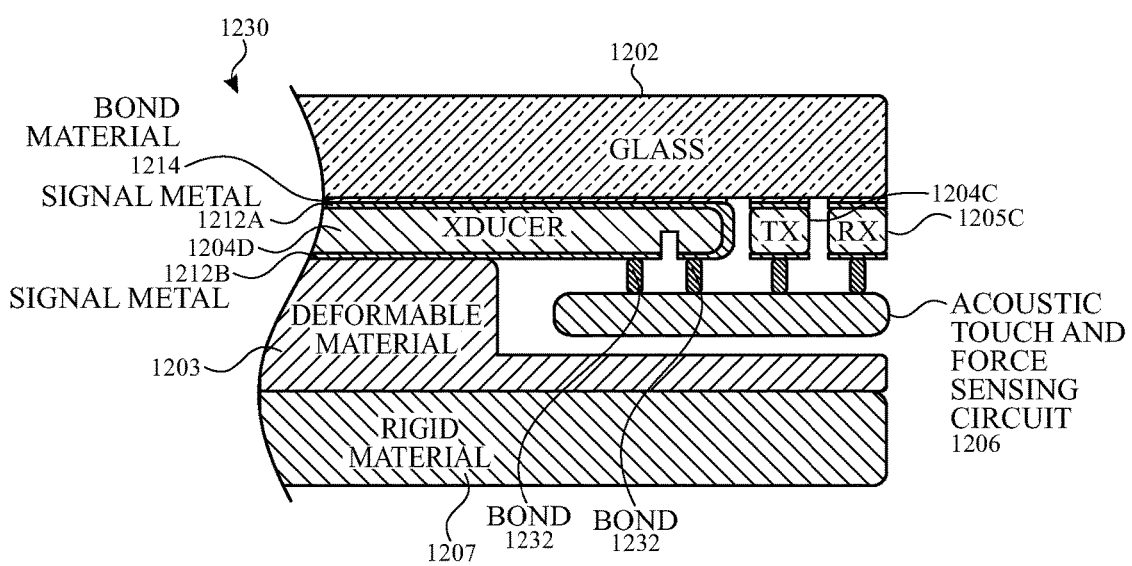
Figure 12E:
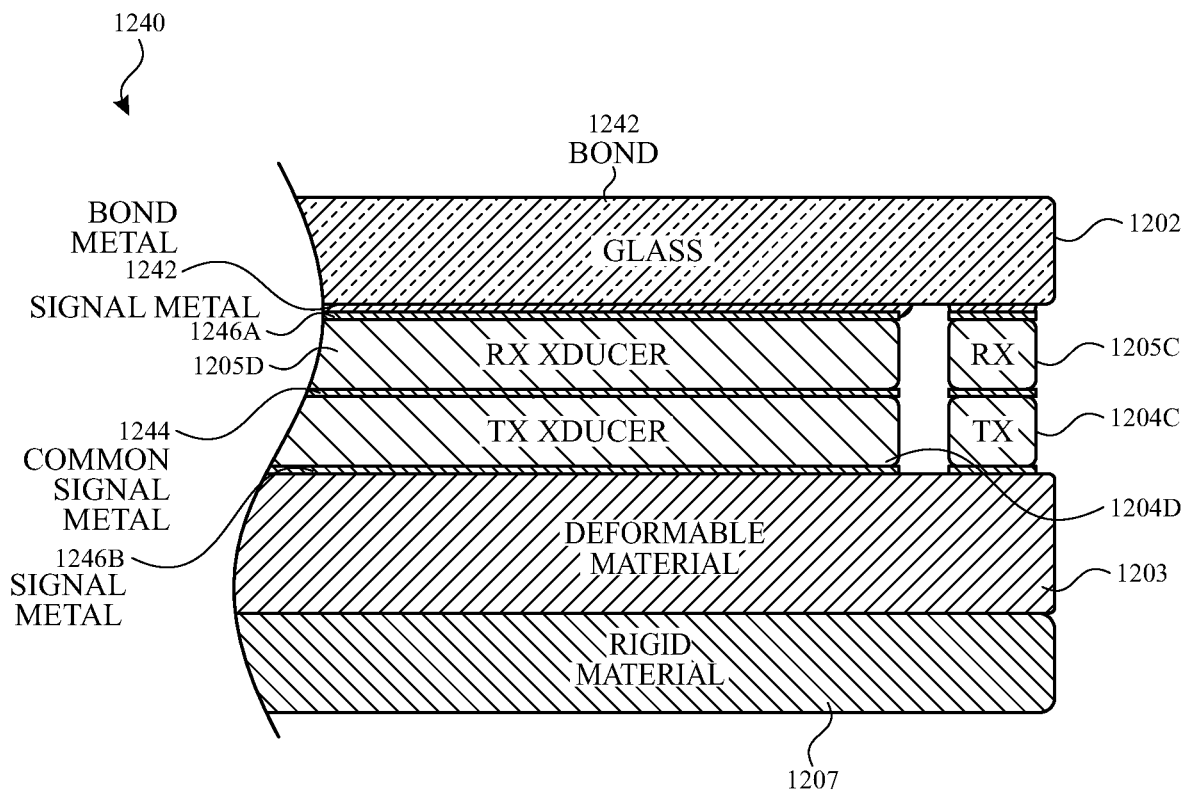

In FIGS. 12B-D, signal metal layer 1212A was routed away from surface 1202 and both signal metal layers 1212A and 1212B were bonded to an acoustic touch and force sensing circuit via bonding on a side of receive transducer 1205D separate from surface 1202 (e.g., via flex circuit, interposer or direct bond). In some examples, the acoustic touch and force sensing circuits can be bonded to routing on surface 1202 instead, similar to the description above with respect to FIG. 10E, for example.

Although FIG. 12A illustrates transmit transducers 1204A-D as being side-by-side with receive transducers 1205A-D, in some examples, transmit transducers 1204A-D and receiver transducers 1205A-D can be stacked on one another. FIG. 12E illustrates a view 1240 of exemplary acoustic touch and force sensing system configuration 1200 along view AA. As illustrated in FIG. 12E, receiver transducer 1205D can be coupled to surface 1202 by a bonding between a bond metal layer 1242 on an underside of surface 1202 and a first signal metal layer 1246A on one side of receive transducer 1205D. Transmit transducer 1204D can be coupled to receive transducer 1205D via a common second signal metal layer 1244 on a second side of receive transducer 1205D. A first metal layer 1246B can be deposited on the second side of transmit transducer 1204D. First signal metal layer 1246A and common second signal metal layer 1244 can provide two terminals of receive transducer 1205D from which reflections can be received. First signal metal layer 1246B and common second signal metal layer 1244 can provide two terminals of transmit transducer 1204D to which transmit waves can be applied. In some examples, the common signal metal layer can be a common ground for the transmit and receive transducers. In some examples, the metal connections for the transmit and receive transducers can be separated from each other and differential or single ended transmit and receive circuitry can be used. Although not shown, routing of signal metal layers 1244, 1246A and 1246B can be placed so that acoustic touch and force sensing circuit 1206 can be coupled to routing on surface 1202 or exposed surfaces of transmit transducer 1204D and/or receive transducer 1205D to enable direct or indirect bonding of the acoustic touch and force sensing circuit to routing on surface 1202 or on transducers 1204D/1205D. In some examples, bond metal 1242 can be bonded to 1246A signal metal (using a metal to metal conductive bonding). It should be noted, that one advantage of the integration illustrated in FIG. 12E over the integrations of FIGS. 12B-D, can be that the deformable material 1003 can have a more uniform shape around the perimeter of the device. In contrast, as illustrated in FIGS. 12B-D, the deformable material may include a cutout or have different properties (e.g., different thickness) where the acoustic touch and force sensing circuit (and/or flex circuit or interposer) is located.

FIGS. 13-19 illustrate various configurations for integrating touch and force sensing functionality within an electronic device. Each of the FIGS. 13-19 includes a cover glass that can correspond to cover glass 312 above, a display stackup, a housing that can correspond to rigid material 318 above, a transducer that can correspond to transducer 314 above, and a deformable material (e.g., that can be included in a force sensing stackup) that can correspond to deformable material 316 above. In some examples, the display stackup can include a stackup for touch sensing circuitry (e.g., capacitive touch sensing). Each of the different configurations can be used to create a device that has both touch sensing and force sensing capability, as will be described in more detail below.

Figure 13:
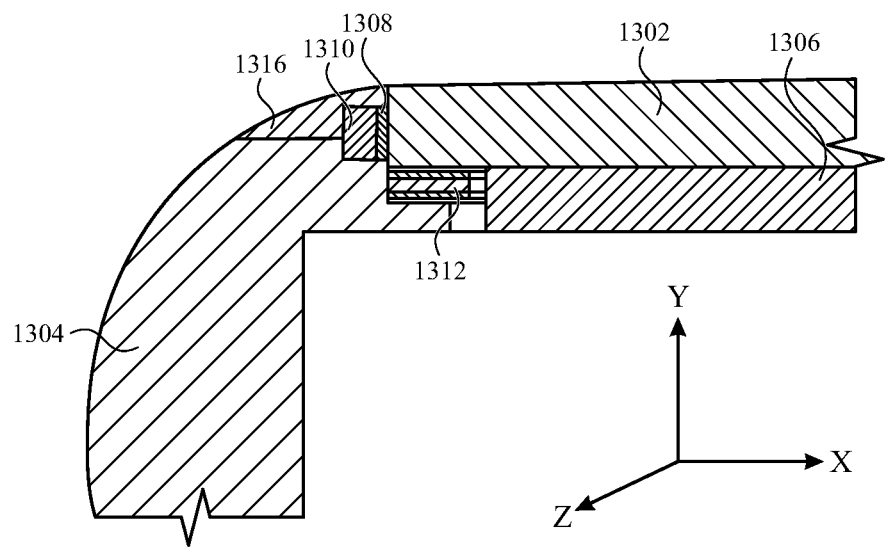
FIG. 13 illustrates a first exemplary configuration for integrating touch sensing and force sensing circuitry with a housing and cover glass of an electronic device.

FIG. 13 illustrates a first exemplary configuration for integrating touch sensing and force sensing circuitry with housing 1304 and cover glass 1302 of an electronic device. In some examples, transducer 1308 can be coupled to a side of the cover glass 1302. In some examples, cover glass 1302 can be disposed over a display stackup 1306. In some examples, the display stackup 1306 can include a touch sensor stackup, e.g., a capacitive touch sensor stackup. In some examples, the transducer 1308 can have a height in the y-axis dimension that can be close to the thickness in the y-axis dimension of the cover glass 1302. In some examples, this can allow the transducer 1308 to produce a uniform acoustic wave throughout the thickness of the cover glass 1302. In some examples, by placing the transducer 1308 on the side of the cover glass, stimulating the transducer with a voltage or current can produce a horizontal shear wave, Rayleigh wave, Lamb wave, Love wave, Stoneley wave, or surface acoustic wave in the cover glass 1302 travelling along the x-axis direction. In some examples, more than one transducer 1304 can be disposed around the perimeter of the cover glass 1302 to provide touch measurements having two-dimensional coordinates on the cover glass surface (e.g., as described with respect to transducers 502A-502D above). The transducer 1308 can be disposed on a backing material 1310 that can in turn provide mechanical coupling between the transducer and the housing 1304. In some examples, an encapsulant 1316 can be provided to hide the transducer 1308 and backing material 1310 from being visible to a user as well as providing additional mechanical stability. In some examples, the encapsulant 1316 can be a part of the housing 1304 and in some examples the encapsulant can be a separate material from the housing (e.g., glass, zircon, titanium, sapphire, etc.). In some examples, a force sensor stackup 1312 can be positioned behind the cover glass 1302, and can operate to detect force as described in at least FIGS. 3 and 6-7 above.

Figure 14:
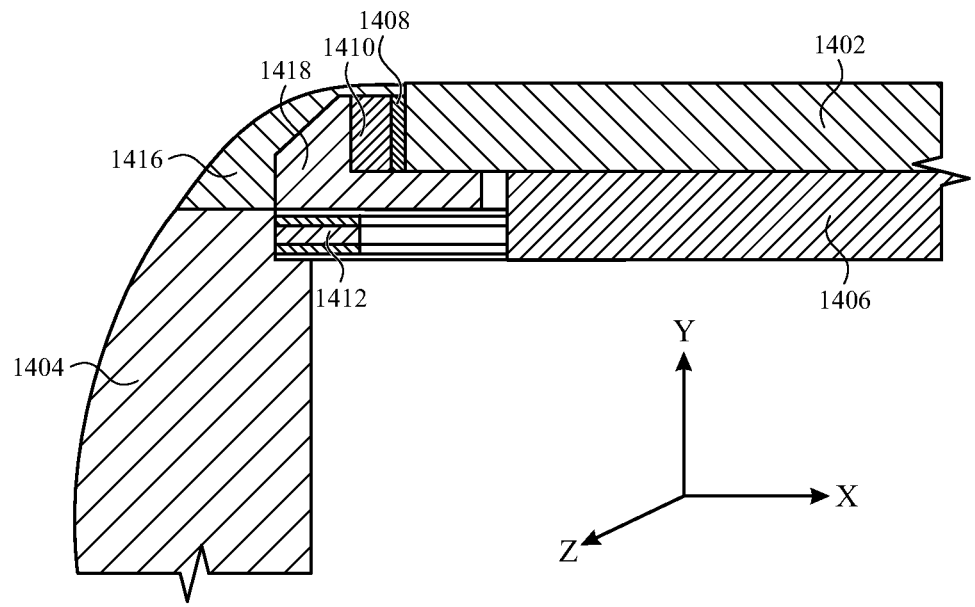
FIG. 14 illustrates a second exemplary configuration for integrating touch sensing and force sensing circuitry with a housing and cover glass of an electronic device.

FIG. 14 illustrates a second exemplary configuration for integrating touch sensing and force sensing circuitry with housing 1404 and cover glass 1402 of an electronic device. FIG. 14 illustrates a similar configuration to FIG. 13 showing the transducer 1408 coupled to a side of the cover glass 1402. In some examples, the transducer 1408 can have a height in the y-axis dimension that can be close to the thickness in the y-axis dimension of the cover glass 1402. In some examples, by placing the transducer 1408 on the side of the cover glass, stimulating the transducer with a voltage or current can produce a horizontal shear wave in the cover glass 1402 travelling along the x-axis direction. In some examples, more than one transducer 1404 can be disposed around the perimeter of the cover glass 1402 to provide touch measurements having two-dimensional coordinates on the cover glass surface (e.g., as described with respect to transducers 502A-502D above). In some examples, each transducer 1408 can produce a shear wave oriented in a different direction. In addition to the encapsulant 1416 (which can correspond to the encapsulant 1316 above) a second encapsulant can be used to provide a mechanical base for the cover glass 1402, transducer 1408 and backing material 1410. Inclusion of the second encapsulant 1418 can simplify the structure of the housing 1404 by requiring one less notch in the housing. In some examples, the force sensor stackup 1412 can be supported directly by the housing 1404, and can operate to detect force as described in at least FIGS. 3 and 6-7 above.

Figure 15:
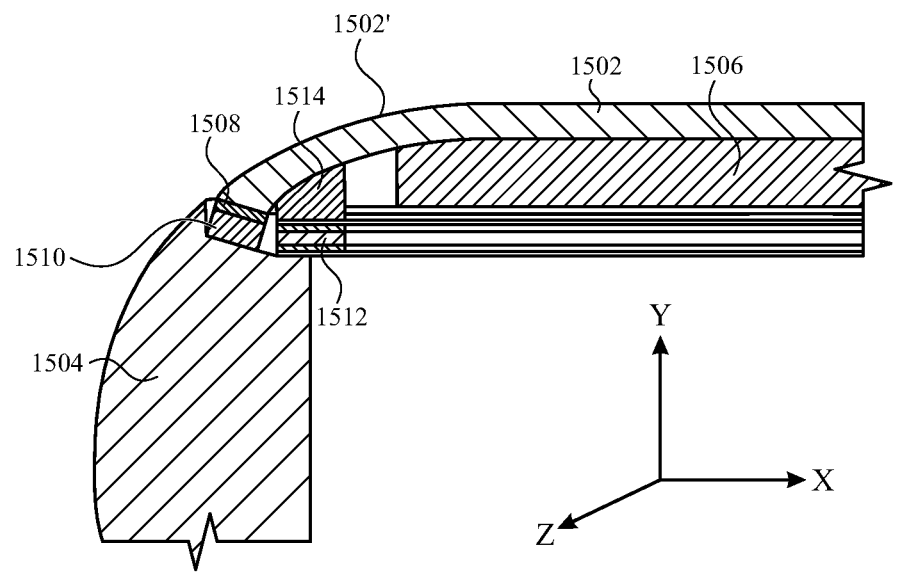
FIG. 15 illustrates a third exemplary configuration for integrating touch sensing and force sensing circuitry with a housing and cover glass of an electronic device.

FIG. 15 illustrates a third exemplary configuration for integrating touch sensing and force sensing circuitry with housing 1504 and curved cover glass 1502 of an electronic device. Unlike the configurations of FIGS. 13 and 14 above, the orientation of the transducer 1508 does not necessarily need to match with the direction of acoustic wave propagation (e.g., along the x-axis). In the illustrated configuration, the transducer 1508 can be attached to an edge of the curved cover glass 1502 and backing material 1510 can be disposed between the transducer 1580 and the housing 1504. In some examples, the transducer 1508 and backing material 1510 can be positioned within a notch or groove in the housing 1504 as illustrated in FIG. 15. In some examples, the acoustic energy produced by the transducer 1508 can be guided along the curved edge 1502' of the cover glass and can continue to propagate along the surface to perform touch detection as described above with regards to FIGS. 2-5. In some examples, a gradual curvature of the cover glass 1502 can be used to guide the wave along the curved edge 1502' of the cover glass toward the flat surface. Force sensor stackup 1512 can be supported by the housing 1504, and a standoff 1514 can be coupled to the cover glass 1502 to transfer a force applied to the cover glass into the force sensor stackup as described in at least FIGS. 3 and 6-7 above. In particular, because the force sensor stackup 1512 can be located beneath the curved edge 1502' of the cover glass 1502, the standoff 1514 can be included to translate the force onto a flat force sensor stackup.

Figure 16:
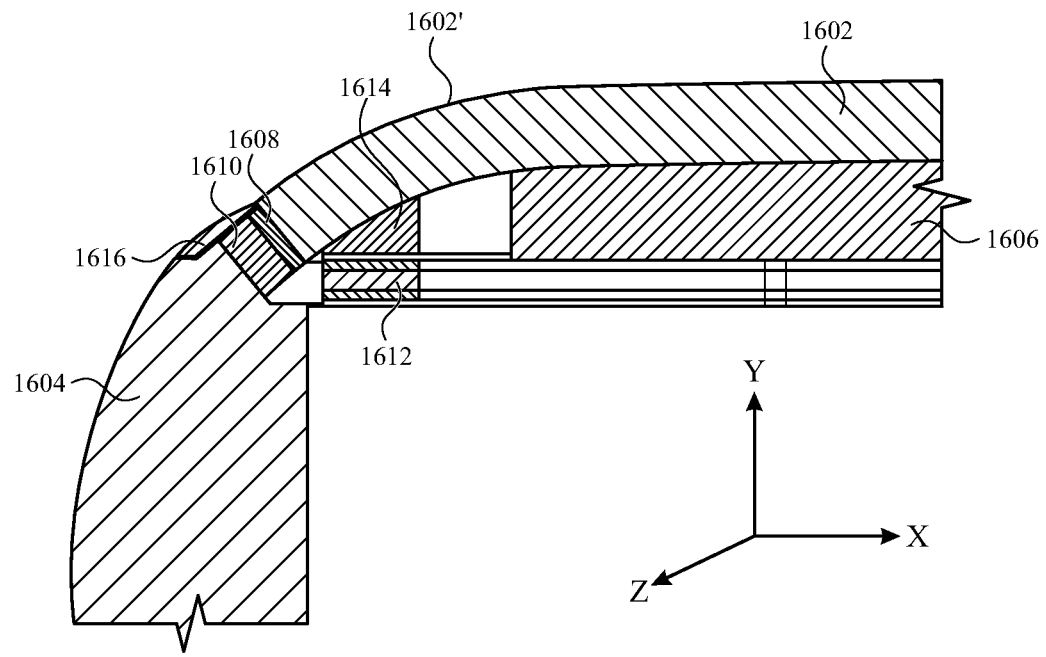
FIG. 16 illustrates a variation of the third configuration of FIG. 10 with the addition of an encapsulant material.

FIG. 16 illustrates a variation of the third configuration of FIG. 15 with the addition of an encapsulant material 1616 (which can correspond to encapsulant materials 1316, 1416, and 1418 above) that can be used to mechanically secure the transducer 1608 and backing 1610 to the housing 1604 as well as visually obscure the transducer assembly from a user of the electronic device. Similar to FIG. 10, force sensor stackup 1612 can be located beneath the curved edge 1602' of cover glass 1602 and a standoff 1614 can be coupled to the cover glass 1602 to transfer a force applied to the cover glass into the force sensor stackup.

Figure 17:
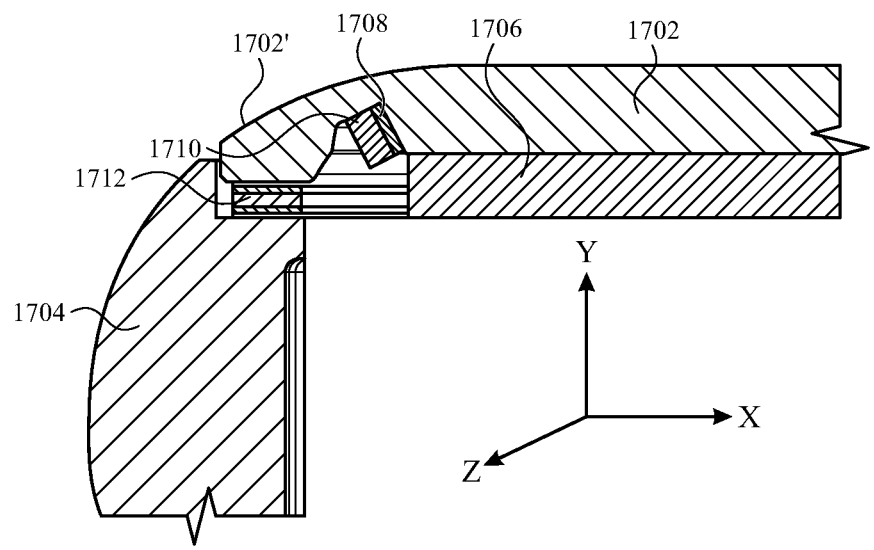
FIG. 17 illustrates a fourth exemplary configuration for integrating touch sensing and force sensing circuitry with a housing and cover glass of an electronic device.

FIG. 17 illustrates a fourth exemplary configuration for integrating touch sensing and force sensing circuitry with housing 1704 and cover glass 1702. Transducer 1708 can be disposed on a backing material 1710 within a cavity formed behind the cover glass 1702. An acoustic wave generated by stimulating the transducer 1708 can approximate the stimulation directly at the side of the cover glass 1702 as illustrated in FIGS. 13 and 14 while maintaining a curved edge 1702' of cover glass surface as illustrated in FIGS. 15 and 16. In other words, the transducer 1708 can be used to generate a wave that travels along the flat surface of the cover glass 1702 in the x-axis direction directly, without relying on guiding the wave through the curved edge 1702' of the cover glass. Reflection of the transmitted acoustic energy can be used for touch detection as described above (e.g., with respect to FIGS. 2-5). Force sensing stackup 1712 can be disposed between the cover glass 1702 and the housing 1704 to perform force sensing as described in at least FIGS. 3 and 6-7 above.

Figure 18:
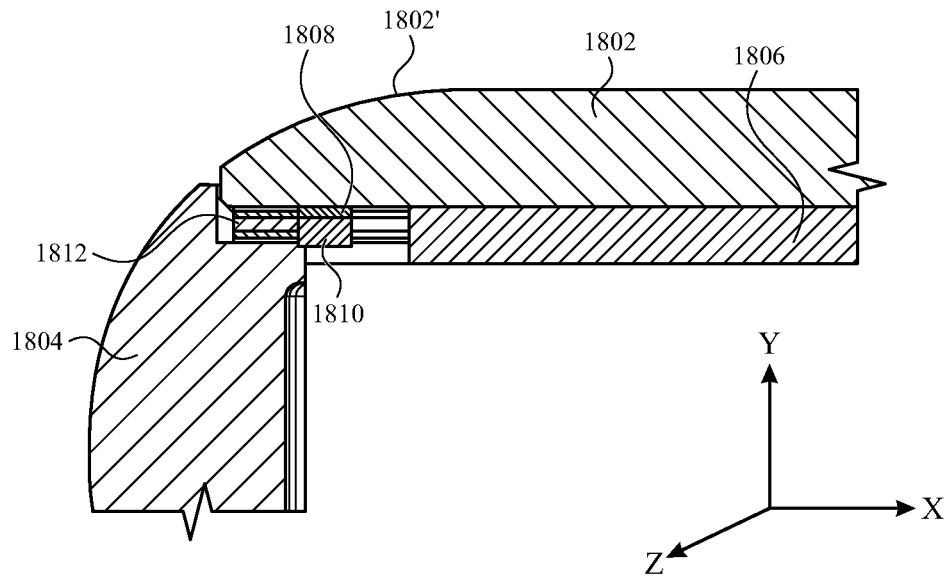
FIG. 18 illustrates a fifth exemplary configuration for integrating touch sensing and force sensing circuitry with a housing and cover glass of an electronic device.

FIG. 18 illustrates a fifth exemplary configuration for integrating touch sensing and force sensing circuitry with housing 1804 and cover glass 1802. In some examples, transducer 1808 and backing material 1810 can be disposed on a back side of the cover glass 1802. In some examples, acoustic energy from the transducer 1808 can begin propagating along the y-axis direction, can reflect from the curved edge 1802' of the cover glass 1802, and can travel along the x-axis direction as in the examples described above. In some examples, the amount of curvature of the curved edge 1802' can determine the dispersion of the reflected acoustic energy. In some examples, this dispersion can lead to dispersion in the measured time of flight for reflected acoustic energy and can have an effect on touch detection as described in FIGS. 2-5 above. Force sensor stackup 1812 can be coupled to the housing 1804 to perform force sensing as described in FIGS. 6-7 above.

Figure 19A:
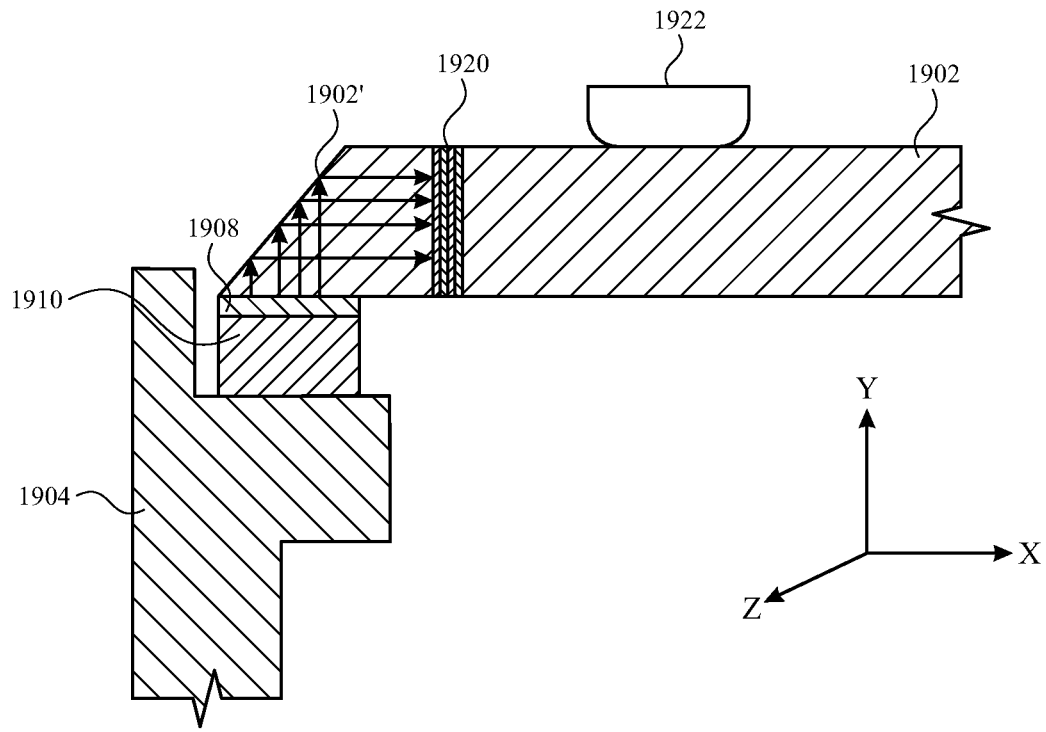
FIGS. 19A and 19B illustrate exemplary configurations for integrating touch sensing and force sensing circuitry with shared elements with a housing and cover glass of an electronic device.
Figure 19B:
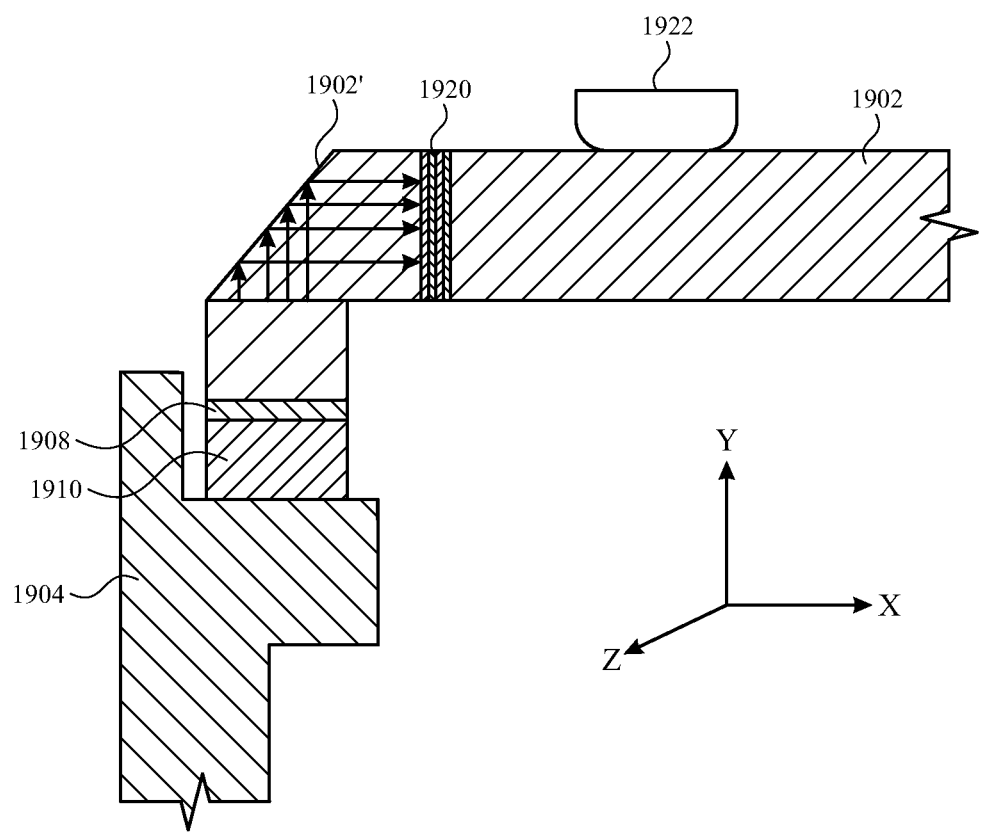

FIGS. 19A and 19B illustrate exemplary configurations for integrating touch sensing and force sensing circuitry with shared elements with housing 1904 and cover glass 1902 of an electronic device. In some examples, the illustrations of FIGS. 19A and 19B can be implementations for integrating the touch sensing and force sensing as described in FIGS. 2-7 above, with particular reference to FIGS. 3B, 5A, 6A, and 6B. FIGS. 19A and 19B differ in the shape of the cover glass 1902. In FIG. 19A, the illustrated cover glass 1902 can have a flat back side, and the transducer 1908 can be disposed directly to the back side of the cover glass. In FIG. 19B, the illustrated cover glass 1902 can have a downwardly extending portion at edges of the cover glass, and the transducer 1908 can be disposed on the downwardly extending portion of the cover glass. In other examples, the transducer 1908 can be attached to a curved cover glass 1902 such as those illustrated in FIGS. 15-17 above. Similar to the configuration described for FIG. 18, acoustic energy from the transducer 1808 can begin propagating along the y-axis direction, can reflect from the bezel portion 1902' of the cover glass 1902, and can travel along the x-axis direction. In the illustrated examples of FIGS. 19A and 19B, the bezel 1902' is drawn as a perfectly formed 45 degree angle, which can produce a 90 degree change in orientation of the acoustic energy from the reflection at the bezel. It should be understood that the same principles apply to the curved cover glass 1802 of FIG. 18, and that acceptable performance can be obtained in the presence of a non-flat bezel 1902', such as a curved edge 1802' above. The illustrated flat bezel 1902' could be used to provide a desirable reflection, but can result in a sharp edge that could be unpleasant for a user to touch. In some examples, a portion of the bezel 1902' can be flat, while sharp edges of the bezel can be avoided by rounding of the edges. In some examples, the length (e.g., x-axis dimension) of the transducer 1908 can be made equal to or nearly equal to the thickness (e.g., y-axis dimension) of the cover glass 1902 so that a uniform acoustic wave 1920 can be transmitted throughout the thickness of the cover glass material. Using the principles described above in FIGS. 2-5, the transducer 1908 can be used to detect the touch position of object 1922 on the cover glass. As should be understood, FIGS. 19A and 19B illustrate how the configuration of FIG. 3B can be integrated into an electronic device cover glass for performing touch sensing. In addition, by placing a deformable material 1910 behind the transducer (e.g., as a backing material), the force sensing described in FIGS. 3-7 above can simultaneously be performed using the same transducer 1908. For example, as compared to FIG. 6A, the cover glass 1902, transducer 1908, deformable material 1910, and housing 1904 can correspond to cover glass 601, transducer 602, deformable material 604, and rigid material 606 respectively. Also, although not shown, a second transducer can be included between the deformable material 1910 and the housing 1904 to match the configuration illustrated in FIG. 6B.

Therefore, according to the above, some examples of the disclosure are directed to An electronic device, comprising: a cover surface; a deformable material disposed between the cover surface and a housing of the electronic device; an acoustic transducer coupled to the cover surface and the deformable material and configured to produce a first acoustic wave in the cover surface and a second acoustic wave in the deformable material. Additionally or alternatively to one or more of the examples disclosed above, in some examples, the deformable material and cover surface are further configured such that the first acoustic wave is capable of being propagated in a first direction and the second acoustic wave is capable of being propagated in a second direction, different from the first direction. Additionally or alternatively to one or more of the examples disclosed above, in some examples, the first acoustic wave is incident upon a bezel portion of the cover glass in a third direction and reflected by the bezel portion of the cover glass in the first direction, different from the third direction. Additionally or alternatively to one or more of the examples disclosed above, in some examples, the first and third directions are opposite to one another. Additionally or alternatively to one or more of the examples disclosed above, in some examples, the first and third direction are orthogonal. Additionally or alternatively to one or more of the examples disclosed above, in some examples, the deformable material is included in a gasket positioned between the housing and a first side of the cover surface.

Some examples of the disclosure are directed to a touch and force sensitive device. The device can comprise: a surface, a deformable material disposed between the surface and a rigid material, such that force on the surface causes a deformation of the deformable material, a plurality of transducers coupled to the surface and the deformable material, and processing circuitry coupled to the plurality of transducers. The processing circuitry can be capable of: stimulating the plurality of transducers to transmit ultrasonic waves to the surface and the deformable material, receiving, from the plurality of transducers, reflected ultrasonic waves from the surface and the deformable material, determining a location of a contact by an object on the surface based the reflected ultrasonic waves propagating in the surface received at the plurality of transducers, and determining an applied force by the contact on the surface based on one or more reflected ultrasonic waves propagating in the deformable material received from one or more of the plurality of transducers. Additionally or alternatively to one or more of the examples disclosed above, in some examples, the surface can comprise an external surface of the device. Additionally or alternatively to one or more of the examples disclosed above, in some examples, the rigid material can comprise a portion of a housing of the device. Additionally or alternatively to one or more of the examples disclosed above, in some examples, the deformable material can form a gasket between the portion of the housing and the external surface of the device. Additionally or alternatively to one or more of the examples disclosed above, in some examples, the plurality of transducers can comprise at least four transducers bonded to the surface. Each of the four transducers can be disposed proximate to a different one of four respective edges of the surface and can be disposed over a portion of the gasket proximate to a respective edge of the housing of the device. Additionally or alternatively to one or more of the examples disclosed above, in some examples, the processing circuitry can comprise one or more acoustic touch and force sensing circuits. The acoustic touch and force sensing circuit can be coupled to the plurality of transducers via direct bonding between the plurality of transducers and the one or more acoustic touch and force sensing circuits, via bonding between the plurality of transducers and a flexible circuit board coupled to the one or more acoustic touch and force sensing circuits, or via bonding between the plurality of transducers and a rigid circuit board coupled to the one or more acoustic touch and force sensing circuits. Additionally or alternatively to one or more of the examples disclosed above, in some examples, the device can further comprise routing deposited the surface proximate to the plurality of transducers. The processing circuitry can comprise one or more acoustic touch and force sensing circuits. The one or more acoustic touch and force sensing circuits can be coupled to the plurality of transducers via coupling of the one or more acoustic touch and force sensing circuits to the routing deposited on the surface. Additionally or alternatively to one or more of the examples disclosed above, in some examples, stimulating the plurality of transducers to transmit ultrasonic waves to the surface and the deformable material and receiving, from the plurality of transducers, reflected ultrasonic waves from the surface and the deformable material can comprise: stimulating a first transducer of the plurality of transducers to transmit a first ultrasonic wave to the surface and receiving a first reflected ultrasonic wave from the first transducer from the surface in response to the transmitted first ultrasonic wave; stimulating a second transducer of the plurality of transducers to transmit a second ultrasonic wave to the surface and receiving a second reflected ultrasonic wave from the second transducer from the surface in response to the transmitted second ultrasonic wave; stimulating a third transducer of the plurality of transducers to transmit a third ultrasonic wave to the surface and receiving a third reflected ultrasonic wave from the third transducer from the surface in response to the transmitted third ultrasonic wave; and stimulating a fourth transducer of the plurality of transducers to transmit a fourth ultrasonic wave to the surface and receiving a fourth reflected ultrasonic wave from the fourth transducer from the surface in response to the transmitted fourth ultrasonic wave. Additionally or alternatively to one or more of the examples disclosed above, in some examples, the first ultrasonic wave, second ultrasonic wave, third ultrasonic wave and fourth ultrasonic wave can be transmitted in series to reduce interference between the plurality of transducers. Additionally or alternatively to one or more of the examples disclosed above, in some examples, determining the location of the contact by the object on the surface can be based the first reflected ultrasonic wave, the second reflected ultrasonic wave, the third reflected ultrasonic wave and the fourth reflected ultrasonic wave. Additionally or alternatively to one or more of the examples disclosed above, in some examples, stimulating the plurality of transducers to transmit ultrasonic waves to the surface and the deformable material and receiving, from the plurality of transducers, reflected ultrasonic waves from the surface and the deformable material can further comprise: stimulating the first transducer of the plurality of transducers to transmit a fifth ultrasonic wave to the deformable material and receiving a fifth reflected ultrasonic wave from the first transducer from the deformable material in response to the transmitted fifth ultrasonic wave; stimulating the second transducer of the plurality of transducers to transmit a sixth ultrasonic wave to the deformable material and receiving a sixth reflected ultrasonic wave from the second transducer from the deformable material in response to the transmitted sixth ultrasonic wave; stimulating the third transducer of the plurality of transducers to transmit a seventh ultrasonic wave to the deformable material and receiving a seventh reflected ultrasonic wave from the third transducer from the deformable material in response to the transmitted seventh ultrasonic wave; and stimulating the fourth transducer of the plurality of transducers to transmit an eighth ultrasonic wave to the deformable material and receiving an eighth reflected ultrasonic wave from the fourth transducer from the deformable material in response to the transmitted eighth ultrasonic wave. Additionally or alternatively to one or more of the examples disclosed above, in some examples, the fifth ultrasonic wave, the sixth ultrasonic wave, the seventh ultrasonic wave and the eighth ultrasonic wave can be transmitted in series to reduce interference between the plurality of transducers. Additionally or alternatively to one or more of the examples disclosed above, in some examples, determining the applied force by the contact on the surface can be based the fifth reflected ultrasonic wave, the sixth reflected ultrasonic wave, the seventh reflected ultrasonic wave and the eighth reflected ultrasonic wave. Additionally or alternatively to one or more of the examples disclosed above, in some examples, determining the applied force by the contact on the surface can comprise averaging time of flight measurements corresponding to the fifth reflected ultrasonic wave, sixth reflected ultrasonic wave, seventh reflected ultrasonic wave and eighth reflected ultrasonic wave. Additionally or alternatively to one or more of the examples disclosed above, in some examples, stimulating the plurality of transducers to transmit ultrasonic waves to the surface and the deformable material and receiving, from the plurality of transducers, reflected ultrasonic waves from the surface and the deformable material can comprise: stimulating a first transducer of the plurality of transducers to simultaneously transmit a first ultrasonic wave to the surface and to the deformable material; receiving a first reflected ultrasonic wave from the surface from the first transducer in response to the first ultrasonic wave transmitted to the surface and a first reflected ultrasonic wave from the deformable material from the first transducer in response to the first ultrasonic wave transmitted to the deformable material; stimulating a second transducer of the plurality of transducers to simultaneously transmit a second ultrasonic wave to the surface and to the deformable material; receiving a second reflected ultrasonic wave from the surface from the second transducer in response to the second ultrasonic wave transmitted to the surface and a second reflected ultrasonic wave from the deformable material from the second transducer in response to the second ultrasonic wave transmitted to the deformable material; stimulating a third transducer of the plurality of transducers to simultaneously transmit a third ultrasonic wave to the surface and to the deformable material; receiving a third reflected ultrasonic wave from the surface from the third transducer in response to the third ultrasonic wave transmitted to the surface and a third reflected ultrasonic wave from the deformable material from the third transducer in response to the third ultrasonic wave transmitted to the deformable material; and stimulating a fourth transducer of the plurality of transducers to simultaneously transmit a fourth ultrasonic wave to the surface and to the deformable material; receiving a fourth reflected ultrasonic wave from the surface from the fourth transducer in response to the fourth ultrasonic wave transmitted to the surface and a fourth reflected ultrasonic wave from the deformable material from the fourth transducer in response to the fourth ultrasonic wave transmitted to the deformable material. Additionally or alternatively to one or more of the examples disclosed above, in some examples, the first ultrasonic wave, the second ultrasonic wave, the third ultrasonic wave and the fourth ultrasonic wave can be transmitted in series to reduce interference between the plurality of transducers. Additionally or alternatively to one or more of the examples disclosed above, in some examples, determining the location of the contact by the object on the surface can be based the first reflected ultrasonic wave from the surface, the second reflected ultrasonic wave from the surface, the third reflected ultrasonic wave from the surface and the fourth reflected ultrasonic wave from the surface. Additionally or alternatively to one or more of the examples disclosed above, in some examples, determining the applied force by the contact on the surface can be based the first reflected ultrasonic wave from the deformable material, the second reflected ultrasonic wave from the deformable material, the third reflected ultrasonic wave from the deformable material and the fourth reflected ultrasonic wave from the deformable material. Additionally or alternatively to one or more of the examples disclosed above, in some examples, the processing circuitry can comprise a force detection circuit. The force detection circuit can be configured to use time gating to detect one or more transitions in a reflected ultrasonic wave to determine a time of arrival of the reflected ultrasonic wave. Additionally or alternatively to one or more of the examples disclosed above, in some examples, the processing circuitry can comprise one or more acoustic touch and force sensing circuits. Each of the one or more acoustic touch and force sensing circuits can comprise an acoustic touch sensing circuit implemented on a first integrated circuit and an acoustic force sensing circuit implemented on a second integrated circuit, separate from the first integrated circuit. Additionally or alternatively to one or more of the examples disclosed above, in some examples, the processing circuitry can comprise one or more acoustic touch and force sensing circuits. Each of the one or more acoustic touch and force sensing circuits can comprise an acoustic transmit circuit and an acoustic receive circuit. The acoustic transmit circuit can be implemented on a first integrated circuit and the acoustic receive circuit can be implemented on a second integrated circuit, separate from the first integrated circuit.

Some examples of the disclosure are directed to a non-transitory computer readable storage medium. The non-transitory computer readable storage medium can store instructions, which when executed by a device comprising a surface, a deformable material, a plurality of acoustic transducers coupled to the surface and the deformable material, and processing circuitry, cause the processing circuitry to: for each of the plurality of acoustic transducers: simultaneously transmit an ultrasonic wave in the surface toward an opposite edge of the surface and transmit an ultrasonic wave through the deformable material; receive an ultrasonic reflection from the deformable material in response to the ultrasonic wave transmitted through the deformable material traversing the thickness of the deformable material; receive an ultrasonic reflection from the surface; determine a first time-of-flight between the ultrasonic wave transmitted through the deformable material and the ultrasonic reflection from the deformable material; and determine a second time-of-flight between the ultrasonic wave transmitted in the surface and the ultrasonic reflection from the surface. The instructions can further cause the processing circuitry to determine a position of an object on the surface based on respective second time-of-flight measurements corresponding to the plurality of transducers; and determine an amount of applied force by the object on the surface based on respective first time-of-flight measurements corresponding to the plurality of transducers.

Some examples of the disclosure are directed to a method for determining a position of an object on a surface and an amount of applied force by the object on the surface. The method can comprise: for each of a plurality of acoustic transducers: transmitting an first ultrasonic wave in the surface toward an opposite edge of the surface; receiving a first ultrasonic reflection from the surface; and determining a first time-of-flight between the first ultrasonic wave transmitted in the surface and the first ultrasonic reflection from the surface; determining the position of the object on the surface based on respective first time-of-flight measurements corresponding to the plurality of transducers. The method can further comprise: for each of a plurality of acoustic transducers: transmitting a second ultrasonic wave through the deformable material; receiving a second ultrasonic reflection from the deformable material in response to the second ultrasonic wave transmitted through the deformable material traversing the thickness of the deformable material; and determining a second time-of-flight between the second ultrasonic wave transmitted through the deformable material and the second ultrasonic reflection from the deformable material. The method can further comprise determining the amount of applied force by the object on the surface based on respective second time-of-flight measurements corresponding to the plurality of transducers.

Some examples of the disclosure are directed to a touch and force sensitive device. The device can comprise: a surface, a deformable material disposed between the surface and a rigid material, such that force on the surface causes a deformation of the deformable material, one or more transducers coupled to the surface and the deformable material and configured to transmit ultrasonic waves to and receive ultrasonic waves from the surface and the deformable material, and a processor. The processor can be capable of determining a location of a contact by an object on the surface based on ultrasonic waves propagating in the surface and determining an applied force by the contact on the surface based on ultrasonic waves propagating in the deformable material. Additionally or alternatively to one or more of the examples disclosed above, in some examples, the surface can comprise a glass or sapphire external surface of the device, the rigid material can comprise a portion of a metal housing of the device, and the deformable material can form a gasket between the metal housing and the surface. Additionally or alternatively to one or more of the examples disclosed above, in some examples, the one or more transducers can comprise at least a first transducer coupled to the deformable material. The first transducer can be configured to transmit an ultrasonic wave through the thickness of the deformable material. Additionally or alternatively to one or more of the examples disclosed above, in some examples, the first transducer can also be configured to receive one or more ultrasonic reflections from a boundary between the deformable material and the rigid material. Additionally or alternatively to one or more of the examples disclosed above, in some examples, the one or more transducers can comprise at least a second transducer coupled between the deformable material and the rigid material. The second transducer can be configured to receive the ultrasonic wave transmitted through the thickness of the deformable material. Additionally or alternatively to one or more of the examples disclosed above, in some examples, the one or more transducers can comprise at least one transducer configured to simultaneously transmit an ultrasonic wave in the surface and an ultrasonic wave through the deformable material. Additionally or alternatively to one or more of the examples disclosed above, in some examples, the one or more transducers can comprise four transducers. Each of the four transducers can be disposed proximate to a respective edge of the surface. Additionally or alternatively to one or more of the examples disclosed above, in some examples, the device can further comprise an ultrasonic absorbent material coupled to the deformable material. The ultrasonic absorbent material can be configured to dampen ultrasonic ringing in the deformable material. Additionally or alternatively to one or more of the examples disclosed above, in some examples, determining the location of the contact by the object on the surface can comprise: determining a first time-of-flight of an ultrasonic wave propagating between a first edge the surface and a first leading edge of the object proximate to the first edge, determining a second time-of-flight of an ultrasonic wave propagating between a second edge the surface and a second leading edge of the object proximate to the second edge, determining a third time-of-flight of an ultrasonic wave propagating between a third edge the surface and a third leading edge of the object proximate to the third edge, and determining a fourth time-of-flight of an ultrasonic wave propagating between a fourth edge the surface and a fourth leading edge of the object proximate to the fourth edge. Additionally or alternatively to one or more of the examples disclosed above, in some examples, determining the applied force by the contact on the surface can comprise determining a time-of-flight of an ultrasonic wave propagating from a first side of the deformable material and reflecting off of a second side, opposite the first side, of the deformable material.

Some examples of the disclosure are directed to a method. The method can comprise transmitting ultrasonic waves in a surface, receiving ultrasonic reflections from the surface, transmitting ultrasonic waves through a deformable material, receiving ultrasonic reflections from the deformable material, determining a position of an object in contact with the surface from the ultrasonic reflections received from the surface, and determining a force applied by the object in contact with the surface from the ultrasonic reflections received from the deformable material. Additionally or alternatively to one or more of the examples disclosed above, in some examples, at least one of the ultrasonic waves transmitted in the surface and at least one of the ultrasonic waves transmitted in the deformable material are transmitted simultaneously. Additionally or alternatively to one or more of the examples disclosed above, in some examples, the at least one of the ultrasonic waves transmitted in the surface and the at least one of the ultrasonic waves transmitted in the deformable material are transmitted by a common transducer. Additionally or alternatively to one or more of the examples disclosed above, in some examples, the method can further comprise determining a time-of-flight through the deformable material based on a time difference between transmitting an ultrasonic wave through the deformable material and receiving an ultrasonic reflection from the deformable material. The force applied by the object can be determined based on the time-of-flight through the deformable material. Additionally or alternatively to one or more of the examples disclosed above, in some examples, the ultrasonic reflection from the deformable material can result from the ultrasonic wave transmitted through the deformable material reaching a boundary between the deformable material and a rigid material. Additionally or alternatively to one or more of the examples disclosed above, in some examples, the ultrasonic reflection from the deformable material can be received before the ultrasonic reflection from the surface. Additionally or alternatively to one or more of the examples disclosed above, in some examples, the method can further comprise determining a time-of-flight in the surface based on a time difference between transmitting an ultrasonic wave in the surface and receiving an ultrasonic reflection from the surface corresponding to the object in contact with the surface. Determining the position of the object comprises determining a distance from an edge of the surface to a leading edge of the object proximate to the edge of the surface can be based on the time-of-flight in the surface.

Some examples of the disclosure are directed to a non-transitory computer readable storage medium. The non-transitory computer readable storage medium can store instructions, which when executed by a device comprising a surface, a plurality of acoustic transducers coupled to edges of the surface, an acoustic touch and force sensing circuit, and one or more processors, cause the acoustic touch and force sensing circuit and the one or more processors to: for each of the plurality of acoustic transducers: simultaneously transmit an ultrasonic wave in the surface toward an opposite edge of the surface and transmit an ultrasonic wave through a deformable material; receive an ultrasonic reflection from the deformable material in response to the ultrasonic wave transmitted through the deformable material traversing the thickness of the deformable material; receive an ultrasonic reflection from the surface; determine a first time-of-flight between the ultrasonic wave transmitted through the deformable material and the ultrasonic reflection from the deformable material; and determine a second time-of-flight between the ultrasonic wave transmitted in the surface and the ultrasonic reflection from the surface. The instructions can further cause the acoustic touch and force sensing circuit and the one or more processors to determine a position of an object on the surface based on respective second time-of-flight measurements corresponding to the plurality of transducers and determine an amount of applied force by the object on the surface based on respective first time-of-flight measurements corresponding to the plurality of transducers. Additionally or alternatively to one or more of the examples disclosed above, in some examples, the ultrasonic wave transmitted in the surface and the ultrasonic wave transmitted through the deformable material can comprise shear waves. Additionally or alternatively to one or more of the examples disclosed above, in some examples, the ultrasonic reflection from the deformable material can be received before the ultrasonic reflection from the surface.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A touch and force sensitive device, comprising:
    a surface;
    a deformable material disposed between the surface and a rigid material, such that an applied force by a contact on the surface by an object causes a deformation of the deformable material;
    a plurality of transducers coupled to the surface and the deformable material configured to transmit ultrasonic waves to the surface and to the deformable material and to receive reflected ultrasonic waves from the surface and the deformable material, wherein the plurality of transducers include a first transducer coupled to the surface and the deformable material and configured to transmit a subset of the ultrasonic waves to the surface and to the deformable material and to receive a subset of the reflected ultrasonic waves from the surface and the deformable material; and
    processing circuitry coupled to the plurality of transducers and configured to:
        stimulate the plurality of transducers to transmit the ultrasonic waves;
        receive the reflected ultrasonic waves;
        determine a location of the contact on the surface based on one or more of the reflected ultrasonic waves propagating in the surface and received at one or more of the plurality of transducers; and
        determine the applied force by the contact on the surface based on one or more reflected ultrasonic waves propagating in the deformable material and received at one or more of the plurality of transducers.

2. The device of claim 1, wherein:
    the surface comprises an external surface of the device,
    the rigid material comprises a portion of a housing of the device, and
    the deformable material forms a gasket between the portion of the housing and the external surface of the device.

3. The device of claim 2, wherein the plurality of transducers comprises at least four transducers bonded to the surface, wherein each of the four transducers is disposed proximate to a different one of four respective edges of the surface and disposed over a portion of the gasket proximate to a respective edge of the housing of the device.

4. The device of claim 3, wherein the processing circuitry comprises one or more acoustic touch and force sensing circuits, the one or more acoustic touch and force sensing circuits coupled to the plurality of transducers via direct bonding between the plurality of transducers and the one or more acoustic touch and force sensing circuits, via bonding between the plurality of transducers and a flexible circuit board coupled to the one or more acoustic touch and force sensing circuits, or via bonding between the plurality of transducers and a rigid circuit board coupled to the one or more acoustic touch and force sensing circuits.

5. The device of claim 3, further comprising:
    routing deposited on the surface proximate to the plurality of transducers;
    wherein the processing circuitry comprises one or more acoustic touch and force sensing circuits; and
    wherein the one or more acoustic touch and force sensing circuits are coupled to the plurality of transducers via coupling of the one or more acoustic touch and force sensing circuits to the routing deposited on the surface.

6. The device of claim 1, wherein stimulating the plurality of transducers and receiving the reflected ultrasonic waves comprises:
    stimulating the first transducer of the plurality of transducers to transmit a first ultrasonic wave to the surface and receiving a first reflected ultrasonic wave at the first transducer from the surface in response to the transmitted first ultrasonic wave;
    stimulating a second transducer of the plurality of transducers to transmit a second ultrasonic wave to the surface and receiving a second reflected ultrasonic wave at the second transducer from the surface in response to the transmitted second ultrasonic wave;
    stimulating a third transducer of the plurality of transducers to transmit a third ultrasonic wave to the surface and receiving a third reflected ultrasonic wave at the third transducer from the surface in response to the transmitted third ultrasonic wave; and
    stimulating a fourth transducer of the plurality of transducers to transmit a fourth ultrasonic wave to the surface and receiving a fourth reflected ultrasonic wave at the fourth transducer from the surface in response to the transmitted fourth ultrasonic wave.

7. The device of claim 6, wherein the first ultrasonic wave, second ultrasonic wave, third ultrasonic wave, and fourth ultrasonic wave are transmitted in series to reduce interference between the plurality of transducers.

8. The device of claim 6, wherein determining the location of the contact on the surface is based on the first reflected ultrasonic wave, the second reflected ultrasonic wave, the third reflected ultrasonic wave, and the fourth reflected ultrasonic wave.

9. The device of claim 6, wherein stimulating the plurality of transducers and receiving the reflected ultrasonic waves further comprises:
    stimulating the first transducer of the plurality of transducers to transmit a fifth ultrasonic wave to the deformable material and receiving a fifth reflected ultrasonic wave at the first transducer from the deformable material in response to the transmitted fifth ultrasonic wave;
    stimulating the second transducer of the plurality of transducers to transmit a sixth ultrasonic wave to the deformable material and receiving a sixth reflected ultrasonic wave at the second transducer from the deformable material in response to the transmitted sixth ultrasonic wave;
    stimulating the third transducer of the plurality of transducers to transmit a seventh ultrasonic wave to the deformable material and receiving a seventh reflected ultrasonic wave at the third transducer from the deformable material in response to the transmitted seventh ultrasonic wave; and stimulating the fourth transducer of the plurality of transducers to transmit an eighth ultrasonic wave to the deformable material and receiving an eighth reflected ultrasonic wave at the fourth transducer from the deformable material in response to the transmitted eighth ultrasonic wave.

10. The device of claim 9, wherein the fifth ultrasonic wave, the sixth ultrasonic wave, the seventh ultrasonic wave, and the eighth ultrasonic wave are transmitted in series to reduce interference between the plurality of transducers.

11. The device of claim 9, wherein determining the applied force by the contact on the surface is based on the fifth reflected ultrasonic wave, the sixth reflected ultrasonic wave, the seventh reflected ultrasonic wave, and the eighth reflected ultrasonic wave.

12. The device of claim 11, wherein determining the applied force by the contact on the surface comprises averaging time of flight measurements corresponding to the fifth reflected ultrasonic wave, sixth reflected ultrasonic wave, seventh reflected ultrasonic wave, and eighth reflected ultrasonic wave.

13. The device of claim 1, wherein stimulating the plurality of transducers and receiving the reflected ultrasonic waves comprises:
stimulating the first transducer of the plurality of transducers to simultaneously transmit a first ultrasonic wave to the surface and to the deformable material;
receiving a first reflected ultrasonic wave from the surface at the first transducer in response to the first ultrasonic wave transmitted to the surface and a first reflected ultrasonic wave from the deformable material at the first transducer in response to the first ultrasonic wave transmitted to the deformable material;
stimulating a second transducer of the plurality of transducers to simultaneously transmit a second ultrasonic wave to the surface and to the deformable material;
receiving a second reflected ultrasonic wave from the surface at the second transducer in response to the second ultrasonic wave transmitted to the surface and a second reflected ultrasonic wave from the deformable material at the second transducer in response to the second ultrasonic wave transmitted to the deformable material;
stimulating a third transducer of the plurality of transducers to simultaneously transmit a third ultrasonic wave to the surface and to the deformable material;
receiving a third reflected ultrasonic wave from the surface at the third transducer in response to the third ultrasonic wave transmitted to the surface and a third reflected ultrasonic wave from the deformable material at the third transducer in response to the third ultrasonic wave transmitted to the deformable material; and
stimulating a fourth transducer of the plurality of transducers to simultaneously transmit a fourth ultrasonic wave to the surface and to the deformable material;
receiving a fourth reflected ultrasonic wave from the surface at the fourth transducer in response to the fourth ultrasonic wave transmitted to the surface and a fourth reflected ultrasonic wave from the deformable material at the fourth transducer in response to the fourth ultrasonic wave transmitted to the deformable material.

14. The device of claim 13, wherein the first ultrasonic wave, the second ultrasonic wave, the third ultrasonic wave, and the fourth ultrasonic wave are transmitted in series to reduce interference between the plurality of transducers.

15. The device of claim 13, wherein determining the location of the contact on the surface based on the one or more of the reflected ultrasonic waves propagating in the surface is based on the first reflected ultrasonic wave from the surface, the second reflected ultrasonic wave from the surface, the third reflected ultrasonic wave from the surface, and the fourth reflected ultrasonic wave from the surface; and wherein determining the applied force by the contact on the surface based on the one or more reflected ultrasonic waves propagating in the deformable material is based on the first reflected ultrasonic wave from the deformable material, the second reflected ultrasonic wave from the deformable material, the third reflected ultrasonic wave from the deformable material, and the fourth reflected ultrasonic wave from the deformable material.

16. The device of claim 1, wherein the processing circuitry comprises a force detection circuit, the force detection circuit configured to use time gating to detect one or more transitions in a reflected ultrasonic wave of the one or more reflected ultrasonic waves to determine a time of arrival of the reflected ultrasonic wave.

17. The device of claim 1, wherein the processing circuitry comprises one or more acoustic touch and force sensing circuits, each of the one or more acoustic touch and force sensing circuits comprising an acoustic touch sensing circuit implemented on a first integrated circuit and an acoustic force sensing circuit implemented on a second integrated circuit, separate from the first integrated circuit.

18. The device of claim 1, wherein the processing circuitry comprises one or more acoustic touch and force sensing circuits, each of the one or more acoustic touch and force sensing circuits comprising an acoustic transmit circuit and an acoustic receive circuit, wherein the acoustic transmit circuit is implemented on a first integrated circuit and the acoustic receive circuit is implemented on a second integrated circuit, separate from the first integrated circuit.

19. A non-transitory computer readable storage medium storing instructions, which when executed by a device comprising a surface, a deformable material, a plurality of acoustic transducers coupled to the surface and the deformable material, and processing circuitry, cause the processing circuitry to:
for each of the plurality of acoustic transducers:
simultaneously transmit an ultrasonic wave in the surface toward an opposite edge of the surface and transmit an ultrasonic wave through the deformable material;
receive an ultrasonic reflection from the deformable material in response to the ultrasonic wave transmitted through the deformable material traversing a thickness of the deformable material;
receive an ultrasonic reflection from the surface in response to the ultrasonic wave transmitted in the surface toward the opposite edge of the surface;
determine a first time-of-flight between the ultrasonic wave transmitted through the deformable material and the ultrasonic reflection from the deformable material; and
determine a second time-of-flight between the ultrasonic wave transmitted in the surface and the ultrasonic reflection from the surface;
determine a location of an object contacting the surface based on one or more respective second time-of-flight measurements corresponding to one or more of the plurality of transducers; and
determine an amount of applied force by the object on the surface based on one or more respective first time-offlight measurements corresponding to one or more of the plurality of transducers.

20. A method for determining a location of an object contacting a surface and an amount of applied force by the object contacting the surface, the method comprising:
for each of a plurality of acoustic transducers:
transmitting a first ultrasonic wave in the surface toward an opposite edge of the surface;
receiving a first ultrasonic reflection from the surface; and
determining a first time-of-flight between the first ultrasonic wave transmitted in the surface and the first ultrasonic reflection from the surface;
determining the location of the object contacting the surface based on one or more respective first time-of-flight measurements corresponding to one or more of the plurality of transducers;
for each of a plurality of acoustic transducers:
transmitting a second ultrasonic wave through a deformable material disposed between the surface and a rigid material;
receiving a second ultrasonic reflection from the deformable material in response to the second ultrasonic wave transmitted through the deformable material traversing a thickness of the deformable material; and
determining a second time-of-flight between the second ultrasonic wave transmitted through the deformable material and the second ultrasonic reflection from the deformable material; and
determining the amount of applied force by the object contacting the surface based on one or more respective second time-of-flight measurements corresponding to one or more of the plurality of transducers.

* * * * *